US005758347A

United States Patent [19]
Lo et al.

[11] Patent Number: 5,758,347
[45] Date of Patent: May 26, 1998

[54] LAYERED STORAGE STRUCTURE FOR COMPUTER DATA STORAGE MANAGER

[75] Inventors: Shui Wing Lo, Sunnyvale; David J. Austin, San Francisco; Tantek I. Celik, Los Altos; Steven J. Szymanski, Cupertino; Jed Harris, Berkeley, all of Calif.

[73] Assignee: Apple Computer, Inc., Cupertino, Calif.

[21] Appl. No.: 470,619

[22] Filed: Jun. 6, 1995

Related U.S. Application Data

[62] Division of Ser. No. 60,809, May 12, 1993.
[51] Int. Cl.$^6$ .................................................. G06F 17/30
[52] U.S. Cl. ................................................................ 707/103
[58] Field of Search .................... 395/600; 707/100–103

[56] References Cited

U.S. PATENT DOCUMENTS

| | | | |
|---|---|---|---|
| 4,631,664 | 12/1986 | Bachman | 364/200 |
| 4,809,170 | 2/1989 | LeBlang et al. | 364/200 |
| 5,175,849 | 12/1992 | Schneider | 395/600 |
| 5,347,653 | 9/1994 | Flynn et al. | 395/600 |
| 5,432,928 | 7/1995 | Sherman | 395/600 |
| 5,440,730 | 8/1995 | Elmasri et al. | 395/600 |
| 5,513,352 | 4/1996 | Tozuka | 395/600 |
| 5,530,853 | 6/1996 | Schell et al. | 395/600 |
| 5,535,386 | 7/1996 | Wang | 395/600 |
| 5,548,749 | 8/1996 | Kroenke et al. | 395/613 |
| 5,557,793 | 9/1996 | Koerber | 395/600 |
| 5,559,991 | 9/1996 | Kanfi | 395/489 |

*Primary Examiner*—Thomas G. Black
*Assistant Examiner*—Maria N. Von Buhr
*Attorney, Agent, or Firm*—Fliesler, Dubb, Meyer & Lovejoy

[57] ABSTRACT

A data structure and associated data management methods for highly flexible storage of data for a wide variety of application programs. Data is stored as a plurality of Blops, each of which has a list of Properties associated with it. Each Property contains zero or more elements. Elements can be Values, each of which has a Basic Type and consists of a variable length sequence of bytes. The Basic Type can define the format of the Value, as well as meta-information such as compression and encryption. Elements can also be Compound Types, which nestably refer to another list of Properties. Blops are stored in Containers, which map to the physical medium on which the data is stored. Containers can associate respective Container Handlers which are specific to the Container's physical medium. Related Blops in a Container can be organized into Pools of Blops. Each Container may contain one or more Pools, each Pool having a unique name within the Container. A Pool may contain multiple versions of a Blop. Versions of different Blops may be grouped together in Layers in a Pool and each Layer can contain at most one version of a Blop. Layers are related to each other as an acyclic digraph where each Layer is above one or more Base Layers and has zero or more Layers above it. Each Layer presents a "view" to a user of the Blops in a pool, and thereby provide a mechanism to manipulate which versions of which Blops are to be used at any given time.

23 Claims, 13 Drawing Sheets

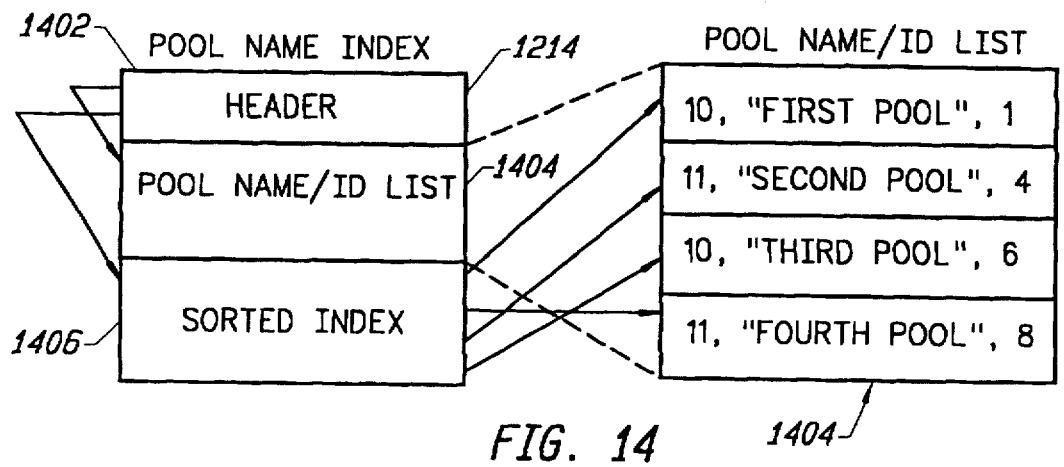
FIG. 14
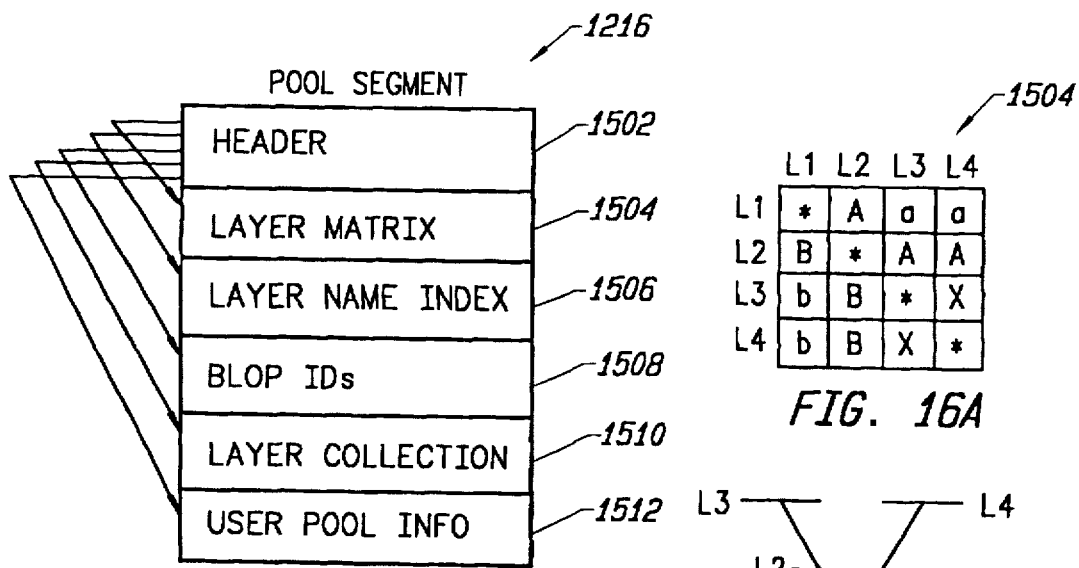
FIG. 15
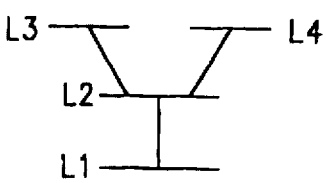
FIG. 16A
FIG. 16B

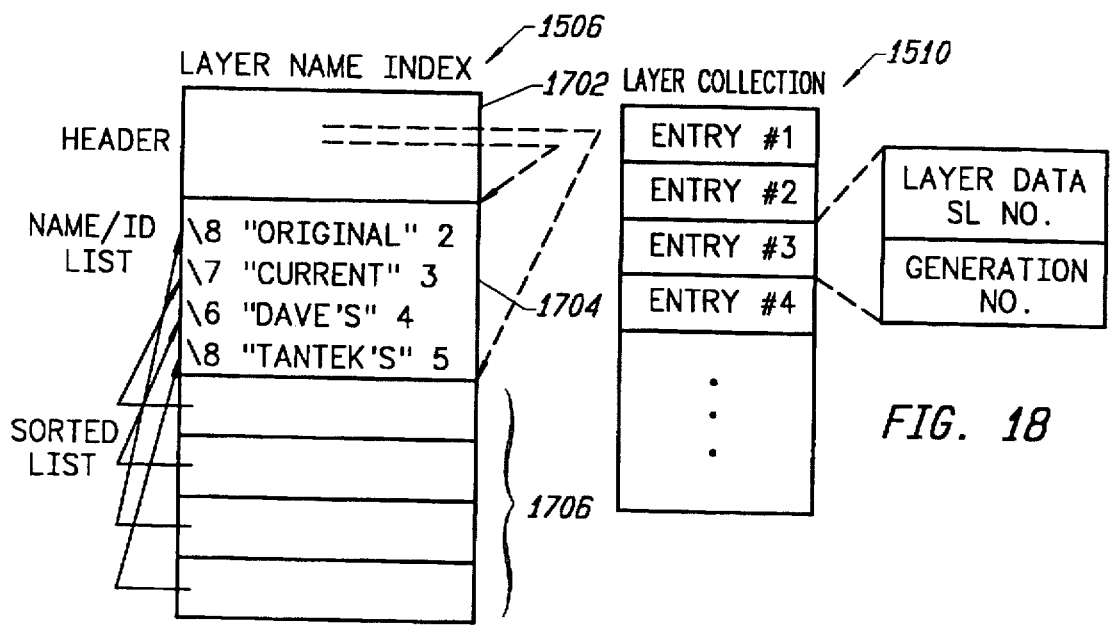
FIG. 17
FIG. 18
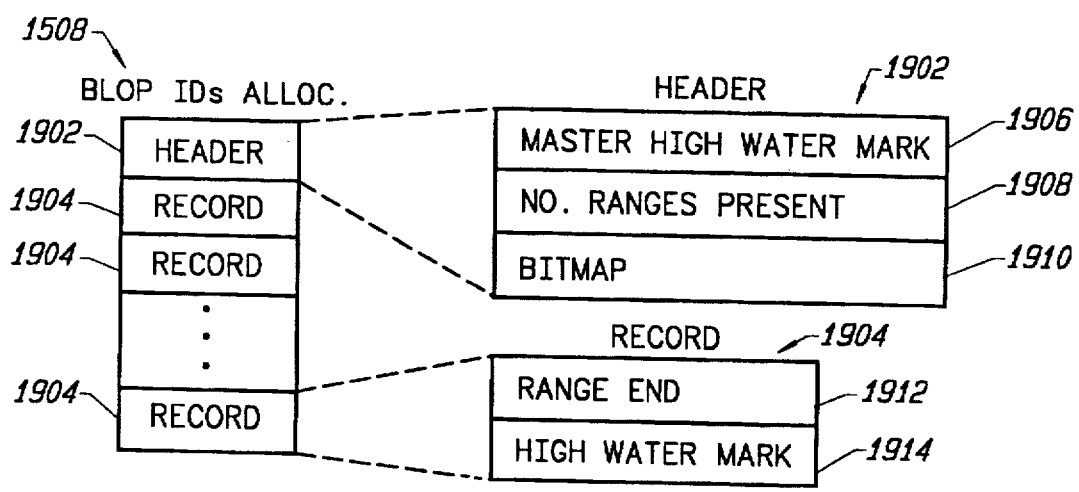
FIG. 19

THIS ITEM IS THE ROOT DID OF THE BLOP. FROM IT, THE PID AND DID HIERARCHIES CAN BE FOUND.

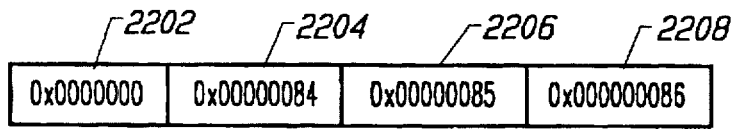
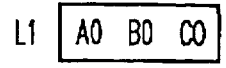
FIG. 22A  FIG. 22B
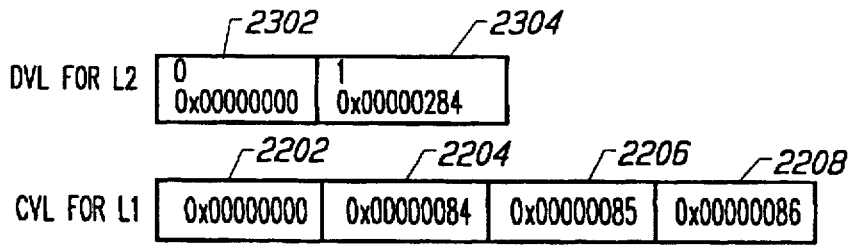
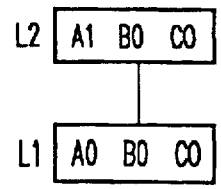
FIG. 23A  FIG. 23B
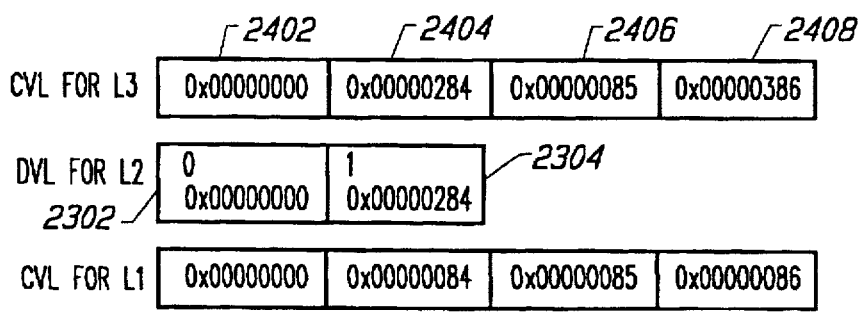
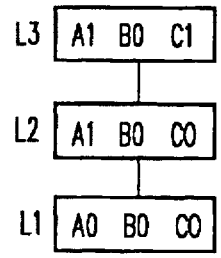
FIG. 24A  FIG. 24B
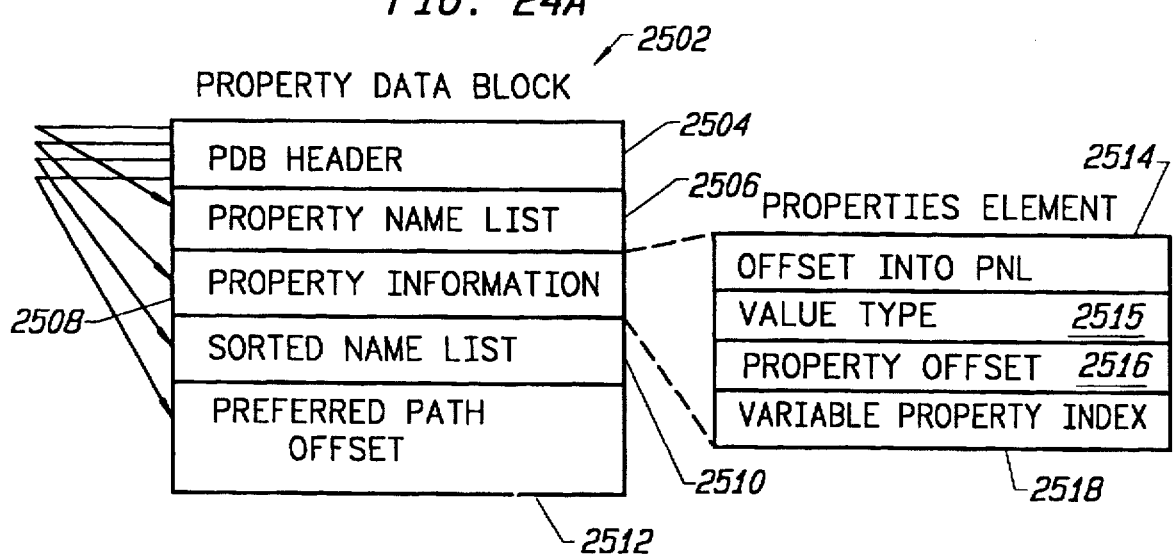
FIG. 25

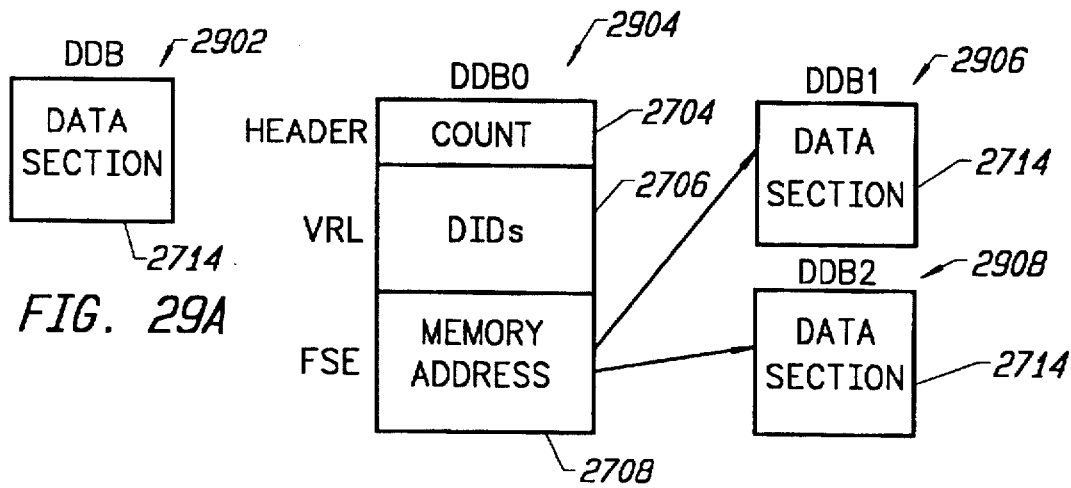
FIG. 29A
FIG. 29B
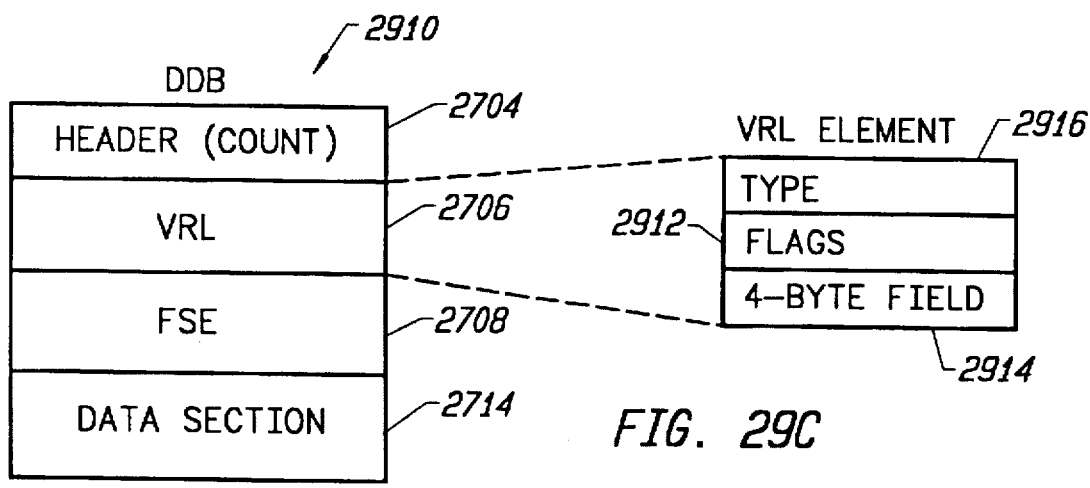
FIG. 29C

LAYERED STORAGE STRUCTURE FOR COMPUTER DATA STORAGE MANAGER

This application is a division of Ser. No. 08/060,809, filed May 12, 1993, pending, incorporated herein by reference.

A portion of the disclosure of this patent document contains material which is subject to copyright protection. The copyright owner has no objection to the facsimile reproduction by any one of the patent document or the patent disclosure as it appears in the Patent & Trademark Office patent file or records, but otherwise reserves all copyright rights whatsoever.

BACKGROUND

Application programs in a computer system typically need to manage data in a manner that permits frequent updating. Two broad examples of such application programs are a word processor and a database manager. Word processors need to be able to manipulate sections of text and other related information each time the user modifies a document, and a database program needs to insert, delete and modify entries in accordance with a user's requirements.

One issue that often faces developers of these types of application programs is the trade-off between storage space and speed of execution. For example, database programs typically manage data in the form of one or more tables. Each record in a table has the same number of fields, each of which are in the same format, and all of which are described in a separate data structure which the program maintains in conjunction with the table. In such a table, each row might represent a different record, and each column might represent a different field within the record. If the table is maintained as a simple array, then each field is assigned a predetermined maximum length, and storage is allocated for the maximum length of each field in each record. This clearly results in much wasted storage space, since the data in most fields will not occupy the full amount of space allotted. The developer can save space by maintaining variable length fields as merely fixed-byte length offsets into an area of storage which contains the actual data, but this entails a level of indirection which must be invoked every time it is necessary to access the particular data. This can detrimentally impact the speed with which certain operations are performed, such as searching.

Another space utilization issue which database program developers often face when data is stored and maintained as tables, is that very often it is desirable to include a particular field in only one or a few of the records in the table, such field being unnecessary in the vast majority of the records. A large amount of unused space must be allocated to maintain such a field in all of the records, even if the developer seeks to minimize the wasted space through indirection. The database program developer can reduce the amount of wasted space by maintaining the data as a linked list rather than as an array, but again, only with the penalty of extensive additional overhead for operations such as searching. Additionally, linked list implementations often do not save very much space since some storage must still be allocated to indicate that a particular field is empty in a particular record. The developer may be able to reduce the speed penalty by adding cross-pointers in the linked list, but this technique again increases the amount of storage space used.

The trade-off between storage space usage and speed of access becomes more severe as the data being managed, if expressed as an array, becomes more sparse. Accordingly, there is a need for a method of managing data which minimizes both the usage of space and the time required to access the data. Another issue faced by application program developers is that for many types of application programs, the file structure offered by the operating system is not appropriate to the task. Typical of the data Storage Managers offered by operating systems are those offered by MS-DOS®, Unix®, and by the Apple Macintosh®. All of these operating systems store data in "files". A file is maintained in a "directory" of files, and directories may be maintained as parts of other directories, thereby creating a tree structure for the files. If the storage apparatus managed by the operating system contains more than one storage medium, such as different hard disks, floppy disks, CD-ROMs, remote storage media accessible via a network, or local volatile memory, then each such medium usually has its own root directory within which all of the files stored on the medium exist. Unix® and Macintosh® also support aliasing of files, whereby a file may appear in several different directories, although only one instance contains the data of the file. All the other instances merely refer to the one real instance.

In these file systems, the smallest unit of information supported by the operating system is a file for many of the frequently needed operations. Since the speed penalty involved in operating system calls to open and close files is significant, application programs tend to maintain data in only one or a few files rather than attempt to take advantage of the file system structure supported by the operating system. For example, a database program developer may be able to avoid a large amount of data movement when a record is inserted or deleted, merely by maintaining each record in a separate file. As another example, a database application program may wish to maintain each field of a record in a separate file, thereby inherently implementing variable length fields. Neither of these techniques is practical, however, since they would require enormous numbers of operating system calls to open and close files, thereby imposing a substantial speed penalty.

Since many of the application programs maintain their data in only one or a few files, each such program requires the development and implementation of a proprietary data format which allows the application to quickly store and retrieve the data which the particular application program expects. Developers therefore often maintain large libraries of code for accessing their own proprietary file formats. One example is the MacWrite program, which maintains its own mechanism for moving data to and from memory. The mechanism is optimized for the particular file format used, and is not directly useable by other application programs. Other application programs have essentially similar mechanisms. The result is an immense duplication of effort that could otherwise be directed toward enhanced user functionality.

Accordingly, there is a significant need for operating system support of data storage in a form which is useful to a wide variety of application programs.

Another issue which application developers often face arises when data is stored in different parts of a data storage apparatus, which have different protocols for access. For example, storage apparatus in a computer system may include not only persistent storage such as a hard disk, but also volatile storage such as the computer system's main memory. That is, if an application program wishes to minimize the number of reads and writes to a hard disk, it may maintain some of the data in main memory for as long as possible before the space it occupies in main memory becomes necessary for another purpose. One frequent example is a word processor's need to maintain some portion of a document currently being edited in memory, and other portions of the document out on disk. Such a technique, known as caching, often requires the application program to keep track of which data is currently on which medium, and use the appropriate protocol for accessing that medium. For example, if the data is on disk, the application program typically uses the operating system's read and write calls to access the data. If the data is in main memory, then the application program can avoid all the overhead of the operating system merely by addressing the particular memory locations at which the data may be found. If the data is in ROM, yet a third data access protocol may be necessary. There is a need in the industry to simplify the implementation of application programs by providing a common mechanism by which the application developer can access data regardless of how or where it is stored in the computer system's storage apparatus.

Many application program developers also face yet another issue if the data maintained by the program is intended to be accessible, and modifiable, by more than one user. The term "shared structured storage" can be defined as a mechanism for making data persistent across sessions (invocations) of an application program, with the data being available for collaborative updating. For example, in a word processor, it is often desirable to support the ability of two or more different users to update a single document at the same time. In a database system, it is often desirable to permit different users to update the database data concurrently. Most application programs implement a technique known as "pessimistic concurrency" which, while permitting many users to read and view the data concurrently, permits only one user to modify the data at a time. The system "locks out" all other users from write accesses when one user has the data open for updating. Pessimistic concurrency can be implemented at a file level or, in sophisticated database programs for example, at a record level. That is, for file level locking, only one user may have the file open at a time for writing. This is the typical manner with which word processors implement concurrency. A database program can implement record level locking if, for example, a backend process is the only process which has the data file open for writing, and all other users issue their commands and queries through the backend process.

Some application programs have attempted to implement "optimistic concurrency", in which two or more users can modify data at the same time, subject to subsequent reconciliation. One example is the Macintosh® Programming Workshop (MPW) Projector available from Apple Computer, Inc., Cupertino, Calif. MPW Projector is described in the MPW 3.1 Reference Manual, and in H. Kanner, "Projector, An Informal Tutorial", available from Apple Computer, Inc. (1989). MPW Projector is an integrated set of tools and scripts whose primary purpose is to maintain control of the development of source code. It preserves in an orderly manner the various revisions of a file, and through the versioning mechanism also prevents one programmer from inadvertently destroying changes made by another. If the underlying data is text, data compression is achieved by storing only one complete copy of a file and storing revisions only as files of differences. Different users of the same set of files can view them differently since each user is given independent control of the mapping between the user's local directory hierarchy, in which the user keeps the files, and the hierarchy used for their storage in the main Projector database. Projector also has a facility for associating a specific set of file revisions with a name, this name being usable as a designator for a particular version, or release, of a product. Thus the name alone can be used to trigger the selection of just those source files that are required to build the desired instance of the product.

MPW Projector maintains versions in a tree structure. When one user desires to modify a file in the main Projector database, the user "checks out" the file, thereby making a copy of the file in the user's own directory. The user can check out a file either as "read-only" or, if no one else has already done so, as "read/write". After modifying the file, the user can then "check in" the file back to the main Projector database, either as a new version in a new branch of the file version tree, or, only if the file was check out as read/write as a new version in the same branch of the version tree. When it is finally desirable to merge a branch of the revision tree back into the main trunk, MPW Projector performs a strict text-based comparison between the two versions of the file and displays the differences in a pair of windows on the computer system display. A user then cuts-and-pastes portions from one window into the other in order to merge them together.

While MPW Projector is a good first step toward optimistic concurrency, significant additional flexibility is highly desirable. For example, its finest level of granularity is still represented by a "file". It would be desirable to support much greater degrees of granularity. As another example, MPW Projector's provisions for merging two versions of a single document together is limited to a single procedure in which the computer identifies strict text differences, and a user indicates how each text difference should be resolved. Significant additional intelligence will be desirable in the comparison procedure, as would significant increased flexibility and automation in the resolution of conflicts, as well as support for comparisons between non-text files.

Some developers of application programs have attempted to use the Resource Manager, available from Apple Computer, to implement structured storage of data. The Resource Manager is described in Apple Computer, "Inside Macintosh: Overview", Chap. 3 (1992), incorporated herein by reference. The Resource Manager does not support concurrent updating of its data, however, and in any event was not designed for this purpose. The Resource Manager therefore fails to provide an adequate solution.

Accordingly, there is a need for much greater flexibility in the support of optimistic concurrency in the maintenance of data.

SUMMARY OF THE INVENTION

Roughly described, the invention includes a data structure for storing data in storage apparatus, in a manner which ameliorates many or all of the above deficiencies in existing storage systems. The invention can also be viewed as a method or set of methods for maintaining and/or implementing a data structure, or as a conglomeration of the data structure and such methods.

In the embodiment described herein, the primary unit of storage in the data structure is a Basic List of Properties (Blop), which stores a list of attributes referred to herein as "Properties". Each Property contains zero or more Values. Each Value has a Type and consists of a variable length sequence of bytes. The Value Type can define the format of the Value, including the data structure as well as meta-information such as compression and encryption.

Blops are stored in Containers. Containers map to the physical medium on which the data is stored. The Storage Manager can access each Container through a standard set of Container Handlers, so Containers can be created in memory, in ROM, on disk, and so on.

Related Blops can be organized into collections referred to herein as Pools. Each Container may contain one or more Pools, each Pool having a unique name within the Container. Each Blop is stored in one and only one Pool (except in Delta Pools and Separable Pools discussed below). However, each Blop may have multiple versions of itself stored in a Pool. Versions of a Blop differ from each other in terms of their Properties, Values or Value Types.

Versions of different Blops may be grouped together in Layers and each Layer can contain at most one version of a Blop. Layers are the Storage Manager's mechanism for manipulating which versions of which Blops are to be used at any given time. Layers are related to each other as an acyclic digraph where each Layer is above (derived from) one or more Base Layers and has zero or more Layers above it. The only exception is the Bottom Layer of a Pool, which has no Base Layer. Thus, every Layer in a Pool is transitively above the Bottom Layer of the Pool.

Each Layer presents a "view" to a user of the Blops in a Pool. Layers can be analogized to a stack of transparencies, in the sense that one can see straight through a Layer into the Layer(s) underneath it. In other words, the contents of any Layer is based on the contents of the Layers from which it is derived. To change the view of a Layer, a user can overwrite Blops, add Blops or remove Blops. Such changes do not affect the views presented by the Layers underneath the current one, but would affect the views of the Layers derived from it. A Layer which has no such changes in it is referred to as an Empty Layer, not in the sense that no Blops are visible from it, but rather in the sense that it is completely transparent.

FIG. 1 symbolically illustrates the logical relationship that might exist between four layers in a Pool 102. The Bottom Layer 104 of the Pool has two names: L1 and Bottom, and it has three Blops in it: A, B and C. Layer L1 has one Layer 106 derived from it: L2. In L2, Blop A has been changed to its second version, but the versions of B and C are unchanged, so the version they had in L1 is still visible (noted in the diagram by the dashed border). Layer L2 has one Layer 108 derived from it: L3. L3 once again changes Blop A, but also tombstones (deletes) Blop C and adds Blop D. Blop B is left unchanged so that the version from Layer L1 is still visible. Layer L4 is derived from L3, but no changes have been made in L4 yet so it can be referred to as an Empty Layer.

The Pool/Layer/Blop data structure permits easy implementation of optimistic concurrency with as fine a granularity as desired. For example, a document can be divided into any number of Blops and stored in a single Pool. Each Layer can then be looked upon as a draft of the document. Since more than one Layer can be derived from a Layer, one can have several Layers whose contents are based on the same base Layer. For example, if a document is stored in a Pool in a disk-file Container and two people would like to work on it at the same time, they can simply create two Layers based on the current Layer.

FIG. 2 symbolically illustrates a Pool 202 in which two Layers 206, 208 are derived from a Base Layer 204. The two Layers 206, 208 can be viewed and edited separately and simultaneously. In this way, more than one user can modify a document without blocking any other users from accessing it. Also, all the changes made by one user are encapsulated in one file. Everyone who has access to this file can inspect the various changes the user made. The user does not need to manage multiple files for multiple drafts.

In addition to Layer branching, the data structure also permits Layer reconciliation. When a Layer is derived from more than one Base Layer, it is referred to as a Reconciliation Layer since it provides a means to reconcile the views of the Layers on which it is based. Any Blops which have different versions visible in the different Base Layers are defined to be Ambiguous and cannot be accessed until their Properties, Values and Value Types have been explicitly set in the Reconciliation Layer. FIG. 3 illustrates a Pool 302 having a bottom Layer L1, two intermediate Layers L2 and L3 immediately above the bottom Layer Li,. and a "Reconciliation" Layer immediately above both Layers L2 and L3. In FIG. 3, the reconciliation of Blop A is unambiguous since it was unchanged in both Layers L2 and L3. Likewise, Blop D is not ambiguous since it exists only in L3. Blops B and C however exist as different versions in L2 and L3, and as such are ambiguous in the reconciliation Layer.

The method of resolving conflicts depends on the application program which uses the Storage Manager. The Storage Manager provides a means to identify conflicts by Blop versions, but it does not dictate one particular method of resolving conflicts. One application may choose to take the version of a Blop with the latest modification time while another may want to use the version with the most data. As another example, an application program may allow a user to choose one change over another, ignore both, or replace the Blop with an entirely new Blop. The application program which calls a Storage Manager routine to compare views in two Layers preferably also provides a reference to the application program's procedure for reconciling conflicts.

The data structure can also include Pools which are referred to herein as Delta Pools, which allow several Pools to behave as if they were a single Pool. In a Delta Pool, the Bottom Layer is actually derived from a Layer in a Base Pool. Thus the Layers in the Delta Pool appear as a continuation of the Layers in the Base Pool. FIG. 4 symbolically illustrates an example of how the Layers in a Delta Pool and its Base Pool might be related.

In particular, a Base Pool 402 includes four Layers L1, L2, L3 and L4, and a Delta Pool 404 includes four Layers L5, LG, L7 and L8. As shown in FIG. 4, Layer L5, which is the bottom Layer of Delta Pool 404, is "immediately above" Layer L4 in Base Pool 402.

A given Base Pool may have any number of Pools derived from it, but a Delta Pool can have only one Base Pool. A Delta Pool also can become a Base Pool for other Delta Pools. Attempting to access a Delta Pool triggers an attempt to reconnect to its Base Pool (and its Base Pool's Base Pool and so on). If the Base Pool is unavailable, the Delta Pool cannot be accessed. If the Base Pool is available and has not changed since the Delta Pool was last disconnected, the Delta Pool can be connected to the Base Pool. If the Base Pool has been changed, the Delta Pool cannot be connected to the Base Pool automatically; a reconciliation process needs to be triggered.

The concept of a Delta Pool enables new ways to interact with data on Read-Only media (e.g., CD-ROM). Since a Delta Pool can be derived from a Pool which is stored on a Read-Only medium, a Delta Pool provides a new view to the Read-Only Pool and modification can be made in this view. For example, if one has a movie stored as a Pool on a CD-ROM, one can view the movie and change any frame of the movie with the Delta Pool. Another example is a computer system's internal ROM. With Delta Pools, a computer manufacturer can turn the ROM into a Base Pool and deliver future system releases as Delta Pools on some removable medium such as a floppy disk.

The data structure also supports Pools referred to herein as Separable Pools. Separable Pools are very similar to Delta Pools in that the Bottom Layer is actually derived from a Layer in a Base Pool. Generally, however, in a Separable Pool, all of the Blops visible in the base Layer are copied up into the Bottom Layer of the Separable Pool.

A given Base Pool may have any number of Pools derived from it, but a Separable Pool can be derived from only one Base Pool. Unlike Delta Pools, a Separable Pool can be opened and accessed without the Base Pool being available.

When a Separable Pool is reintegrated with-its Base Pool, any conflicts between the two need to be reconciled. One way to resolve the conflicts is to create a Reconciliation Layer in the Base Pool, derived from both the Base Layer and the desired Layer in the Separable Pool. After the reconciliation, the Separable Pool can be destroyed as the changes are incorporated in the Base Pool. FIG. 5 illustrates symbolically the reintegration process 502 of a Separable Pool with its Base Pool. In particular, process 502 first illustrates the creation of a Separable Pool 504 from a Base Pool 506. The Base Pool includes a Layer L1, which forms the base Layer for the bottom Layer L2 of the Separable Pool 504. On reintegration, the Storage Manager creates a reconciliation Layer L3 in the Base Pool to reconcile the differences between the Blops in the view associated with L1 and the Blops in the view associated with L2. This is illustrated in process 502. As with the reconciliation process described above for two Layers in the same Pool, the Storage Manager, on reintegration of a Separable Pool, merely locates conflicts in the Blop versions. It is up to the Application Program to select which version to store in the reconciliation Layer, or to provide a new version. Separable Pools are extremely useful to work groups in a mobile computing environment. For example, if a user needs to perform certain tasks while away from the office, the user can create a Separable Pool derived from the Base Pool at the office and update the document while on the road. When the user returns, the modified document can be reintegrated with the original document even if the original document has been updated by other members of the work group while the user was away.

In an aspect of the invention, a method, referred to herein as MoveAllChangesDown, is provided to help reduce the storage requirements for Blop versions which are no longer required. MoveAllChangesDown is an operation which allows the changes which exist in one Layer to be moved down into Layers from which it is derived. Specifically, MoveAllChangesDown from Layer A to Layer B make Layer B have the same view of the Blops as Layer A and makes all the Layers above B, up through A be empty so that they also have the same view. FIG. 6 illustrates symbolically the results of a MoveAllChangesDown Operation. In FIG. 6, a Pool 602 includes three Layers, L1, L2 and L3. Layer L1 has associated with it a view of version one of each of three Blops A, B and C. Layer L2, which is immediately above Layer L1, has a view of version two of Blop B, but still has within its view version one of each of Blops A and C. Layer L3, which is immediately above Layer L2, has within its view a new version three of Blop B, a new version two of Blop C, and the original version one of Blop A. After the MoveAllChangesDown Operation, all of the changes in Layers L2 and L3 are moved into L1 and Layers L2 and L3 are made empty. Thus the view associated with Layer L1 now consists of version one of Blop A, version three of Blop B, and version two of Blop C. The views associated with Layers L2 and L3 are identical to that of Layer L1.

The MoveAllChangesDown operation removes all the versions of Blops which are no longer required, thus reducing the size of the Container containing the Blops. This is especially useful, for example, for archiving a final or interim draft of a document.

The Storage Manager can also include a method, referred to herein as CollapseLayers, which eliminates unnecessary empty Layers in a portion of the Layer tree of a Pool. Specifically, a CollapseLayers operation from Layer A to Layer B, eliminates all the empty Layers which are (transitively) above Layer B and (transitively) below Layer A, including Layer A (if empty). Any names or non-empty Layers which are above Layers which are eliminated, are moved down to the first non-empty Layer which is below the eliminated Layer.

FIG. 7 illustrates this operation with a Pool 702 which includes a bottom Layer L1, two Layers L2 and L3 which are both immediately above Layer L1, two Layers L4 and L5 which are immediately above Layers L2 and L3, respectively, a reconciliation Layer L6 having a name "version", Layer L6 being immediately above both Layers L4 and L5, and Layers L7 and L8 which are both immediately above Layer L6. In the illustration, Layers L2–L6 are empty, possibly as the result of a MoveAllChangesDown operation from Layers L6 to Layer L1. After the CollapseLayers operation, as shown in FIG. 7, Layers L2–L6 have been eliminated, the named "version" has been moved down to Layer L1, and Layers L7 and L8 are now both immediately above Layer L1. The CollapseLayers operation removes extraneous Layers and further reduces the storage requirements of the Container containing Pool 702.

Preferably, operations such as MoveAllChangesDown and CollapseLayers are facilitated by assigning each Blop a Blop identifier and ensuring that each Blop is "instantiated" in no more than one Layer in the Pool. Different versions of the same Blop have the same Blop identifier, but no two Blops in a Pool with the same Blop identifier are instantiated in the same Layer in the Pool.

Moreover, Blops can refer to other Blops indirectly, either at the Blop level or at the Value level. Indirectly referenced Blops can be in the same or a different Pool, and can be located in the same or a different Container.

Many other features of the invention, including different features of the data structure and different methods for maintaining the data structure or the data stored therein, will be evident from the detailed description set forth below.

DESCRIPTION OF THE DRAWINGS

The invention will be described with respect to particular embodiments thereof, and reference will be made to the drawings, in which:

FIG. 14 illustrates the structure of a Pool Name Index of FIG. 12;

FIG. 15 illustrates the structure of a Pool segment;

FIGS. 16a and 16b illustrate the structure of a Layer Matrix of FIG. 15;

FIG. 17 illustrates the structure of a Layer Name Index of FIG. 15;

FIG. 18 illustrates the structure of a Layer Collection of FIG. 15;

FIG. 19 illustrates the structure of a Blop ID Allocator of FIG. 15;

FIGS. 22A, 23A and 24A illustrate a Visibility List of FIG. 20 for Layer relationships illustrated symbolically in FIGS. 22B, 23B and 24B respectively;

FIGS. 25 and 26 illustrate the structure of Property Data Blocks;

FIGS. 27, 28, 29A, 29B and 29C illustrate the structure of Data Data Blocks.

DETAILED DESCRIPTION

The embodiment of the invention which is described herein constitutes a Storage Manager and its associated data structures. The structures are described first with respect to their logical organization and subsequently their physical organization in the storage apparatus managed by the Storage Manager. That is, they will be described first with respect to the view which the Storage Manager software provides to an application programmer via an Application Program Interface (API), and subsequently with respect to the way that logical organization is actually implemented in the present embodiment. While many of the advantages of the present invention derive from the logical organization, it will be apparent that such logical organization implies certain physical structures which are required to maintain the metaphor as viewed by the application developer. The physical organization described hereinafter includes many inventive aspects of the invention, but it is by no means the only physical structure which can support the logical organization presented to the application developer.

Preliminarily, as used herein, the terms "container", "pool", "layer" and "blop" are merely names for enclosures of data. The names are chosen for convenience of description of the present embodiment, but the reader should not imply any attributes from their definitions in the present embodiment into their definitions for the purposes of the overall invention. Similarly, the terms "property" and "type" merely represent interpretations of data. The reader should not imply any attributes from their interpretations in the present embodiment into their definitions for the purposes of the overall invention.

I. LOGIC ORGANIZATION OF DATA

Figure 8:
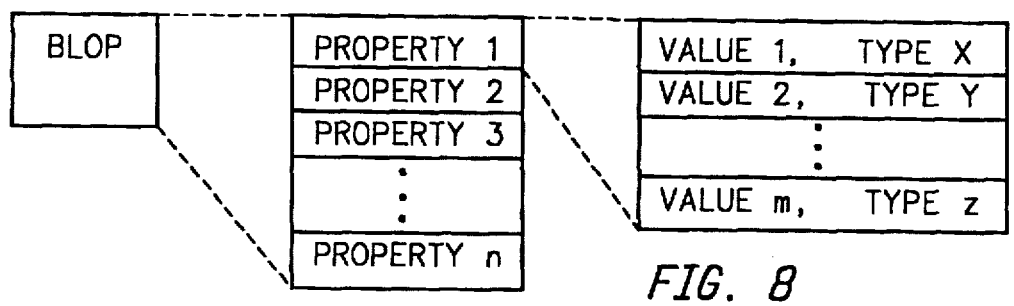
FIG. 8 illustrates the logical organization of a Blop.

The fundamental persistent storage unit in the Storage Manager is a Blop. As illustrated in FIG. 8, a Blop comprises a set of unordered attributes called Properties. Each Property includes a sequence of Values, indexed from 1 to n. Each Value is of a given Type and several Values of the same Property may have the same Type. The Type of a Value is unrelated to its index. Each Value consists of a variable length sequence of bytes.

A Property defines a role for a Value. Properties are similar to field names in a database record, except that they can be freely added to a Blop, and their names are unique within their owning Pool, so that applications can understand them. The data stored in a Blop exists in the Values. Values may be fixed or variable length. The Type of a Value describes the format of that Value. Types record the structure of a Value, whether it is compressed, encrypted, etc. Types share the same name space as Properties and are thus are also unique within their owning Pool. Types can be Basic Types, such as 'str' or 'long', or they can be Compound Types, in which case they are further broken down into a set of sub-Properties and Typed Values. Compound Types can be nested.

While Blops are used to contain the information within a Pool, it is often useful to maintain information about the information to assist applications in interpreting the data. In the Storage Manager, such meta-information is maintained in Meta Information Blops which are associated with Types and with Property names. Each Type and each Property name which is used within a Pool has an associated Blop which can be used to store additional information about how the Type/Property should be accessed and used. For instance, Meta Information Blops associated with Types can contain a Property which defines the Handlers (i.e. dynamically loaded routines) to call for reading and writing Values of that Type.

Other than the fact that they are associated with specific components of the Storage Manager, Meta Information Blops are normal Blops, and are accessed in the same way as data Blops. The only other difference is that while the Storage Manager does not define the interpretation of any Properties in regular Blops, it does define the usage of some Properties in Meta Information Blops. Specifically, in Type Meta Information Blops, the "ReadWrite Handler" Property indicates the name of the ReadWrite Handler and the "Superclass" Property indicates which other Type is its Superclass, if any.

Blops can refer to other Blops. These references are embedded in the Values of a Blop as Blop Ids, 32 bit numbers, which are unique within the owning Pool. The referenced Blops can be in the same or a different Pool, and in the same or a different Container.

The Storage Manager supports two kinds of indirection. In one form, a Blop can resolve to a different Blop automatically. The Properties and Values of the referenced Blop will appear to be within the local Blop. In the other form, an individual Value in a Blop can be indirected to a Value in another Blop. When accessing the local Value the referenced Value will actually be returned. The indirect Value can be just a portion of the referenced Value, and it can be moved along the referenced-Value like a scrolling window.

Containers map to the physical location of where data is stored. File Containers are normal Macintosh HFS Data Forks or Resource Forks. Memory Containers are in-memory constructs that maintain Pools in a given heap zone. ROM Containers allow for Containers burnt into ROM. Scrap Containers are used to pass Storage Manager structures on the MacIntosh Clipboard.

A Container can contain any number of Pools, and each Pool in a Container can be accessed independently of the others. The Storage Manager supports two standard Container formats: Update-In-Place (UIP) Format and Update-By-Append (UBA) Format. UIP Containers are optimized for random access file devices. UBA Containers are optimized to be written serially, with changes appended at the end, and read randomly. They can use either a file device or an area of memory. File Containers can utilize either the UIP or UBA format. ROM and Scrap Containers usually utilize the UBA format. These formats are implicitly determined by a dynamically linked and loaded Container Handler that is specified at creation of the Container. This Handler defines the format being used as well as the kind of media.

It can be seen that the data storage apparatus managed by the Storage Manager need not be persistent storage, and can include a plurality of different media. The term "data storage apparatus" carries no implication of how the data managed by the Storage Manager is divided among the different media. Even the "Containers" of the present embodiment, which appear to the application program as being entirely present on one particular storage medium, can in fact exist partially on such storage medium and partially in main memory during execution. Additionally, different parts of the data storage apparatus can comprise removable data storage media, such as floppy disks.

Pools, in the simplest case (ignoring Layers, Delta and Separable Pools, which will be described later), are collections of related Blops. Every Blop exists in one and only one "home" Pool (except in the case of Delta Pools). Pools are stored in Containers. Each Pool must be given a name which must be unique within the Container in which it is stored, and which is used to identify that Pool within the Container. Pools in memory are transient, and no effort is made to preserve their contents past the life of the application which created them, while Pools in Files are persistent. Pools in Memory Containers are automatically given a file on disk to use as a backing store, but the purpose of the backing store is only to extend the volume of Blops which can be stored in the Pool (since all of the Blops need not be in physical memory at one time). The Storage Manager allows for virtualization of Blops regardless of the existence of paging hardware. If paging hardware exists it will be used to best advantage by the Storage Manager. Every Pool can have any number of distinguished Blops in the Pool which are marked as persistent. All Blops in the Pool must either be marked persistent or transitively referred to by a persistent Blop. In other words, if one were to follow all of the Embedded Blop Ids in all the persistent Blop Values and then all the Embedded Blop Ids in those Blop Values, and so on, all of the Blops in the Pool must eventually be reached. Any Blop which cannot be so reached will be eliminated from the Pool. This is termed Blop garbage collection.

Pools may not just contain a set of Blops, they may also contain multiple versions of each of those Blops. Different versions of a Blop are identified implicitly by the Container, Pool and Layer in which they are instantiated.

Layers are the Storage Manager's mechanism for manipulating which versions of which Blops are to be used at any given time. Each Layer in a Pool defines a subset of the Blops in the Pool which are visible to that Layer; and for each of those Blops, the Layer defines which version of the Blop is to appear. A Layer is thus said to have associated with it a "view" of the Blops in the Pool. Any application which accesses a Pool must first specify which Layer in that Pool it is operating on before it can begin accessing any of the Blops inside. The parameter used by the application program to specify such a Layer is a predefined data structure referred to herein as a CPL Accessor. It completely describes the context necessary to access a set of Blops. It defines a Container, Pool and Layer context. Given the CPL Accessor context Blops can be accessed without regards to other Layers, Pools, or Containers.

Layers are not completely free-form; but are built into an acyclic digraph where each Layer is "Derived" from some number of other "Base" Layers, and has some number of other Layers derived from it. Each Pool has a single "Bottom" Layer from which all other Layers in the Pool are transitively derived. This "Bottom" Layer is created when the Pool is created and it cannot be deleted. The contents of any Layer is based on the contents of the Layers it is derived from except where changes have explicitly been made in that Layer. Such changes can include overwritten Blops, added Blops, deleted Blops, and even changes to the persistency marking of a Blop.

Layers are sometimes referred to herein as being "above" or "below" other Layers. Aboveness and belowness do not imply any height relationship, but rather merely imply a complementary pair of relationships between Layers. That is, if Layer A is above Layer B, then Layer B is below Layer A. The relationship implied by terms "above" and "below" is physical, however, since the relationship must be stored or available somewhere (for example, in a topology matrix) such that one can determine unambiguously whether one Layer is above, below or neither with respect to another Layer. The terms "above" and "below" are also intended to be interpreted transitively. That is, for example, if Layer A is above Layer B which is above Layer C, then Layer A is also above Layer C. When transitivity is not intended herein, a Layer is referred to as being "immediately above" or "immediately below" another Layer.

Layers can be identified by Layer Names. There is no practical limit to the number of Layer Names that can be associated with a Layer; but any name can be applied to at most one Layer in a given Pool. A Layer can also have no names associated with it. Layer Names are used in two ways in the Storage Manager: First, they are used to find specific Layers in a Pool. For instance, while there is one unique "Bottom" Layer in each Pool, there can be many "top" Layers which are not below any other Layer. If an Application needs to have a single identifiable "top" Layer, then it can use a Layer Name to specify and find it. The second way Layer Names are used in the Storage Manager is to mark atomic transactions between Layers. This use is enabled by Storage Manager calls which require that, in order to set the name of a Layer, the caller must also specify the Layer which previously had that Name (if any). The Storage Manager routine thus provides an atomic test-and-set. This guarantees that another application has not changed the location of a Layer Name unexpectedly.

Figure 9:
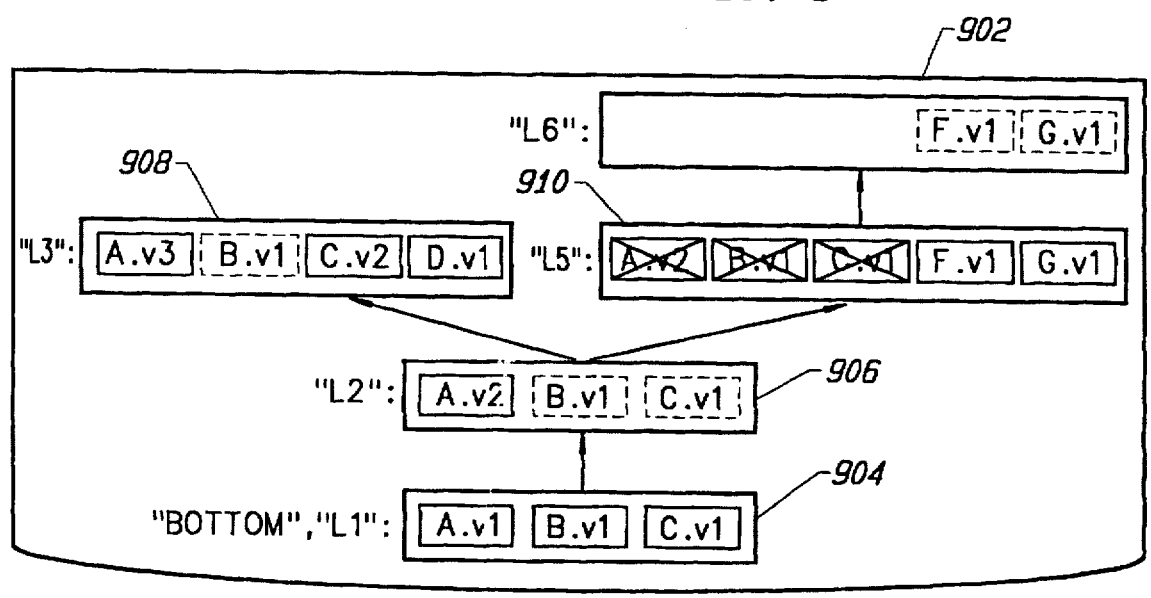

FIG. 9 is a diagram of what the Layers in a Pool 902 might look like. The "Bottom" Layer 904 of the Pool has two names: "L1" and "Bottom", and it has 3 Blops in it: A, B and C. Blop A is marked as a persistent Blop for the Pool in that Layer (noted in the diagram by the bold lettering). Layer L1 has one Layer 906 immediately above it: L2. In L2, Blop A has been changed to its second version, but the versions of B and C are unchanged, so the version they had in L1 is still visible (noted in the diagram by the dashed border). Layer L2 has 2 Layers 908 and 910 immediately above it: L3 and L5. L3 once again changes Blop A, but also changes Blop C and adds Blop D. Blop B is unchanged so that the version from Layer L1 is still visible. In Layer L5, Blops A, B, and C are deleted, Blops F and G are added, and F is marked as a persistent Blop. Thus the view of the Pool in L5 is completely disjoint of the one in L2 from which it is derived. Layer L6 is derived from L5, but no changes have been made in L6 yet so it can be referred to as an empty Layer.

Figure 1:
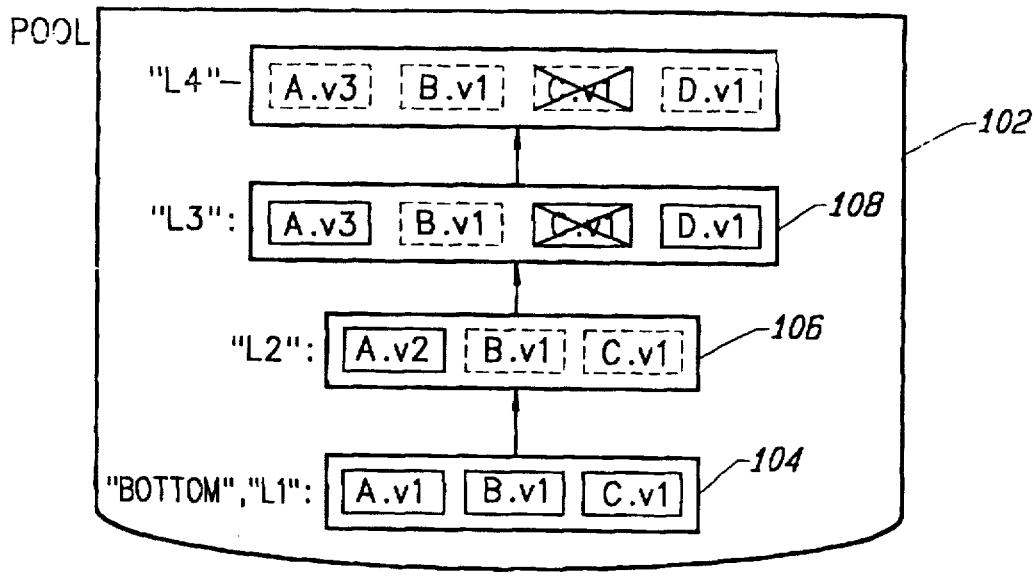
FIGS. 1–4 and 9 symbolically illustrate logical relationships between Layers in one or more Pools.
Figure 2:
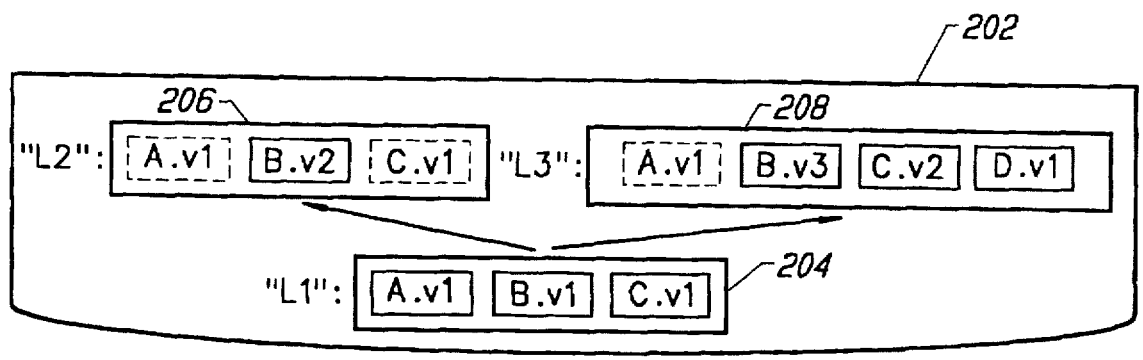
Figure 3:
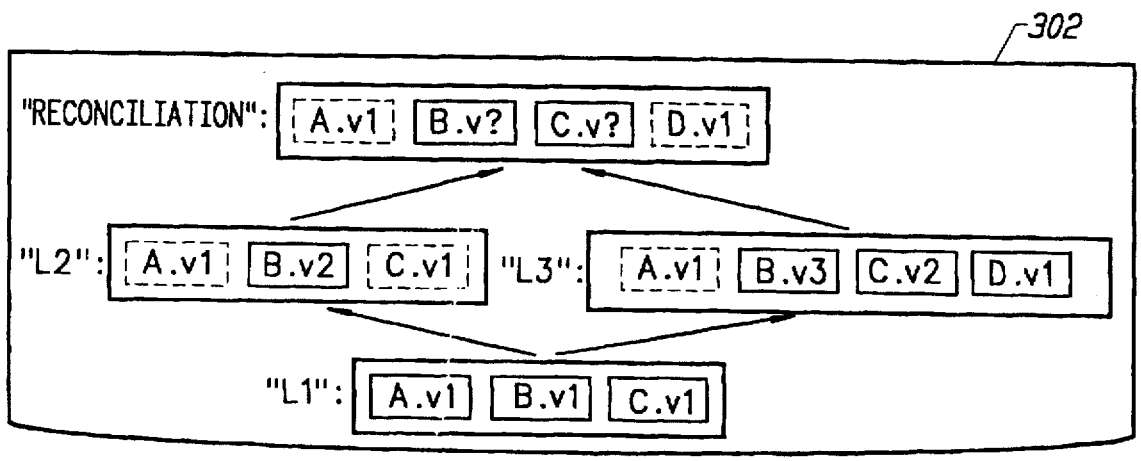

Reconciliation Layers are described above with respect to FIG. 3.

A basic rule observed by the Storage Manager in manipulating Blops in Layers is that it is illegal to change a Blop in a Layer in such a way as to change what is seen in any other Layer which is not directly involved in the operation. For instance, if the current Layer is below another Layer, it is illegal to create or change any Blops in the current Layer, since doing so would change what is seen in the next Layer without its "permission". Thus, in FIG. 3, Layers L1, L2, and L3 are effectively Read-Only.

If direct manipulation of Blops in Layers was the only way to change Blops, then the lower Layers in a Pool would be useful as only archives. However, this is not the case. The Storage Manager provides several operations which span several Layers; and since these operations "directly involve" multiple Layers, it becomes possible to make changes in base Layers as long as the application can successfully include all of the Layers which are derived from that base Layer. One such operation is SMMoveAllChangesDown which allows the changes which exist in one Layer to be moved down into Layers which is below it. As described above with respect to FIG. 6, SMMoveAllChangesDown from Layer A to Layer B makes Layer B have the same view of the Blops as Layer A, and makes all of the Layers above B up through A be empty so that they also have the same view.

Figure 6:
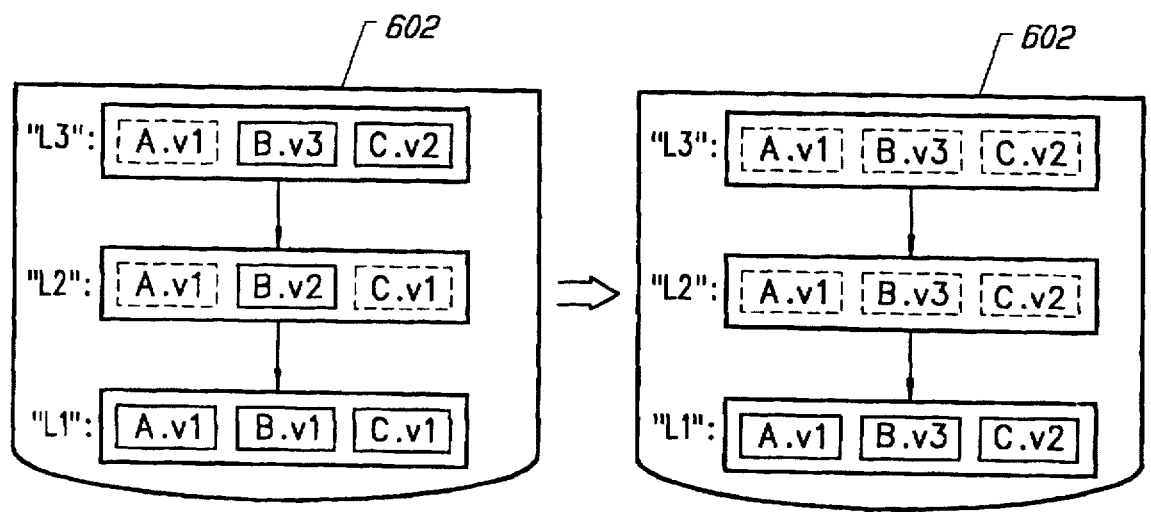

Note that the view of the Blops in L3 in the illustration of FIG. 6 is unchanged by this operation. This is always true of a SMMoveAllChangesDown: the view of the Layer being copied down from is never changed. The views of the Layers below it down to the Layer being copied down to are changed, and so the rule of manipulating Blops in Layers is invoked. Applying this rule, SMMoveAllChangesDown routine will not move changes down from Layer A to Layer B if there are any Layers which are transitively above B which are not either transitively below A or transitively above A.

Figure 10:
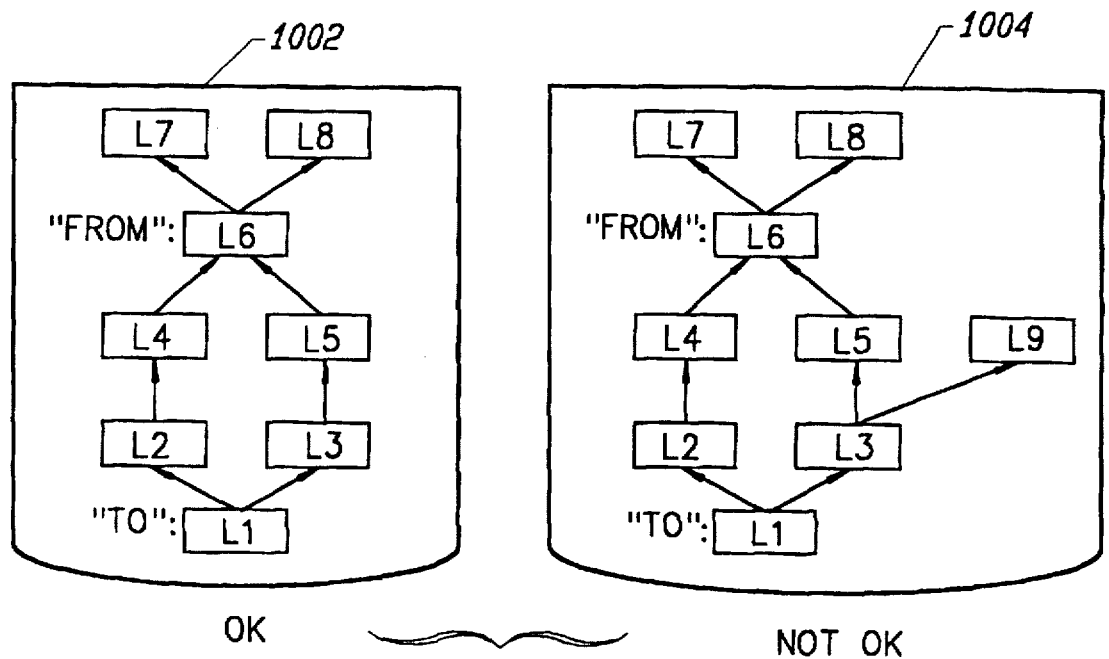

The operation of this rule can be seen more clearly in FIG. 10. Referring to FIG. 10, in Pool 1002, it is acceptable to SMMoveAllChangesDown from L6 to L1 since L2-L5 are all both (transitively) above L1 and (transitively) below L6, and since the operation will not change the view from L6, L7 and L8. In Pool 1004, however, it is not acceptable since L9 is above L1 but is not below L6. To apply the above-stated rule, the operation would change the view of L9 (by changing L3 and L1), but L9 is not directly involved in the operation. Thus the SMMoveAllChanges Down routine prohibits the operation.

Figure 7:
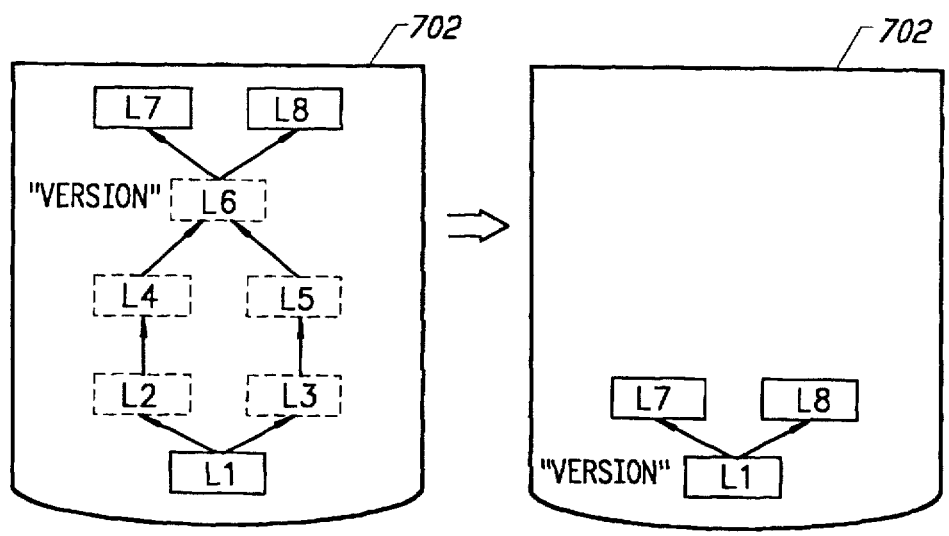

Another Storage Manager operation which spans Layers is the operation which is invoked by calling SMCleanUp with a kSMCCollapseLayers parameter code (hereafter simply CollapseLayers) which is used to eliminate unnecessary empty Layers in a portion of a Layer graph. The bottom Layers of Pools will not be eliminated. As can be seen from the previous examples, the aftermath of a SMMoveAllChangesDown routine is frequently a set of empty Layers which have no effect on what is seen from other Layers. CollapseLayers is used to eliminate such Layers. Specifically, CollapseLayers from Layer A to Layer B eliminates all empty Layers which are (transitively) above B and (transitively) below A, including Layer A, if empty. Any Names or non-empty Layers which are above Layers which are eliminated are moved down to the upper-most non-empty Layer which is below the eliminated Layer. An example of a CollapseLayers operation is shown in FIG. 7 and described above.

Figure 11:
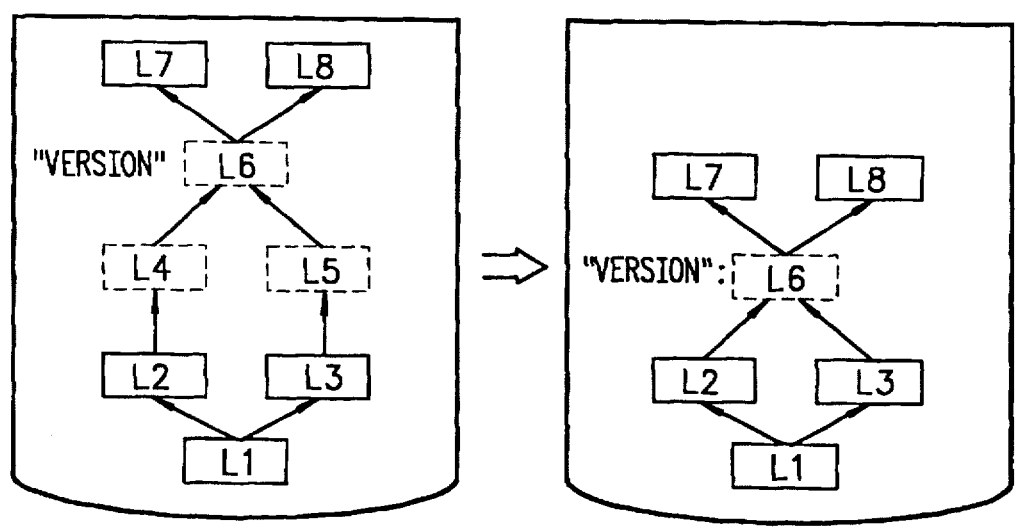

The only case in which CollapseLayers does not eliminate an Empty Layer is if doing so would force a name to be applied to more than one Layer. For instance, in the diagram of FIG. 11, empty Layer L6 is immediately above respective non-empty Layers L2 and L3. Since there is no Layer other than L6 to which the Name "version" could be applied and have it result in the same view of Blocks, so L6 can not be eliminated. The result of a CollapseLayers therefore is as shown in FIG. 11: empty Layers L4 and L5 are eliminated but empty Layer L6 remains immediately above Layers L2 and L3.

Figure 4:
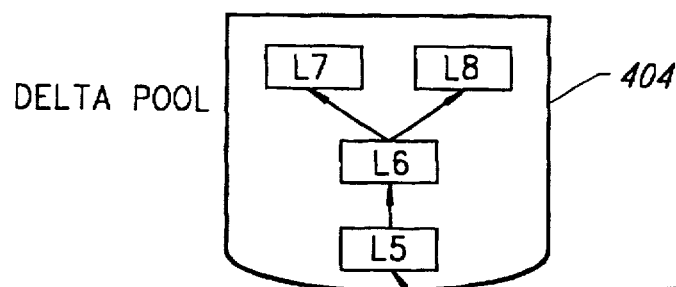
Figure 5:
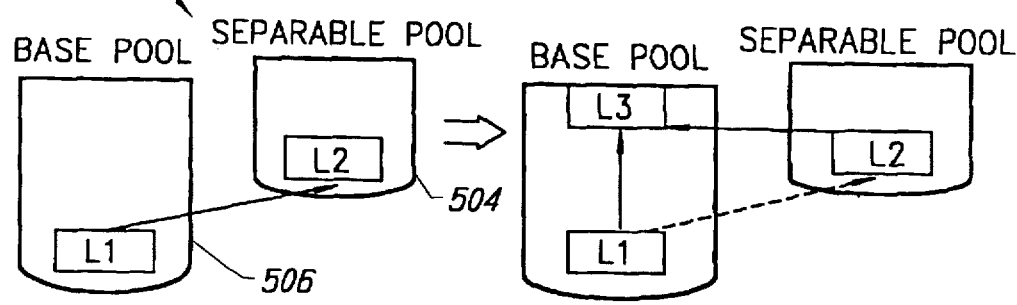
FIGS. 5–7, 10 and 11 symbolically illustrate operations which may be performed on Layers in a Pool.

Delta Pools are also supported by the Storage Manager described herein. Essentially, Delta Pools allow several Pools, perhaps on different media, to behave as if they were a single large Pool. In a Delta Pool, the one Bottom Layer of the Pool is actually derived from Layers in a second "Base" Pool. Thus the Layers in the Delta Pool act as a continuation of the Layer graph in the "Base" Pool. Note that this modifies the statement above that Blops exist in one and only one Pool. In fact, a Blop can exist in several Pools as long as they are part of the same Delta Pool graph. (Note that the different instantiations of the Blop still define different "versions" of the Blop.) FIG. 4, described above, illustrates an example of how the Layers in a Delta Pool and its base might be related. As described above, a given Base Pool may have any number of Pools connected to it. A Delta Pool can be connected to only one Base Pool, and its bottom Layer is derived from one Layer in the Base Pool. Attempting to access a Delta Pool causes an attempt to reconnect it to its base. If the base has not changed since the Delta Pool was last connected the Delta Pool can be used. If the Base Pool has changed an exception will be raised and it will have to be manually reconnected using SMReconnectPool.

When reconnecting a Delta Pool, reconciliation might need to occur due to changes in the base. Reconciliation of Delta Pools is handled by a Reconciliation Handler which is supplied as part of the Storage Manager, but which can be replaced with an application specific Handler.

Separable Pools are also supported by the.Storage Manager described herein. Separable Pools are very similar to Delta Pools, but have some additional functionality. Separable Pools are used to separate a Layer of a document from a work group environment. Generally, all of the Blops visible from a selected base Layer will be copied up into the bottom Layer of a newly created Separable Pool. This Pool usually exists in a separate Container and can be opened/ accessed without the original Pool/Container being available. After changes are made the Separable Pool can be reintegrated and the user's changes can be reconciled against the Base Pool as changed by other members of the work group.

When reintegrating a Separable Pool reconciliation more than likely will need to occur due to changes in the base and the Separable Pool. Reconciliation of Separable Pools is handled by a supplied Reconciliation Handler that can be replaced with an application specific Handler.

In addition to the above, an embodiment of a Storage Manager can also support Property Prototypes to allow for the creation of prototypes of Properties and their Values. Upon instantiation of a Property that has a Property Prototype the initial Values would be set according to the Prototype. Property Prototypes can be used by multiple instantiations of the Properties with minimum duplication of structure.

A Storage Manager can also support Transactions, which can be started then selectably aborted or committed. These calls expand the guarantee of atomicity from single Layer manipulation calls to multiple calls, e.g. SMMoveAllChangesDown in multiple disjoint Pools.

II. Storage Manager ROUTINES

The logical data structure described above itself provides many advantages over prior structures for storing data in data storage apparatus. Set forth below are a number of routines which are unique in themselves and which also facilitate the use of the above-described data structure. The routines may be provided as part of a Storage Manager product, the data structure being created on an individual computer system as a result of a user's execution of these routines.

Before describing the routines, it will be useful to set forth C language definitions of various constants and data types which are used in the routines:

```
© 1992 Apple Computer
Constants define SMUnderined OL;           /* ignore parameter value */
define SMUIPFileContHandler "fch";/* provided container handler */
#define SMDefaultReconcileHandler "drh";  /*   provided default
          reconcile handler */
#define SMBPVAccessorIteratorHandler "bpva";  /*  provided iterator
          handler */
#define SMStructuredNameIteratorHandler "snit";  /*  provided
          iterator handler */
#define SMBlopIdIteratorHandler "bidi";   /*  provided iterator
          handler */
Data Types typedef void *SMBPVAccessor;    /* blop, property and value context
          pointer */
typedef char *SMStructureName;   /* structured name */
typedef Size SMSize;             /* generic size of data typedef */
typedef void *SMCPLAccessor;    /* container, pool and layer context
          pointer */
typedef SMCount SMValueIndex;   /* index of a value in a property */
typedef SMStructureName SMPoolName;     /* required for a pool */
typedef SMStructureName SMLayerName;    /* optional for a layer */
typedef unsigned long SMBlopId;     /* persistent reference */
typedef unsigned long SMCount;      /* generic count typedef */
typedef void *SMStream;          /* stream value pointer */
typedef long SMStreamPos;        /* value stream position */
typedef void *SMContSpec;        /* fully defines a container */
typedef void *SMIterator;        /* no guarantee of how stored */
typedef char *SMHandler;         /* storage manager handler names */
typedef SMHandler SMContHandler;    /* name of container handler */
typedef SMHandler SMReconcileHandler;  /* reconcile handler name */
typedef SMHandler SMIteratorHandler;    /* iterator handler name */
typedef void *SMIterItemPtr;     /* pointer to an individual item */
typedef const enum {
         /* access mode: */
     kSMAReadOnly    = 0x001;   /* no update allowed */
     kSMAReadWrite   = 0x002;   /* changes allowed */
         /* special cpl access mode: */
     kSMATransient   = 0x003;   /* no internal access allowed */
} SMAccessorKind;
typedef const enum {
     kSMMIType       = 0x01;   /* type meta-information */
     kSMMIProperty   = 0x02;   /*property meta-information */
} SMMetaInfoKind;
typedef const enum {
         /* error returns: */
     kSMMRContNotFound   = (−6); /* container was not found */
     kSMMRPoolNotFound   = (−5); /* pool was not found */
     kSMMRLayerNotFound  = (−4); /* layer was not found */
     kSMMRBlopNotFound   = (−3); /* blop was not found */
     kSMMRPropNotFound   = (−2); /* property was not found */
     kSMMRValueNotFound  = (−1); /* value was not found */
     kSMMRNoMovement     = 0x00; /* no movement necessary */
         /* success returns: */
     kSMMRChild      = 0x01; /* a child was positioned to */
     kSMMRparent     = 0x02; /* a parent was positioned to */
     kSMMRSibling    = 0x04; /* a sibling was positioned to */
     kSMMRDisjoint   = 0x08; /* disjoint positioning occurred */
         /* return modifiers: */
     kSMMRWrap       = 0x100; /* a wrap occurred */
} SMPositionResult;
typedef const enum {
     kSMPUndefined  = 0x00;     /* set to undefined */
     kSMPSame       = 0x01;     /* leave where it is */
     kSMPFirstSib   = 0x02;     /* first of the given kind */
     kSMPLastSib    = 0x03;     /* last of the given kind */
     kSMPNextSib    = 0x04;     /* next of the given kind */
     kSMPPrevSib    = 0x05;   /* previous of the given kind */
```

```
        kSMPFirstBelow      = 0x06;    /* first below of current kind */
        kSMPLastBelow       = 0x07;    /* last below of current kind */
        kSMPFirstAbove      = 0x08;    /* first above of the given kind */
        kSMPLastAbove       = 0x09;    /* last above of the given kind*/
        /* modifiers */
        kSMPMWrap           = 0x10;    /* allow wrapping */
        kSMMNoTypes         = 0x20;    /* skip type meta info blops */
        kSMMNoProperties    = 0x40;    /* skip property meta info blops */
        kSMMNoBlops         = 0x80;    /* skip normal blops */
} SMPositionCode;
typedef const enum {
        kSMBFalse           = (0);     /* false boolean */
        kSMBTrue            = (-1);    /* true boolean */
} SMBoolean;       /* generic boolean typedef */
typedef const enum {
        kSMCIgnore          = 0x01;    /* ignore cycle */
        kSMCSkip            = 0x02;    /* skip duplicate blop */
        kSMCError           = 0x03;    /* raise cycle exception */
} SMSearchOption;
typedef const enum {
        kSMRLBlockSwappable = (-5);    /* most likely to be purged */
        kSMRLBlockNormal    = 0;       /* average chance - default */
        kSMRLBlockRetain    = 5;       /* will not be purged */
} SMRetentionLevel;
typedef const enum {
        kSMSSeekSet         = 0x00;    /* seek from beginning of value */
        kSMSSeekCur         = 0x01;    /* seek from current position in value */
        kSMSSeekEnd         = 0x02;    /* seek from end of value */
} SMStreamSeekCode;
typedef const enum {
        kSMCDisposeInconsistent = 0x01; /* disposes of inconsistent
                                            layers */
        kSMCCollapseLayers      = 0x02; /* collapses all layers
                                            possible */
        kSMCGarbageCollectPool  = 0x04; /* garbage collects pool */
        kSMCCompactContainer    = 0x08; /* compact container */
} SMCleanupCode;
typedef const enum {
        kSMRConflictingChange       = 0x01;  /* blops different */
        kSMRBaseLayerNameMoved      = 0x02;  /* name moved/gone */
        kSMRNewBlopInBase           = 0x04;  /* new blop in base */
        kSMRDisposeOBlopInBase      = 0x08;  /* blop gone in base */
        kSMRNewNameInSeparable      = 0x10;  /* new name in sep */
        kSMRNewBlopInSeparable      = 0x20;  /* new blop in sep */
        kSMRDisposedBlopInSeparable = 0x40;  /* blop gone in sep */
        kSMRLayerNameCleanUp        = 0x80;  /* same layer name */
        kSMRMAll                    = 0xFF;  /* all operators */
} SMReconcileOperator;
typedef const enum {
        kSMBOBigEndian      = 0x00;    /* big endian byte order */
        kSMBOLittleEndian   = 0x01;    /* little endian byte order */
} SMByteOrder;
typedef struct {
        FSSpec     fsSpec;          /* hfs file specification */
        char       permission;      /* open permission to file */
        OSType     creator;         /* creator of file-used on create */
        OSType     fileType;        /* file type of file-used on create */
        ScriptCode scriptTag;       /* document name script-used on
                                        create */
        SMBoolean  dataFork;        /* store data in data or resource fork */
} SMFileSpec;
typedef struct {
        SMIteratorHandler iterHandler;
        long       reserved;        /* reserved for future use */
        union    {
                Ptr       pointer;
                SMCount   index;
                Size      offset;
        } current;                  /* how current is accessed */
        void       *storage;        /* storage area for iterator */
        SMSize     itemSize;        /* size of current item */
        SMCount    itemCount;       /* count of current items */
} SMIter, *SMIterPtr;
typedef const enum {
        /* operator:           parameters: */
        kSMIterCreate;    /* SMIterPtr */
        kSMIterAdd;       /* SMIterPtr, const SMIterItemPtr, Boolean */
        kSMIterRemove;    /* SMIterPtr, const SMIterItemPtr */
        kSMIterFirst;     /* SMIterPtr, SMIterItemPtr */
        kSMIterLast;      /* SMIterPtr, SMIterItemPtr */
```

```
        kSMIterNext;         /* SMIterPtr, SMIterItemPtr */
        kSMIterPrev;         /* SMIterPtr, SMIterItemPtr */
        kSMIterCount;        /* SMIterPtr, SMCount * */
        kSMIterGetIndex;     /* SMIterPtr, SMCount, SMIterItemPtr */
        kSMIterSetIndex;     /* SMIterPtr, SMCount, const SMIterItemPtr */
        kSMIterRemoveIndex;  /* SMIterPtr, SMCount */
        kSMIterGetSize;      /* SMIterPtr */
        kSMIterDelete;       /* SMIterPtr */
        kSMIterAdjust;       /* SMIterPtr */
} SMIteratorOperator;
typedef struct {
        SMSize *freeSpace;   /* free space in accessor's heap */
} SMWSReadOnlyInfo;
typedef struct {
        THz *theHeap;              /* heap to allocate from */
        SMSize *maxMemory;         /* maximum memory to use */
        SMCount *BlopCacheCount;   /* number of blops to cache */
} SMWSReadWriteInfo;
typedef struct {
        SMAccessorKind *aKind;              /* kind of bpv accessor */
        SMAccessorKind owningCPLAKind;      /* owning kind to create */
        SMCPLAccessor *owningContext;       /* owning cpl accessor */
        SMMetaInfoKind *mKind;              /* kind if meta-info blop */
        SMSize maxPropertyNameSize;         /* max size for prop name */
        SMStructureName propertyName;       /* name of property */
        SMSize maxTypeNameSize;             /* max size for type name */
        SMStructuredName typeName;          /* name of type */
        SMValueIndex *valueIndex;           /* current value index */
        SMBoolean *embeddedIds;             /* are there embedded ids? */
        SMByteOrder *byteOrder;             /* byte order of value */
} SMBPVReadOnlyInfo;
typedef struct {
        SMBoolean *persistent;              /* whether persistent **/
        SMRetentionLevel *retention;        /* blop cache control */
} SMBPVReadWriteInfo;
typedef struct {
        SMAccessorKind *aKind;              /* kind of cpl accessor */
        SMFileSpec *theFile;                /* associated file spec */
        SMAccessorKind basePoolAKind;       /* accessor kind to create */
        SMCPLAccessor *basePool;            /* for delta and separable */
        SMIterator layerNames;              /* current set of layer */
} SMCPLReadOnlyInfo;
typedef struct {
        SMSize *contInfoSize;               /* size of container info */
        void *contInfo;                     /* app container info */
        SMSize *maxPoolNamesize;            /* pool name buffer size */
        SMStructuredName poolName;          /* pool name */
        SMSize *poolInfoSize;               /* size of pool info */
        void *poolInfo;                     /* app pool info */
        SMBoolean *consistent;              /* whether layer consistent */
} SMCPLReadWriteInfo;
```

In addition to the above typedefs, set forth below are the C language typedefs for a CPL Accessor and a BPV Accessor:

```
// Container/Pool/Layer Accessor or CPLAccessor
typedef struct {
        smContSpecHdl contSpec;     // Container specification
        BALCRef balcRef;            // Reference to persistent storage
        PMANPoolRef poolRef;        // Pool being referenced (if any)
        PMANLayerRef layerRef;      // Layer being referenced (if any)
        SMBPVAccessor bpva;         // Reference to a collection of
                                    // BPVAccessors associated with
                                    // this Layer (if any)
        SMAccessorKind permission;  // Access Permission to the Layer
        SMCPLAccessor nextBaseLayer; // Base Layer to this Layer
        SMStructuredName poolName;  // Currept Pool name (if it exists)
        SMStructuredName layerName; // Current Layer name (if it exists)
} CPLA;
// Blop/Property/Value Accessor or BPVAccessor
typedef struct {
        SMAccessorKind kind;        // type of accessor
        SMCPLAccessor layer;        // Layer that the accessor is created
        SMMetaInfoKind mKind;       // meta info
        SMValueIndex curValue;      // Index to the current Value
        SMStructuredName curProperty; // Name of the current Property
        SMBlopId bid;               // Persistent ID of the Blop
        PDBHandle PDB;              // Reference to Persistent Storage for Properties
        DDBHandle DDB;              // Reference to Persistent Storage for Values
        SMBPVAccessor indirectValue; // Reference to another
                                     // BPVAccessor for a remote value
        SMBPVAccessor indirectedFrom; // BPVAccessor currently
                                     // referencing this one (if
                                     // this BPVAccessor is referring
                                     // to a remote value)
} BPVA;
```

Also before describing the individual routines, it will be useful to understand certain runtime concepts which the routines use. In particular, two kinds of Accessors are used to move about the hierarchies which the Storage Manager manages. BPV Accessors are used to designate the context of a Blop. A BPV Accessor defines a current Blop, Property and Value. CPL Accessors designate the context of a Container. A CPL Accessor defines a current Container, Pool and Layer. BPV Accessors are inherently owned by a CPL Accessor which defines the Layer being used to access the designated Blop. Both of these Accessors share some common functionality. They can be used to iterate through all of their corresponding contexts. For example, a BPV Accessor can iterate over all Properties within a Blop, and all Values within a Property. BPV and CPL Accessors can also be re-targeted to different Blops and Containers. This allows for all Blops within a Layer to be reached.

Accessors are not persistently stored. They are used by an application to dynamically access the storage space maintained by the Storage Manager. For example, when attempting to access a particular Value of a Blop a BPV Accessor is given as the parameter that defines the Value. The BPV Accessor defines the context of the Value that is to be manipulated.

CPL Accessors define an in-memory Workspace. This defines the heap, cache sizes, etc. where the Storage Manager allocates BPV Accessors and any other CPL Accessor memory allocations necessary for its routines. There is a default Workspace that can be set at initialization that will be used by a CPL Accessor if a specific Workspace is not defined for it.

In addition to the above, it will be helpful to note that there are some routines within the Storage Manager that require a set of elements to be passed. For this reason the Storage Manager provides a robust Iterator mechanism that allows for the definition of sets of elements. The Iterator mechanism is generic and allows for the application program to define sets. Iterators returned by Storage Manager routines are snapshots of the current state, and cannot be used to indirectly change the state. For example, SMOwnedBPVAccessors returns an Iterator that contains all of the BPV Accessors that belong to a given CPL Accessor. Removing items from the Iterator has no effect on the BPV Accessors owned by the CPL Accessor, only the Iterator is changed.

The Storage Manager includes the following application program interface calls.

A. Initialization

```
void SMInit(SXWSReadWriteInfo *rwInfo);
```

Initializes the Storage Manager environment and sets the default Workspace info for CPL Accessors.

B. BloD Identification

```
void SMBindBlopName(SMBPVAccessor blop, const SMStructuredName theName);
```

Binds the given name to the Blop designated by the given Accessor. Binding a name to a Blop that already has a name bound to it, or to a Meta Information Blop, is not allowed.

```
void SMUnBindBlopName(SMCPLAccessor layer, const SMStructuredName theName);
```

Removes any name associated with the Blop within the context of the given Layer. This routine is not valid for Meta Information Blops.

```
SMSize SMGetBlopName(SMBPVAccessor blop, SMSize maxSize, SMStructuredName theName);
```

Returns the name associated with the Blop designated by the given Accessor, if one exists. The size returned is the number of bytes copied into the name parameter. A size of zero indicates that no name is associated. Passing kSMUndefined for the name causes the return of the actual length of any associated name.

```
SMBPVAccessor SMBPVAccessorFromName(SMCPLAccessor
    layer, const SMStructuredName theName, SMAccessorKind
    aKind);
```

Returns the Accessor that designates the Blop that the given name is bound to in the Layer as designated by the given Accessor. A new BPV Accessor is created, of the given kind, that designates the Blop and then is returned. The Blop may be either a normal Blop or a Meta Information Blop.

```
SMBlopId SMGetBlopId(SMCPLAccessor layer, SMBPVAccessor
    blop);
```

Given a Blop within a given Layer the persistent Blop identifier (Blop Id) is returned. This Id can safely be embedded within another Blops' Value data to create a persistent link. A Blop Id requires a Layer context to be useful, but with a given Pool a Blop will maintain its Id indefinitely, which means that within any Layer in the Pool the Blop will have the same Id.

C. BPV Accessors

```
SMBPVAccessor SMNewBPVAccessor(SMAccessorKind aKind,
    SMCPLAccessor layer, const SMStructuredName blopName,
    SMBlopId blopId, const SMStructuredName propertyname,
    SMValueIndex valueIndex, const SMStructuredName type-
    Name);
```

Allocates an Accessor to Blop data. Whether or not changes may be made to the data designated by this kind of Accessor is based on the BPV Accessor Kind created. All of the parameters other than BPV Accessor Kind are optional, and are used to set the initial Accessor location. To define the initial Blop that the Accessor is designating, Layer and blopName, or Layer and blopId must be specified. Names always take precedence. To define the initial Property of the initial Blop the propertyName must be specified. The initial Value of the initial Property can be specified either by the valueindex or by the Type of the Value. If specified by Type, then the first Value Index with the given Type will be designated. If any of the parameters are invalid, e.g. an invalid Blop name, an exception is raised.

Every BPV Accessor is created within the context of a CPL Accessor. In other words, a CPL Accessor owns all the BPV Accessors created using it. BPV Accessors cannot be shared even among different CPL Accessors of the same process.

```
voidSMDisposeBPVAccessor(SMBPVAccessor accessor, SMBoolean commit);
```

Dispose of the indicated BPV Accessor. Any changes made with a ReadWrite BPV Accessor to Blop data are committed if commit is kSMBTrue. If commit is kSMBFalse any changes made to the Blop data are aborted. commit is ignored for ReadOnly BPV Accessors.

```
void SMTransformBPVAccessor(SMBPVAccessor accessor,
    SMAccessorKind aKind, SMBoolean commit);
```

Transforms a BPV Accessor from one kind to another. If transforming from ReadOnly to ReadWrite the BPV Accessor must be the only Accessor designating the Blop. When transforming from ReadWrite to ReadOnly any changes are committed if commit is kSMBTrue. If commit is kSMB-False any changes made to the Blop data are aborted. commit is ignored for ReadOnly transformation to ReadWrite.

```
SMBPVAccessor SMRetargetBPVAccessor(SMBPVAccessor
    accessor, SMAccessorKind aKind, SMBoolean commit, SMPo-
    sitionCode blopPosition, SMBoolean samePropertyName,
    SMBoolean samevalueIndex, SMBoolean sameTypeName,
    SMCycleCode cyclecode);
```

Re-targets a given BPV Accessor, to a potentially different Blop, based on the given Blop position code. The given Accessor is re-targeted, if the given Accessor Kind is SMUndefined, or a new BPV Accessor is created, of the given kind, and is set to designate the Blop targeted. When re-targeting from a child Blop to a parent with a ReadWrite BPV Accessor the changes made are committed or aborted based on the given commit parameter. The cycleCode determines the result of targeting a Blop that has already been previously reached with the given BPV Accessor. If samePropertyName, sameValueIndex, or sameTypeName are kSMBTrue then the Accessor returned will attempt to designate the same Property as the original, by name, the same Value as the original, by Index or by name. If the attempt to keep the same designated Property or Type fails the corresponding portion of the returned BPV Accessor will be undefined.

Embedded Blop Ids within a Value are considered the current children of a Blop. When positioning to kSMPFirstBelow the first Embedded Blop Id within the current Value is the Blop that is targeted. The Blop Id is resolved within the same Layer as the current Blop, or within the same Layer as the Remote Blop if it is an Indirect Blop. Re-targeting to kSMPFirstAbove or kSMPLastAbove with such an Accessor would resolve back to the Value that was used to find the child. When performing a retargeting to kSMPNextSib the next Embedded Blop Id of the parent is used. If the Blop has no parent, i.e. was positioned to by name, kSMPNextSib positions to the next Blop owned by the Layer. The valid position codes are as follows:

| Parameter: blopPosition | |
|---|---|
| Valid Position Code | Meaning |
| kSMPUndefined | set Blop to undefined |
| kSMPSame | stay on same Blop |
| kSMPFirstSib | goto first Blop on same level |
| kSMPLastSib | goto last Blop on same level |
| kSMPNextSib | goto next Blop on same level |
| kSMPPrevSib | goto prev Blop on same level |
| kSMPFirstBelow | goto first child of Blop |
| kSMPLastBelow | goto last child of Blop |
| kSMPFirstAbove | goto parent Blop (same as kSMPLastAbove) |
| kSMPLastAbove | goto parent Blop (same as kSMPFirstAbove) |
| kSMPMWrap | allow wrapping |
| kSMPMNoTypes | skip Type Meta Information Blops |
| kSMPMNoProperties | skip Property Metal Information Blops |
| kSMPMNoBlops | skip normal Blops |

```
SMPositionResult SMPositionBPVAccessor(SMBPVAccessor
    accessor, const SMStructuredName propertyName, SMPosition-
    Code propPosition, SMValueIndex targetIndex, SMPosition-
    Code indexPosition, SMBoolean sameType);
```

Repositions a given BPV Accessor within a Blop returning the status of the positioning. The return Value, if positive, indicates how the new location of the Accessor is related to the previous location; and if negative, it indicates how far SMPositionBPVAccessor was able to proceed with this process before an error was detected. On failure, the Accessor is left pointing at the closest Property and Value it could find to the ones requested that still satisfies the given parameters. All of the parameters other than the first Accessor are optional, and are used to reset the Accessor location. If a Property name is given the corresponding position code is ignored. If a Value Index is given the corresponding position code is ignored.

The routine positions Property first, either by name or by relative to current Property. The Value is next positioned, by either the given Index or relative to the current Index. The given sameType flag attempts to impose a filter on the Indexes that will be designated. If sameType is kSMBTrue then for example, positioning to the kSMPNextSib Index will attempt to position to the next Value Index with the same Type as the current Index. If the Property is changed, and the Index position code given is relative to current, the Value Index positioned to will be the current Index plus the position code. For example, we are positioned to Value Index four of a Property. The Property is changed by kSMPNextSib and the Value Index is changed by kSMPNextSib. The Property is positioned to the next Property of the Blop. The Index positioned to will be Value Index five, if such an Index exists within the next Property. If it does not, the Value Index will be the highest Index available since that would be the closest that could be found. The valid position codes for each position code argument are as follows:

| Parameter: propPosition | |
|---|---|
| Valid Position Code | Meaning |
| kSMPUndefined | set Property to undefined |
| kSMPSame | stay on same Property |
| kSMPFirstSib | goto first Property |
| kSMPLastSib | goto last Property |
| kSMPNextSib | goto next Property |
| kSMPPrevSib | goto previous Property |
| kSMPMWrap | allow wrapping |

| Parameter: indexPosition | |
|---|---|
| Valid Position Code | Meaning |
| kSMPUndefined | set Index to undefined |
| kSMPSame | stay on same Index |
| kSMPFirstSib | goto first Index |
| kSMPLastSib | goto last Index |
| kSMPNextSib | goto next Index |
| kSMPPrevSib | goto previous Index |
| kSMPMWrap | allow wrapping |

```
SMCount SMCountBPVAccessor(SMBPVAccessor accessor,
    SMPositionCode propertyPosition, SMPositionCode indexPosi-
    tion, SMBoolean sameType);
```

Returns the number of times that the given Accessor could be moved according to the parameters before stopping. The wrap position code modifier is not allowed for any given position code. The parameters are interpreted the same as in the SMPositionBPVAccessor routine. With this routine it is easy to determine the number of Properties in a Blop, the number of Values in a Property, the number of Values of a given Type within a Property, etc.

```
void SMSetPreferredPosition(SMBPVAccessor accessor);
```

Sets the preferred position for the given Blop as indicated by the given Accessor. Whenever a SMBPVAccessor is created for this Blop with undefined parameters, it is automatically positioned at this location.

```
SMBPVAccessor SMCloneBPVAccessor(SMBPVAccessor accessor);
```

Creates a duplicate of the given BPV Accessor. Only ReadOnly Accessors can be cloned since two ReadWrite Accessors are not allowed to be targeting the same Blop.

```
void SMGetBPVAccessorInfo(SMBPVAccessor accessor, SMBPVReadOnlyInfo *roInfo, SMBPVReadWriteInfo *rwInfo);
```

Returns the details of what the given BPV Accessor designates. kSMUndefined may be passed as arguments to parameters that are not wanted. kSMUndefined will be returned for elements that are undefined.

```
void SMSetBPVAccessorInfo(SMBPVAccessor accessor, SMBPVReadWriteInfo *rwInfo);
```

Sets the details of the Blop designated by the given BPV Accessor. The default for persistent in SMBPVReadWriteInfo is kSMBTrue.

D. Blop Creation and Removal

```
SMBPVAccessor SMCreateBlop(SMCPLAccessor layer, SMAccessorKind aKind);
```

Creates a new Blop. The Blop is instantiated in the Container, Pool and Layer designated by the given CPL Accessor. A new BPV Accessor, of the given kind, is created that designates the new Blop and then is returned.

```
SMBPVAccessor SMCreateMetaInfoBlop(SMCPLAccessor layer, const SMStructuredName theName, SMMetaInfoKind mKind, SMAccessorKind aKind);
```

Creates a new Meta Information Blop. The Meta Information Blop, of the given Meta Information kind, is instantiated with the given name in the Container, Pool and Layer designated by the given CPL Accessor. A new BPV Accessor, of the given kind, is created that designates the new Meta Information Blop and then is returned.

```
void SMIndirectBlop(SMBPVAccessor localBlop, SMBPVAccessor remoteBlop, SMCPLAccessor remoteLayer, const SMStructuredName remoteBlopName);
```

Changes an existing Blop into an Indirect Blop which resolves into the Blop indicated by either a remoteBlop or a remoteLayer/remoteBlopName combination. If only remoteBlop is provided, then the Indirection Blop resolves itself by Id. If remoteLayer and remoteBlopName are provided then the Blop is resolved by Name. This routine is valid for Meta Information Blops as well as normal Blops. Any existing Properties are removed from the localBlop. This routine is only valid with a ReadWrite BPV Accessor.

```
SMBPVAccessor SMGetindirectBlopInfo (SMBPVAccessor localBPVAccessor, SMBPVAccessor remotevalue);
```

Gets information about which Blop a particular, presumably Indirect, Blop resolves into. localBPVAccessor identifies the possible Indirect Blop. remotevalue is repositioned to refer to the target Blop before being returned. This is an optional parameter and if not given the localBPVAccessor is retargeted to the target Blop. If localBPVAccessor does not refer to an Indirect Blop, then remotevalue is positioned to the same Blop. This routine is only valid with a ReadOnly BPV Accessor.

```
SMBPVAccessor SMCloneBlop(SMCPLAccessor destCPLAccessor, const SMStructuredName destName, SMBPVAccessor sourceBPVAccessor, SMAccessorKind aKind);
```

Creates a copy of the Blop indicated by sourceBPVAccessor in the Layer indicated by destCPLAccessor and returns a new BPV Accessor, of the given kind, that refers to the copy. If the Blop being cloned currently has a bound name it will have the same name in the destCPLAccessor. A new name may be set by passing destName. The resulting new Blop is an exact copy of the original Blop, except for any Embedded Blop Ids it may contain in its Values. Embedded Blop Ids from the original may need to be changed if the source and destination Layers are in different Pools, and the routine may need to create Indirect Blops in the destination Layer which resolve into the Blops referred to by the Embedded Blop Ids in the original. If the destination Layer is the same as the original Blop, which can be designated by passing kSMUndefined for destCPLAccessor, and the original Blop is named its clone will have no name unless one is given for it.

This routine is valid for Meta Information Blops as well as normal Blops.

```
void SMRemoveBlop(SMBPVAccessor blop);
```

Removes a Blop designated by the given Accessor. The BPV Accessor is left in an undefined state. No other BPV Accessors can be targeted at the given Blop.

E. Value Manipulation

```
SMBPVAccessor SMCreateValue(SMBPVAccessor blop, const SMStructuredName propertyName, SMValueIndex valueIndex, const SMStructuredName typeName, SMAccessorKind aKind);
```

Creates a new Value for the designated Blop, of the given Type in the given Property at the given Value Index. propertyName, valueindex, and typeName are optional; if any of them is kSMUndefined the corresponding attribute of the Value will be derived from the corresponding attribute of the BPV Accessor. In this case the appropriate elements must be defined on the BPV Accessor.

If propertyName is not kSMUndefined, then a new Property (if necessary), with the given name is added that contains no Values. The new Value is specified by Index and will be of the given Type. Indexes are not sparse, so the Value Index, if passed, must be between one and one more than the current last Index. New Value entries never overwrite existing entries, they are inserted before the Value at the given Index and all other entries are pushed up one entry.

If kSMUndefined is given for the Accessor Kind, the given Accessor is repositioned to designate the new Value and returned. Otherwise a new BPV Accessor is created, of the given kind, and then is returned. The Value at this point has no associated data. The Value data is set with SMWriteValueData, SMInsertValueData, or implicitly by SMIndirectValue or SMCreateContainer (to create an embedded Container).

The Type Meta Information Blop that typeName refers to must exist prior to calling this routine. The Property Meta Information Blop that propertyName refers to does not need to exist prior to calling this routine. If the Property Meta Information Blop does not exist one will automatically be created. In this case the propertyName given must be unique within the Pool.

SMSize SMGetValueSize(SMBPVAccessor value);

The size of the Value data designated by the given BPV Accessor is returned.

void *SMGetReadOnlyValuePtr(SMBPVAccessor value, SMSize *length);

A pointer to the Value data designated by the given BPV Accessor is returned. If the length parameter is not kSMUndefined the size of the Value data is returned. The pointer which is returned by this routine is valid until either the given Accessor (or its clone) is removed or repositioned from the current Blop. Every attempt will be made to return a pointer to the actual data to minimize copying of data. This routine is only valid with a ReadOnly BPV Accessor.

SMSize SMReadValueData(SMBPVAccessor value, void *buffer, SMSize offset, SMSize maxSize);

The Value data designated by the given BPV Accessor and offset is copied into the buffer given up to maxSize bytes. The length of the Value data that was actually copied is returned.

void SMWriteValueData(SNBPVAccessor value, void *buffer, SMSize offset, SMSize length);

The Value data designated by the given BPV Accessor is changed to the data from the given buffer beginning at offset from the beginning of the Value. The Size of the buffer is passed. If the buffer passed is kSMUndefined then the Value data is set to zeroes from offset to offset plus length. This routine is only valid with a ReadWrite BPV Accessor.

void SMInsertValueData(SMBPVAccessor value, void *buffer, SMSize offset, SMSize length);

The data from the given buffer is inserted into the Value designated by the given BPV Accessor at offset from the beginning of the Value. The Size of the buffer is passed. If the buffer passed is kSMUndefined then the Value data is set to zeroes from offset to offset plus length. The resulting Value data will be length bytes longer. This routine is only valid with a ReadWrite BPV Accessor.

void SMRemoveValueData(SMBPVAccessor value, SMSize offset, SMSize length);

The Value data, designated by the given BPV Accessor, starting at the given offset for length bytes is removed from the Value. The resulting Value data is length bytes shorter. This routine is only valid with a ReadWrite BPV Accessor.

void SMRemoveValue(SMBPVAccessor value);

The Value designated by the given Accessor is removed from the enclosing Property. The Value attribute of the BPV Accessor is left undefined. Only the last Index can be disposed of since sparse multiple Values are not allowed. If the BPV Accessor is positioned at the third Index of a Property with five defined Indexes and this routine is made an exception will be raised. This routine is only valid with a ReadWrite BPV Accessor.

void SMRemoveProperty(SMBPVAccessor property);

The Property, and all of its Values, designated by the given Accessor are removed. The Property and Value attributes of the BPV Accessor are left undefined. This routine is only valid with a ReadWrite BPV Accessor.

void SMCloneProperty(SMBPVAccessor destBlop, SMBPVAccessor sourceProperty);

Make a copy of the Property indicated by sourceProperty (including all of its Values) at the location indicated by destBlop. The resulting new Property is an exact copy of the original Property, except for any Embedded Blop Ids it may contain in its Values. Embedded Blop Ids from the original may need to be changed if the source and destination Layers are in different Pools, and the routine may need to create Indirect Blops in the destination Layer which resolve into the Blops referred to by the Embedded Blop Ids in the original. Any needed Meta Information Blops are cloned to the destination as well. This routine is only valid with a ReadWrite destination BPV Accessor.

void SMMarkEmbeddedBlopIds(SMBPVAccessor value, SMSize offset, SMCount count, SMBoolean setMark);

In most Values, the location of Embedded Blop Ids in the data are defined by the Type of -the Value. However, some uses of the Storage Manager require the structure of a Value to be variable, and therefore the location of Embedded Blop Ids are not well defined. In these cases this routine needs to be used to inform the Storage Manager of where Embedded Blop Ids are and are not stored. If setMark is kSMBTrue, this routine notes that the count longwords in the Value referred to by the BPV Accessor starting at offset contain Embedded Blop Ids. Likewise, if setMark is kSMBFalse, it notes that the indicated longwords do not contain Embedded Blop Ids. This routine is only valid with a ReadWrite BPV Accessor.

F. Value Indirection void SMIndirectValue(SMBPVAccessor localValue, SMBPVAccessor remoteValue, SMSize remoteOffset, SMSize remoteLength);

Changes an existing Value, indicated by localValue, into an Indirect Value which resolves into (at least part of) the Value indicated by remoteValue. If remoteOffset is not kSMUndefined, then only that part of the remote Value starting at the indicated offset is indirected to. If remoteLength is not kSMUndefined, then only that number of bytes of the remote Value are used. Any existing Value data is removed from the local Value. remoteOffset and remoteLength are automatically pegged to the end of the remote Value. This routine is only valid with a ReadWrite BPV Accessor.

```
void SMGetIndirectValueInfo(SMBPVAccessor localvalue, SMBP-
    VAccessor remoteValue, SMSize *remoteOffset, SMSize
    *remoteLength);
```

Gets information about which Value a particular, presumably Indirect, Value resolves into. localValue indicates the possibly indirect Value. remoteValue (if not kSMUndefined) is repositioned to refer to the Value localvalue resolves into, and remoteOffset and remoteLength (if not kSMUndefined) are filled in with the appropriate offset and length. If localValue does not refer to an Indirect Value, then remoteValue is repositioned to refer to the same Value as localValue and *remoteOffset and *remoteLength are set to kSMUndefined.

```
void SMChangeIndirectValue(SMBPVAccessor localValue,
    SMSize remoteOffsetChange, SMSize remoteLengthChange);
```

An existing Indirect Value indicated by localValue is changed to resolve into a different area of its Remote Value. remoteOffsetChange and remoteLengthChange are added to the current offset and length of the Indirect Value. The window on the Remote Value is automatically kept within the data of the Remote Value, i.e. the offset will be kept above zero and the offset plus the length won't extend past the end of the Value. This routine is only valid with a ReadWrite BPV Accessor.

G. Value Stream I/O

```
SMStream SMStreamOpen(SMBPVAccessor value);
```

Use SMStreamOpen to open the Value whose location is specified by the given BPV Accessor and associate a stream with it. The stream is opened with in ReadOnly or ReadWrite mode based on how the Accessor was acquired. If the Value is successfully opened, SMStreamOpen returns a pointer to a stream data structure that controls the stream.

```
int SMStreamClose(SMStream stream);
```

Use SMStreamClose to close the stream specified by stream. If the stream was open for writing, the content of the buffer associated with the stream is written to the Value ("flushed") before the Value is closed. If it was open for reading, unread data in the buffer are discarded.

```
SMSize SMStreamRead(void *ptr, SMSize size, SMSize count,
    SMStream stream);
```

Use SMStreamRead to read the number of data items specified by count, each of a size given by the argument size, from the current position in stream. The current position of stream is updated after the read. The SMStreamRead routine returns the number of items it successfully read.

```
SMSize SMStreamWrite(const void *ptr, SMSize size, SMSize
    count, SMStream stream);
```

Use SMStreamWrite to write the number of data items specified by count, each of a size given by size, from buffer to the current position in stream. The current position of stream is updated after the write. The SMStreamWrite routine returns the number of items it actually wrote.

```
int SMStreamSeek(SMStream stream, SMSize offset, SMStream-
    SeekCode origin);
```

Use the SMStreamSeek routine to reposition stream to the location specified by offset with respect to the argument origin. The SMStreamSeek routine returns a non zero value only if it fails to position the stream.

```
int SMStreamGetPos(SMStream stream, SMStreamPos pos);
```

Use SMStreamGetPos to get and save the current position indicator of the stream specified by the argument stream in the SMStreamPos data object pos. This Value is used by the companion routine SMStreamSetPos to reposition the stream at the time of the call to SMStreamGetPos. If successful, SMStreamGetPos returns zero. In case of error, it returns a non zero Value.

```
int SMStreamSetPos(SMStream stream, const SMStreamPos pos);
```

Use SMStreamSetPos to set the position where reading or writing will take place in stream. The new position is specified in an SMStreamPos data object pos. For Value position, use the Value obtained by an earlier call to SMStreamGetPos. If successful, SMStreamSetPos returns a zero. Otherwise, the return Value is non zero.

```
SMSize SMStreamTell(SMStream stream);
```

Use SMStreamTell to obtain the current position of stream. The position is expressed as a byte offset from the beginning of the file. If successful, SMStreamTell returns a SMSize containing the number of bytes that the current position of stream is offset from the beginning of the Value. In case of error, SMStreamTell returns −1.

H. CPL Accessors

```
SMCPLAccessor SMNewCPLAccessor(SMAccessorKind aKind,
    SMContSpec contSpec, SMPoolName poolName, SMLayer-
    Name layerName);
```

Creates and returns a CPL Accessor, of the given kind, that defines the Container, Pool and Layer context. All parameters other than Accessor kind are optional. The CPL Accessor kind parameter specifies whether or not the Accessor is a ReadWrite, ReadWrite, or Transient, Accessor to the contents of the Layer. A Transient Accessor cannot perform any Container, Pool or Layer manipulation, but can be repositioned to other Pools and Layers from the currently designated position. The Container is implicitly opened if necessary during this call.

Each Layer can have many Reader-Processes but it can only have one Process modifying a Layer at a time. Therefore, a Process cannot acquire write-permission to the Layer if there is another Process reading or modifying a Layer. Each CPL Accessor maintains its current permission to the Layer. The permission is called the Layer Mode. There are three Layer Modes—Read/Write, Read-Only and None. Read/Write Mode gives the Process which owns the CPL Accessor exclusive right to modify the Layer. Read-Only Mode allows a Process to read from the Layer and at the same time blocking out any attempt from another Process to acquire a Read/Write Mode. None Mode is used for transient repositioning of the Layer Access. For example, the user may want to move a CPL Accessor within a Layer hierarchy with no intention to look at any Blops until the desired Layer is found.

CPL Accessors of the same Process can share the same Layer Mode. For example, a clone of a CPL Accessor has the same Layer Mode as the original. If the original CPL Accessor has Read/Write Mode on a Layer, the clone will have Read- and Write-permission to the Layer too.

```
void SMDisposeCPLAccessor(SMCPLAccessor accessor);
```

Disposes of the specified CPL Accessor. If any BPV Accessors are outstanding an error occurs. If this is the last Accessor designating the Container it is implicitly closed.

```
void SMTransformCPLAccessor(SMCPLAccessor accessor,
    SMAccessorKind aKind);
```

Transforms a CPL Accessor from one kind to another. If transforming from ReadOnly to ReadWrite the CPL Accessor must be the only Accessor designating the Layer. An exception is raised if attempting to reposition a CPL Accessor that has outstanding BPV Accessors.

```
void SMRetargetCPLAccessor(SMCPLAccessor accessor,
    SMContSpec contSpec, SMBoolean samePoolName, SNBoolean sameLayerName);
```

Re-targets the given CPL Accessor, to a potentially different Container, based on the given Container Specification. The given Accessor is retargeted. An exception is raised if attempting to reposition a CPL Accessor that has outstanding BPV Accessors. Since a CPL Accessor provides the context for the BPV Accessor, a CPL Accessor cannot be repositioned if there is a BPV Accessor outstanding. All the BPV Accessors must be 'released' first. If samePoolName or sameLayerName are kSMBTrue then the Accessor returned will attempt to designate the same Pool as the original and the same Layer as the original, both by name.

```
SMPositionResult SMPositionCPLAccessor(SMCPLAccessor
    accessor, SMPoolName poolName, SMPositionCode poolPosition, SMLayerName layerName, SMPositionCode layerPosition);
```

Repositions a given CPL Accessor within a Container returning the status of the positioning. The return Value, if positive, indicates how the new location of the Accessor is related to the previous location; and if negative, it indicates how far SMPositionCPLAccessor was able to proceed with this process before an error was detected. On failure, the Accessor is left pointing at the closest Pool and Layer it could find to the ones requested that still satisfies the given parameters. Therefore, if the specified LayerName does not exist, the CPL Accessor is positioned to the specified Pool (not to a Layer in the specified Pool). An exception is raised if attempting to reposition a CPL Accessor that has outstanding BPV Accessors. Pools are implicitly opened and closed as necessary during the repositioning.

Layers and Pools are considered upside down graphs. Delta Pools are considered children of their Base Pool. The bottom Layer is the topmost Parent in a Layer hierarchy. From an undefined state positioning the Pool to kSMP-FirstSib positions to the first Pool in the Container. Positioning a Layer to kSMPFirstAbove or kSMPFirstBelow from an undefined state positions to the bottom Layer of the Pool.

| Parameter: PoolPosition | |
| --- | --- |
| Valid Position Code | Meaning |
| kSMPUndefined | set Pool to undefined |
| kSMPSame | stay on same Pool |
| kSMPFirstSib | goto first Pool in same Container |
| kSMPLastSib | goto last Pool in same Container |
| kSMPNextSib | goto next Pool in same Container |
| kSMPPrevSib | goto previous Pool in same Container |
| kSMPFirstBelow | goto Base Pool (same as kSMPLastBelow) |
| kSMPLastBelow | goto Base Pool (same as kSMPFirstBelow) |
| kSMPFirstAbove | goto first connected Delta Pool |
| kSMPLastAbove | goto last connected Delta Pool |
| kSMPMWrap | allow wrapping within a level |
| Parameter: layerPosition | |
| Valid Position Code | Meaning |
| kSMPUndefined | set Layer to undefined |
| kSMPSame | stay on same Layer |
| kSMPFirstSib | goto first Layer at same level |
| kSMPLastSib | goto last Layer at same level |
| kSMPNextSib | goto next Layer at same level |
| KSMPPrevSib | goto previous Layer at same level |
| kSMPFirstBelow | goto first Base Layer |
| kSMPLastBelow | goto last Base Layer |
| kSMPFirstAbove | goto first Derived Layer |
| kSMPLastAbove | goto last Derived Layer |
| kSMPMWrap | allow wrapping within a level |

```
SMCount SMCountCPLAccessor(SMCPLAccessor accessor,
    SMPositionCode poolPosition, SMPositionCode layerPosition);
```

Returns the number of times that the given CPL Accessor could be repositioned according to the parameters before stopping. The wrap position code modifier is not allowed for any given position code. The parameters are interpreted the same as in the SMPositionCPLAccessor routine. With this routine it is easy to determine the number of Pools in a Container, the number of Layers in a hierarchy, etc.

```
SMCPLAccessor SMCloneCPLAccessor(SMCPLAccessor original);
```

Duplicates the specified CPL Accessor and returns the duplicate. Only ReadOnly and Transient Accessors can be cloned since two ReadWrite Accessors are not allowed to be targeting the same Layer. If the Layer is currently undefined by the Accessor a ReadWrite Accessor can be cloned.

```
void SMGetCPLAccessorInfo(SMCPLAccessor accessor, SMCPL-
    ReadOnlyInfo *roInfo, SMCPLReadWriteInfo *rwInfo);
```

Returns the details of what the given CPL Accessor designates. kSMUndefined may be passed as arguments to parameters that are not wanted. kSMUndefined will be returned for elements that are undefined. theFile parameter is only defined when the Container is a File Container, for all other Containers kSMUndefined will always be returned. Passing kSMUndefined for poolName while still passing maxPoolNameSize will set the parameter to the length of the Pool Name. The basePool parameter will be filled in with a newly created Accessor, of basePoolAKind, if not kSMUndefined and the Pool currently designated is a Separable or Delta Pool. The max info size parameters will return the current size of the corresponding info if kSMUndefined is given for the info parameter. The Layer names Iterator is a snapshot of all of the names currently set for the designated Layer. Changing items within the Iterator has no effect on the Layer.

```
void SMSetCPLAccessorInfo(SMCPLAccessor accessor, SMCPL-
    ReadWriteInfo *rwInfo);
```

Sets the details of what the given CPL Accessor designates. kSMUndefined may be passed for poolName if the name is not to be changed. In rwInfo, 'consistent' designates the Layer specified by the given Accessor to be consistent or not.

Every Layer has a flag associated with it which indicates if the Layer contains a consistent view of the Blops in the Pool. Since the Storage Manager has no knowledge of the interpretation of data it manages, it assumes that all operations it is asked to do leave the Layers in a consistent state. However, SMSetCPLAccessorInfo allows the application to specify that a Layer is in a consistent or inconsistent State. In addition, since the SMMoveChangesDown routine frequently makes a Layer inconsistent (by copying down a subset of related changes), it has an argument which the caller can supply to indicate whether the resulting Layer is consistent. The main use of this feature is to limit the types of operations which can be performed on a Layer. It is an error for an application to create a Layer which is derived from an inconsistent Layer (although existing Layers which are above it are still OK); and it is an error for an application to SMMoveAllChangesDown from an inconsistent Layer. Thus if an application creates an inconsistent Layer in a shared disk file, then no other application will be able to build a Layer above it (and see its contents) until it is marked as consistent.

```
SMIterator SROwnedBPVAccessors(SMCPLAccessor accessor);
```

Returns an Iterator that contains all outstanding BPV Accessors for the given CPL Accessor. The BPV Accessor Iterator is a snapshot of all of the BPV Accessors currently owned by the given CPL Accessor. Changing items within the Iterator has no effect on the actual Accessors.

```
void SMCleanup(SMCPLAccessor accessor, SMCleanupCode
    cleanupCode);
```

Cleans up the Layer, Pool and Container structures referred to by accessor according to cleanupcode. The CPL Accessor is then positioned according to the cleanup operation.

I. Workspace Maintenance

```
void SMGetWorkspaceInfo(SMCPLAccessor accessor, SMWS-
    ReadOnlyInfo *roInfo, SMWSReadWriteInfo *rwInfo);
```

Returns the current Workspace info for the given CPL Accessor.

```
void SMSetWorkspaceInfo(SMCPLAccessor accessor, SMWS-
    ReadWriteInfo *rwInfo);
```

Sets the Workspace info for the given CPL Accessor.

```
void SMFlushWorkspaceInfo(SMCPLAccessor accessor);
```

Flushes the Workspace caches for the given CPL Accessor.

J. Generating Container Specifications

```
SMContSpec SMMakeFileContSpec(const SMFileSpec *theFile);
```

Creates a Container Specification for the given file.

```
SMContSpec SMMakeROXContSpec(void);
```

Creates a Container Specification for the ROM. SMCreateContainer and SMRemoveContainer are not valid for a ROM Container Specification.

```
SMContSpec SMMakeScrapContSpec(void);
```

Creates a Container Specification for the clipboard.

```
SMContSpec SMMakeMemoryContSpec(void);
```

Creates a Container Specification for an area of memory.

```
void SMUnMakeContSpec(SMContSpec contSpec);
```

Removes the Container specification. It is not necessary to unmake a ContSpec if the specification is used in the SMCreateContainer, SMNewCPLAccessor, or SMRetargetCPLAccessor routines.

K. Container Maintenance

```
SMCPLAccessor SMCreateContainer(SMContSpec contspec,
    SMContHandler handler, SMAccessorKind aKind);
```

Creates a new Container located as defined by the Container Spec. The given handler is set as the Container Handler for all access to the given Container. This routine creates a new file or allocates a new heap zone. If the file or heap zone already exists an error occurs. After initializing the Container to be a Storage Manager Container it is accessible. A new CPL Accessor is created, of the given kind, to refer to the Container and then is returned. The standard Container Handler provided by the Storage Manager is referred to herein as SMUIPFileContHandler.

```
void SMRemoveContainer(SMCPLAccessor container);
```

Removes the designated Container. If Container is a file the file is removed. The given Accessor is left in an undefined position. No BPV Accessors can be outstanding for the given CPL Accessor.

L. Pool Maintenance

```
SMCPLAccessor SMCreatePool(SMCPLAccessor container,
    SMPoolName poolname, SMAccessorKind aKind);
```

Creates a new Pool in the Container specified by Container. A single bottom Layer is created when a new Pool is created. If kSMUndefined is passed for the Accessor Kind the given CPL Accessor is positioned to designate the new Pool and returned. If a valid Accessor Kind is given a new CPL Accessor of the given kind is created and returned.

```
void SMRemovePool(SMCPLAccessor pool);
```

Removes the Pool referred to by Pool. The Pool designated, by the given Accessor, after this routine is kSMUndefined.

```
SMCPLAccessor SMCreateDeltaPool(SMCPLAccessor deltaContainer, SMPoolName deltaPoolName, SMCPLAccessor baseLayer, SMAccessorKind aKind);
```

Creates a Delta Pool based on the Layer referred to by baseLayer. The new Pool is created in the Container specified by deltaContainer and has the name deltaPoolName. If kSMUndefined is passed for the Accessor Kind the given deltaContainer is positioned to designate the new bottom Layer of the new Pool and returned. If a valid Accessor Kind is given a new CPL Accessor of the given kind is created and returned.

```
SMCPLAccessor SMCreateSeparablePool(SMCPLAccessor sepContainer, SMPoolName sepPoolName, SMCPLAccessor baseLayer, SMAccessorKind aKind);
```

Creates a Separable Pool based on the Layer referred to by baseLayer. The Separable Pool is created in the Container specified by sepContainer and has the name sepPoolName. If kSMUndefined is passed for the Accessor Kind the given sepContainer is positioned to designate the new bottom Layer of the new Pool and returned. If a valid Accessor Kind is given a new CPL Accessor of the given kind is created and returned.

```
void SMReconnectPool(SMCPLAccessor deltaPool, SMCPLAccessor basePool, SMReconcileOperator reconcileMask, SMReconcileHandler reconcileHandler);
```

Reconnects a Delta Pool referred to by deltaPool to the Base Pool referred to by basepool. The given Reconciliation handler is used at 2 levels (Layers and Blops). reconcileMask indicates which operations will trigger handler functions. A standard Reconciliation Handler is provided by the Storage Manager and is referred to herein as SMDefaultReconcileHandler.

A Reconcile Handler performs a function given each Reconciliation Operator. This is the function used by the Storage Manager to perform the Reconnect routine. The function called for each Layer reconciliation operation are defined as:

```
myReconcileLayerFunc(SMLayerName layerName, sMReconcileOperator operator, SMCPLAccessor deltaLayer, SMCPLAccessor baseLayer);
```

The functions called for each Blop reconciliation operation are defined as:

```
myReconcileBlopFunc(SMBPVAccessor theBlop, SMReconcileOperator operator, SMCPLAccessor deltaLayer, SMCPLAccessor baseLayer);

void SMIntegratePool(SMCPLAccessor sepPool, SMCPLAccessor origPool, SMReconcileOperator reconcileMask, SMReconcileHandler reconcileHandler);
```

Integrate a Separable Pool referred to by sepPool to the Base Pool referred to by origpool. The given Reconciliation handler is used at 2 levels (Layers and Blops). reconcileMask indicates which operations will trigger handler functions. A standard Reconciliation Handler is provided by the Storage Manager, referred to herein as SMDefaultReconcileHandler.

A Reconcile Handler performs a function given each Reconciliation Operator. This is the function used by the Storage Manager to perform the Integrate routine. The function called for each Layer reconciliation operation are defined as:

```
myIntegrateLayerFunc(SMLayerName layerName, SMReconcileOperator operator, SMCPLAccessor sepLayer, SMCPLAccessor origLayer);
```

The routines called for each Blop reconciliation operation are defined as:

```
myIntegrateBlopFunc(SMBPVAccessor theBlop, SMReconcileOperator operator, SMCPLAccessor sepLayer, SMCPLAccessor origLayer);

SMCPLAccessor SmIntegrateLayers(SMCPLAccessor layer1, SMCPLAccessor layer2, SMReconcileOperator reconcileMask, SMReconcileHandler reconcileHandler, SMAccessorKind aKind);
```

Creates a new Layer which acts as an integration Layer between the two Layers referred to by Layer1 and Layer2. The new Layer is created in the same Pool indicated by Layer1 when Layer1 and Layer2 refer to different Pools. Layer1 and Layer2 must have a common base Layer to be integrated. reconcileMask indicates which operations will trigger handler functions. The CPL Accessor returned is a new Accessor, of the given kind, that designates the new Layer. A standard Reconciliation Handler is provided by the Storage Manager and is referred to herein as SMDefault-ReconcileHandler.

A Reconcile Handler performs a function given each Reconciliation Operator. This is the function used by the Storage Manager to perform the Integrate routine. The function called for each Blop reconciliation operation are defined as:

```
myIntegrateBlopFunc(SMBPVAccessor theBlop, SMReconcileOperator operator, SMCPLAccessor layer1, SMCPLAccessor layer2);

SMCPLAccessor SMGetLatestCommonLayer(SMCPLAccessor layer1, SMCPLAccessor layer2, SMAccessorKind aKind);
```

Finds the latest common Layer of the Layers referred to by Layer1 and Layer2 and creates a new CPL Accessor, of the given kind, that refers to this common Layer and then is returned.

```
SMCPLAccessor SMGetBottomLayer(SMCPLAccessor pool, SMAccessorKind aKind);
```

Returns the bottom Layer of the Pool designated by the given CPL Accessor. If kSMUndefined is passed for the Accessor Kind Pool is repositioned to the bottom Layer. If a valid Accessor Kind is given a new CPL Accessor, of the given kind, is created and returned.

M. Layer Maintenance

SMCPLAccessor SMCreateLayer(SMCPLAccessor aboveLayer,
    SMCPLAccessor belowLayer1, SMCPLAccessor belowLayer2,
    SMBoolean above, SMAccessorKind aKind);

Creates a Layer between the Layers specified by above-Layer and the two below CPL Accessors (belowLayer1 and belowLayer2). If kSMUndefined is passed for the Accessor Kind belowLayer1 is positioned to designate the new Pool and returned. If a valid Accessor Kind is given a new CPL Accessor, of the given kind, is created and returned. The above flag determines whether the new Layer is created in the Pool as designated by the aboveLayer or the belowLayers. Attempting to create a Layer in a ReadOnly Pool produces an error. New Layers are created in a consistent state.

void SMRemoveLayer(SMCPLAccessor layer);

Removes the Layer referred to by Layer. All Blops instantiated within the given Layer are also removed. A Layer cannot be removed if there are Layers derived from it. The CPL Accessor left designating a kSMUndefined Layer. The bottom Layer of a Pool cannot be removed.

SMBoolean SMSetLayerName(SMLayerName name, SMCPLAccessor oldLayer, SMCPLAccessor newLayer);

Atomically changes the given name from being applied to Layer referred to by oldLayer to that being applied to newLayer. The Layers referred to by oldLayer and newLayer may be in different Pools and Containers. If there is no Layer which previously had the given name, then kSMUndefined should be passed for oldLayer. If Layer referred to by oldLayer does not have the given name at the time the call is made, kSMBFalse is returned and no names are changed. To remove the Layer name pass kSMUndefined as the newLayer parameter. This routine is used as the test-and-set operation for all Layer management protocols in the Storage Manager. This routine returns kSMBTrue if Layer referred to by oldLayer was correctly identified, and kSMBFalse if it was not. No error occurs in this case; so if the routine is being used as a test-and-set, the return Value must be checked.

N. Layer Contents Manipulation void SMMoveAllChangesDown(SMCPLAccessor fromLayer,
    SMCPLAccessor toLayer);

Atomically moves all instantiations of Blops which exist in Layers between the Layers referred to by fromLayer and toLayer (not inclusive) down into that by toLayer, leaving all of the intervening Layers empty. Thus all Blops created, deleted, or changed in the intervening Layers are now created, deleted, and changed in the Layer referred to by toLayer. The Layer referred to by fromLayer, must transitively be above that by toLayer, although they can be in different Pools; and all of the intervening Layers must both be transitively above the Layer referred to by toLayer, and transitively below that by fromLayer. In addition, the Layer referred to by fromLayer must have no ambiguous Blops and no CPL Accessors can be referencing the intervening Layers.

void SMMoveChangesDown(SMIterator blops, SMCPLAccessor
    fromLayer, SMCPLAccessor toLayer, SMBoolean consistent);

Atomically move the instantiations of the specified Blops which exist in Layers between fromLayer and toLayer (not inclusive of toLayer) down into toLayer, and leave those Blops state unchanged in the intervening Layers. This routine is similar to SMMoveAllChangesDown, except that only the specified Blops are affected. The consistent argument indicates if the resulting Layer should be marked as presenting a consistent view of the Blops in the Layer.

void SMCopyAllBlopsUp(SMCPLAccessor fromLayer, SMCPLAccessor toLayer);

Atomically copies the instantiation of all Blops visible in fromLayer to toLayer, thus totally hiding any changes in any Layers in between. The only differences between the view from toLayer and fromLayer at the end of this operation are the Blops which have been created in the Layer referred to by toLayer, which are unchanged by this operation. Blops that were deleted in the Layer referred to by toLayer are replaced by the actual Blops from the Layer referred to by fromLayer.

void SMCopyBlopsUp(SMIterator blops, SMCPLAccessor fromLayer, SMCPLAccessor toLayer);

Atomically copies the instantiation of the specified Blops visible in the Layer referred to by fromLayer to that by toLayer, thus totally hiding any changes in any Layers in between. Thus the given Layer no longer depends on the Layers below it to provide the Values for the Blops. This routine can be used to choose a base Layer's version of ambiguous Blops to be included in a reconciliation Layer, or to "undo" changes to a Blop.

void SMEmptyLayer(SMCPLAccessor layer);

Removes instantiations of all Blops in the given Layer. This is only valid for Layers that have no other Layers derived from them. Upon completion of this routine the given Layer is set to be consistent, if necessary.

O. Iterators

SMIterator SMNewIterator(SMIteratorHandler handler);

Allocates an Iterator using the given Iterator Handler. An Iterator Handler performs a function given each Iterator Operator. This is the function used by the Storage Manager to perform the Iterator routines for the given Iterator. The following standard Iterator Handlers are provided by the Storage Manager:

SMBPVAccessorIteratorHandler SMStructuredNameIteratorHandler SMBlopIdIteratorHandler.

void SMDisposeIterator(SMIterator iterator);

Deletes the given Iterator.

SMBoolean SMGetFirstItem(SMIterator iterator, SMIterItemPtr item);

Returns the first item available from the Iterator. Returns kSMBTrue if successful, kSMBFalse if not.

SMBoolean SMGetLastItem(SMIterator iterator, SMIterItemPtr item);

Returns the last item available from the Iterator. Returns kSMBTrue if successful, kSMBFalse if not.

```
SHBoolean SMGetNextItem(SMIterator iterator, SMIterItemPtr
    item);
```

Returns the next item available from the Iterator. Returns kSMBTrue if successful, kSMBFalse if not.

```
SMBoolean SMGetPrevItem(SMIterator iterator, SMIterItemNex-
    tItem);
```

Returns the previous item available from the Iterator. Returns kSMBTrue if successful, kSMBFalse if not.

```
SMCount SMGetIteratorCount(SMIterator iterator);
```

Returns the number of items available from the Iterator.

```
SMBoolean SMGetIndexItem(SMIterator iterator, SMCount index,
    SMIterItemPtr item);
```

Sets the item parameter to the item designated by the given index from the Iterator. The index is one based. Returns kSMBTrue if successful, kSMBFalse if not.

```
SMBoolean SMSetIndexItem(SMIterator iterator, SMCount index,
    const SMIterItemPtr item);
```

Sets the item designated by the given index in the Iterator. The index is one based. It is left to the Iterator Handler to decide if sparse item lists are allowed. Returns kSMBTrue if successful, kSMBFalse if not.

```
SMBoolean SMAddItem(SMIterator iterator, const SMIterItemPtr
    item, SMBoolean unique);
```

Adds the given item to the Iterator item list. Returns kSMBTrue if successful, kSMBFalse if not. If unique is kSMBTrue then the item is guaranteed to be unique after the add.

```
SMBoolean SMRemoveItem(SMIterator iterator, const SMIter-
    ItemPtr item);
```

The given item is removed from the Iterator item list. If there are more than one copies of the same item in the item list, only one is removed. Returns kSMBTrue if successful, kSMBFalse if not.

```
SMBoolean SMRemoveIndexItem(SMIterator iterator, SMCount
    index);
```

Removes the given indexed item from the Iterator item list. Returns kSMBTrue if successful, kSMBFalse if not.

```
void SMInsertIndexItem(SMIterator iterator, SMCount index,
    const SMIterItemPtr item, SMBoolean unique);
```

Adds the given item to the Iterator item. list at the given index. It is left to the Iterator Handler to decide if sparse item lists are allowed. All subsequent items indexes are incremented by one. Returns kSMBTrue if successful, kSMBFalse if not. If unique is kSMBTrue then the item is guaranteed to be unique after the add. SMSize SMGetItemSize(SMIterator iterator);

Returns the size of the current item for the given Iterator.

III. PHYSICAL IMPLEMENTATION OF THE DATA STRUCTURE AND MANAGEMENT THEREOF

In order to implement the data structure described above and facilitate the routines provided by the Storage Manager, the routines preferably create and maintain Blops, Layers, Pools, Containers and other side structures in accordance with the following description.

A. Containers, Pools and Layers

Figure 12:
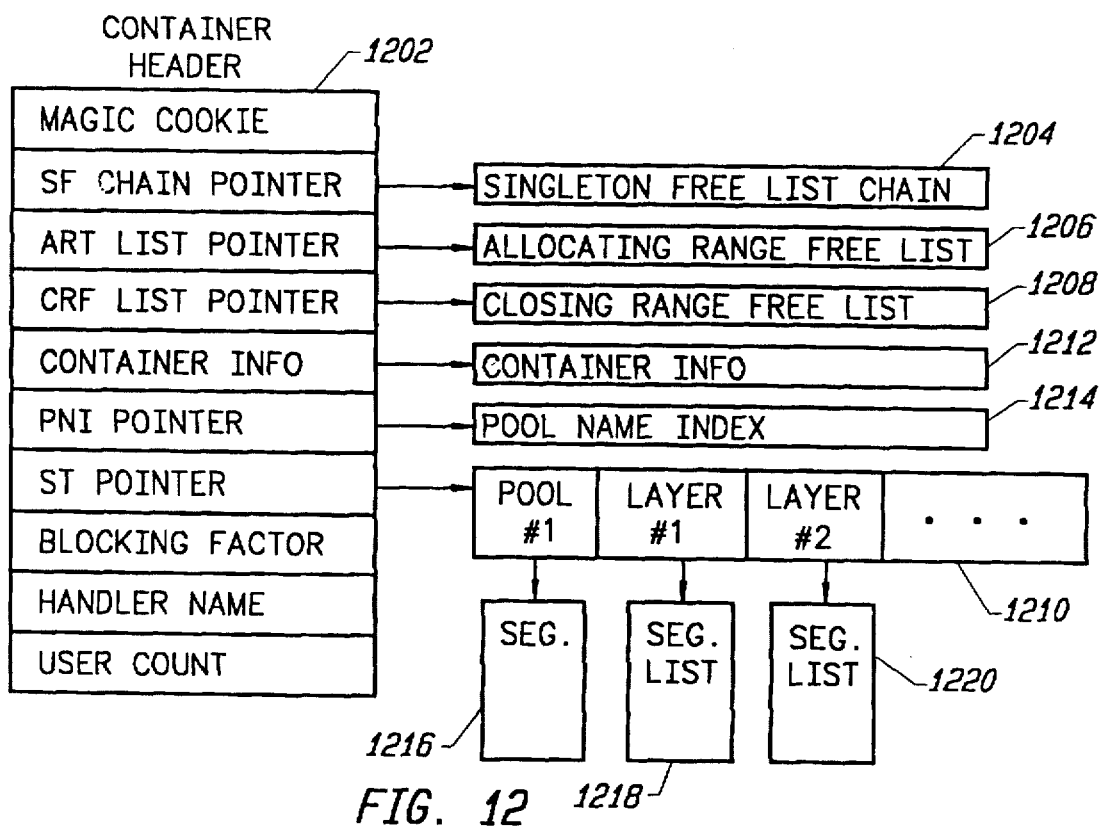
FIG. 12 illustrates the structure of a disk container.

FIG. 12 is a block diagram of the internal structure of a Container. Each Container is stored in a separate file in a single storage medium. As shown in FIG. 12, the Container includes a Container header 1202, which includes the following entries:

Magic Cookie.

The Magic Cookie is a sequence of n bytes at the beginning of the file which designates this file as a Storage Manager file.

Singleton Free List (SF) Chain Pointer.

A Singleton Free List (SF) is a block which contains an ordered list of single free blocks in the file. Each SF block contains a pointer to the next SF block (or nil), thus forming a chain. The SF chain pointer in header 1202 either contains nil, which means it is empty, or points to the first SF list block in the SF chain, shown in FIG. 12 as 1204.

Allocating Range Free List Pointer.

The Container header 1202 contains a pointer to an allocating range free list 1206. A range free list (RF list) is a contiguous set of blocks which contains an ordered list of free block ranges (block index, length). The ranges are ordered by length, shortest first. The segment manager supports two RF lists to aid concurrency. A process closing the Container should not block another process which is continuously asking for ranges. The Allocating Range Free List (ARF list) is used by processes allocating ranges of blocks for use.

Closing Range Free List Pointer.

The Container header also contains a pointer to a Closing Range Free List 1208. The Closing Range Free List (CRF list) is used by processes closing and doing garbage collection and integration of their free single blocks and range free blocks with those on disk. When the ARF list 1206 is empty, the ARF 1206 and the CRF 1208 are swapped.

Segment Table Block Pointer.

The Container header 1202 includes a segment table block pointer, which points to a segment table (ST) 1210. ST is the master table which contains references to all of the segments in a Container. The index into ST for a segment becomes its segment id. Each segment table entry contains:

OwnerID—the owner of this segment

OwnerType—the type of the owner (e.g. Container, Pool, Layer)

ReadCount—a lock indicating the number of outstanding readers of this segment

Write Lock—a lock indicating an outstanding writer for this segment

Segment block index—points to the Segment block in the file.

In the present embodiment, each Segment occupies only 1 block. However, a Segment may occupy a contiguous set of blocks in a different embodiment and the Segment block index will then point to the first block of the contiguous set.

Blocking Factor. The header 1202 also includes a Blocking Factor entry, which indicates the size of disk block which is used in the present file.

Handler Handler Name string. The header 1202 also includes the name of a handler handler, that is a Handler which can be called to get the names of the specific Handlers for this Container.

Container Info block pointer & byte length. The header 1202 also includes a Container Info block pointer and byte length entry, which is nil (if there is no Container Info) or points to a set of contiguous blocks 1212 in the file where the Container Info is kept.

Pool Name Index block pointer. This entry is Nil if the Container has no Pools, or points to contiguous blocks 1214 which house the Pool Name Index (PNI).

Usercount. Every time a session/user/process opens a file Container, the Storage Manager increases this count by one. Every time a session/user/prQcess closes a file Container, the Storage Manager decreases this count by one. Every time a session/user/process is the first to open a closed file, the Storage Manager checks this count, and if the count is greater than 0 then the file was not closed properly (probably due to a crash), and crash recovery is automatically activated.

Every file Container has one Segment Table 1210 pointed to by the File Header 1202. The Segment Table 1210 is an array of Segment Table entries. Each Segment Table entry contains an Owner ID, a Read Count, a Write Lock and a block pointer to the Segment List for the Segment which it represents.

Segments with the same OwnernD are chained together, that is, the header of the first or head segment points to the next segment (not Segment Table entry) of the same owner. The OwnerID is the Segment ID of the head segment. In the Storage Manager these assertions are false in the middle of some of the API calls. However, barring a crash, they are guaranteed to be true around API calls.

In order to place a lock on a Segment List, only the Read Count or the Write Lock in the Head Segment needs to be changed.

Figure 13:
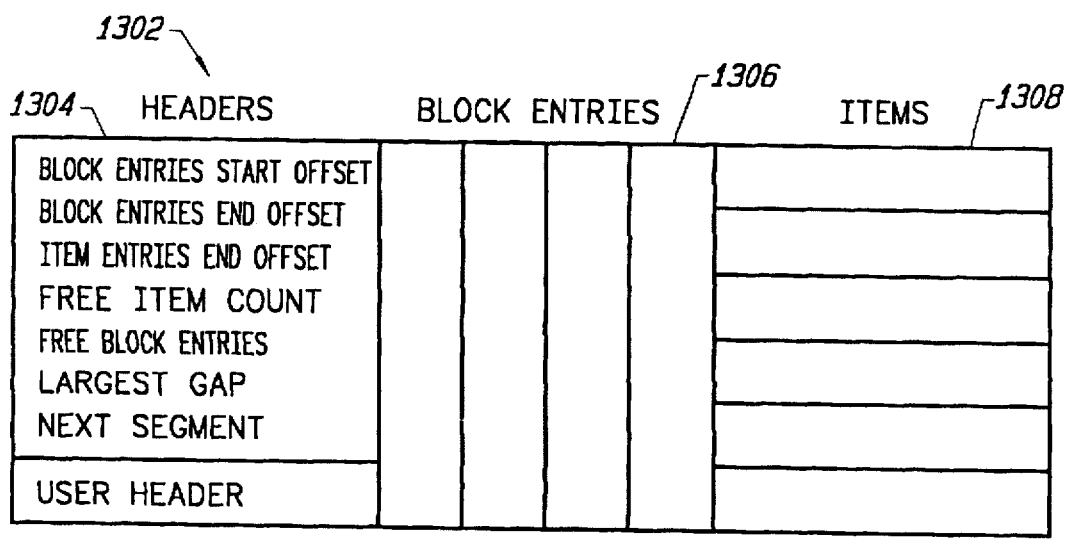
FIG. 13 illustrates the structure of a segment.

FIG. 13 illustrates a segment 1302. A segment occupies exactly one block on the storage medium (a disk for the present illustration). The segment has three sections: header 1304, block entry list 1306, and item entry list 1308. The entries in the header 1302 are as follows:

Block Entry List Start byte offset - offset into the segment where the Block Entry List starts.

Block Entry List End byte offset—offset into the Segment where the Block Entry list ends.

Item Entry List End byte offset—offset into the Segment where the Item Entry List ends.

Free block entry count—indicates the number of free block entries in the Segment.

Free item entry count—indicates the number of free items in the Segment.

Largest Gap—of all block ranges currently allocated for this Segment, the largest gap in them.

Next Segment—points to the next segment in this segment list or nil if this is the tail of the list.

Each of the Block Entries 1306 contains a block pointer and block count. The block pointer indicates the starting block of a range of blocks which has a length of block count.

Each of the Item Entries 1308 contains a block entry index, a byte offset, and a byte length. The block entry index indicates what range of blocks the item is located in, and the byte offset and byte length indicate the precise bytes. Items can span multiple blocks. Multiple items can be present within the same block range.

The Storage Manager allocates Block Entries and Items dynamically by making the two Lists grow toward each other and maintaining the end of the Block Entries List and the beginning of the Item Entry List as well.

When a process first positions a Container/Pool/Layer Accessor (CPL Accessor) to a file Container, Storage Manager opens the file. If the process is the first to open the file, Storage Manager checks the Usercount in the header, and if non-zero, does crash recovery and sets the Usercount to 1. The head of the SF Chain is removed and placed in the framework of the process, making the next SF the new head of the SF Chain. Each process is given a SF so that it can independently grab free blocks without blocking other processes or blocking itself. If there is no SF at the head of the chain, a new SF is created and partially filled as explained in Allocation below.

When singleton blocks are needed by the framework of the process for new items, Layers, Pools or segments, the Storage Manager takes them from the SF which belongs to the process. When this SF is empty, the Storage Manager creates a new SF by allocating free blocks from the ARF or at the end of the file and placing them in the new SF (which probably occupies the first of those blocks which were allocated) and given to the process. When a range of blocks is needed by the framework of the process for new items, growing items etc., the Storage Manager allocates the (best/first/ok) fit range from the ARF on disk. If the ARF is empty, the Storage Manager swaps the ARF and CRF lists. If the ARF is still empty then the Storage Manager allocates the needed range at the end of the file.

When the Storage Manager de-allocates singleton blocks it places them into the process's SF. When range blocks are de-allocated they are placed into the CRF.

When a process positions the last CPL Accessor to a Container away from that Container, Storage Manager goes through the process of closing the file. The framework resolves its remaining SFs with the SF Chain on disk and the CRF. The Usercount is decremented, and this process's access path to the file is closed.

Internally, the Storage Manager uses a Segment Manager to manage Segments. The Segment Manager supports the following calls:

AllocRef OpenSegList(OwnerID,permissions)—The Storage Manager calls this routine first with the OwnerID of the segment list that it wishes to access, and with permissions (R,W, $\phi$). As used herein with respect to permissions, R indicates read permission, w indicates write permission, and $\phi$ indicates neither read nor write permission. An AllocRef is returned which the Storage Manager then uses with all future calls to this session with this segment list. An AllocRef contains an OwnerID, Segment Cache, seg largest gap, and an indication of the first segment with free item(s).

ItemID NewItem(AllocRef,size)—This routine is called to allocate a new item in the segment list referred to by the AllocRef. NewItem attempts to create a new item of length size by walking the segment list, looking for a free item entry and potentially a free block entry (depending on size) to allocate for the item.

FreeItem(AllocRef, ItemID)—This routine is called to de-allocate the item ItemID. The item entry is freed for future use, and the section of the block range which was being used is also implicitly freed for reuse. If the item was the last item to be freed in the segment, the segment is taken out of the list and freed. The resulting freed block is added to the SF in the framework.

ResizeItem(AllocRef, ItemID,size,relocateitem)—This routine is called to enlarge or shrink an item.

Shrinking an item simply changes the length setting in the item entry. When enlarging, the segment manager first attempts to enlarge the item in place. If the item cannot be resized in place and the relocateitem flag is true, and there is enough disk space to store the larger item, then the segment manager goes through the following steps until it succeeds in resizing the item if it is possible to resize the item.

1. attempt to move the item to the end of its block range
2. if there is another block entry in the item's segment, allocate enough space for the item into that block entry, and move the item to it
3. allocate enough space for all the items in the item's block range, compact/move every item contained within the item's block range to the new block range, place the block range into the item's block entry, de-allocate the old block range CloseSegList(AllocRef)—This routine is called to close an allocref when finished with the associated segment list so other users may access it.

GetItem (AllocRef, ItemID, offset, &length, &void*)—Gets the section of the item indicated by offset and length and places it into the buffer pointed to by bufferptr. If bufferptr is nil, then a buffer is allocated and passed back. If offset and length are some predefined Values, then the entire item is loaded from disk. The actual number of bytes read is returned in the length variable.

PutItem (AllocRef,Item ID, offset, &length, void*)—write to the section of item ItemID indicated by offset and length from bufferptr. Actual number of bytes written out is returned in length.

boolean ChangePerm(AllocRef, permissions)—attempt to change the access on AllocRef to that specified in the permissions argument. The changes x→x, W→R,W→φ, R→φ should always succeed. The other possible changes may or may not succeed if other readers/writers are present.

Compact(AllocRef)—compact and garbage collect the segment list indicated by AllocRef.

MergeItems(*ItemID[])—Merge the given items into the first item in the array.

Every Pool in a Container is named and its Name is unique within the Container. Therefore, Pool Name is a guaranteed way to identify a Pool given the Container. The Pool Name Index 1214, present in each Container, is used by the Storage Manager to maintain the Pool Names and the corresponding Pools. The PNI is not stored in a Segment; it is stored directly in a Singleton Block or a Range Block depending on its size. The Block Number and the length of the PNI are stored in the Container Header.

The PNI 1214 is illustrated in FIG. 14 and contains three sections: Header 1402, Pool Name/Pool Segment List (SL) 1404, and Sorted Index 1406. The Header contains the offsets from the beginning of the Block to each of the other two segments, and contains the lengths of the other two sections. The Pool Name/Pool SL is an unsorted list of Pool Names in the Container, together with the PoolIDs of the corresponding Pools. PoolID is used to locate the Segment List (SL) for a Pool, and is explained in more detail below. The Sorted Index is a list of entries containing offsets from the beginning of the Pool Name/PoolID list. Each of these entries corresponds to a Pool. The order of the list is the sorted order of the Pool Names.

In the illustration of FIG. 14, the Pool name/Pool ID list 1404 is expanded to show its contents. In particular, it contains four entries, each of which contains the name of a Pool and its ID (which is the OwnerID of the first Segment of the Pool). In the illustration, the first entry contains the name "First Pool" and the ID of 1; the second entry contains the name "Second Pool" and the ID of 4; the third entry contains the name "Third Pool" and the ID of 6; and the fourth entry contains the name "Fourth Pool" and the ID of 8. In addition, each entry is preceded by an indication of the length of Pool name. FIG. 14 illustrates how the PNI 1402 would appear if the four Pools were created in the order of their names. Note that the Sorted Index 1406 points to the four Pool Name/ID List entries in alphanumeric order rather than the order of creation.

When the Storage Manager creates a Pool, it checks the supplied Pool Name against the PNI using a binary search on the Sorted Index and the Pool Names it refers to. If the Pool Name does not exist, the Storage Manager adds the Pool Name and its corresponding PoolID to the bottom of the PoolName/PoolID list. The Sorted Index is also updated to include the new Pool. If a Pool is to be destroyed, the Storage Manager looks up its Name using the binary search on the Sorted Index and the Pool Names it refers to. If the Pool Name exists, the destruction can continue.

API calls which perform the following functions can have concurrency implications: SMNewPool (Add a Pool Name); SMDestroyPool (Delete a Pool Name); SMPositionCPLAccessor (Pool Name Lookup); and SMNewCPLAccessor (Pool Name Lookup). In order to read or write the PNI, a semaphore has to be set up on the Block. That also means that any other Process will be blocked out during the access. Therefore, the Process should release the semaphore as soon as its operation is finished. Since all the operations on the PNI are dynamically infrequent, the need to block out other processes does not create a significant concurrency bottleneck. Note that semaphores should be implemented in a manner that allows the Storage Manager to quickly manipulate many semaphores locally and across a network at the same time. Semaphores also should be implemented at a Block level rather than on a file level.

Segments are organized into Segment Lists (SLs) which are in effect chains of Segments. There are two kinds of SLs—Pool SLs such as 1216 and Layer SLs such as 1218 and 1220 (FIG. 12). In order to find an SL, the OwnerID (i.e. the Segment ID of the head Segment) is used.

To an Application Process, there are two kinds of locks on SLs—Write-lock and Read-Lock. In order to set either of these locks, a semaphore must be obtained on the ST first. Any other Process seeking a lock on any SL is then blocked out from the ST. The semaphore should be released as soon as the operation on the ST is finished so that other pending requests for locks can be processed.

Since most SLs can be shared among Processes for read-only access, the Storage Manager maintains a Read-Count in the corresponding ST Entry (i.e. that of first Segment of the SL) to keep track of the number of readers. When a Process requests a Read-Lock on a SL, the Storage Manager increments the Read-Count. As soon as the Process finishes reading the SL, it should release the Read-Lock so the Storage Manager can decrement the Read Count.

A Write-Lock on an SL guarantees exclusive Read/Write to the SL. Therefore, a Write-Lock can only be successfully obtained when the Read-Count is zero and the SL has not given out a Write-Lock yet. As soon as the Write-Lock is granted by setting the Write- Lock field in the ST Entry to true, no other Process can access the SL either for reading or writing. Similar to reading, the Process should release the Write-Lock as soon as the writing is complete so that other Processes can access the SL.

FIG. 15 shows the structure of Pool Segment 1216 (FIG. 12). Each Pool in a Container has one Pool SL which contains all the information about the Pool including Layer topology, Layer information, Blop ID allocation, and user Pool information. There are multiple Pool SLs in a Container (equal to the number of Pools). The OwnerID (i.e. Segment ID of the first Segment) of the Pool SL becomes the Pool ID.

Each Pool SL contains only one Segment and the Segment has only five Items. As shown in FIG. 15, in addition to a header 1502 which points to the beginning of each of the five items, the five Items correspond to a Layer Matrix 1504, a Layer Name Index 1506, a BlopID Allocator 1508, a collection of Layer SLs 1510 for all Layers in the Pool and User Pool Info 1512. Their order in the Segment is predetermined.

The Layer Matrix 1504 indicates the current topology of the Layers in the Pool. Its variable size depends on the number of Layers in the Pool. The Matrix is actually a 2-dimensional array showing the topological relationship among Layers. The axes of the 2-D array are the Layers and each array element shows whether a Layer is immediately above, above, immediately below, below or in a different branch as the other Layer.

The diagonal elements of the Layer Matrix do not need to indicate a topological relationship between the Layer indicated on the horizontal axis and the Layer indicated on the vertical axis, since both axes indicate the same Layer. These elements instead contain three flags. One of the flags indicates whether the Layer is a Bottom Layer, and a second flag indicates whether the Layer is derived from a Remote Pool. The third flag is used for Layer locking, discussed below.

| | -continued |
|---|---|
| A | Layer on horizontal axis is immediately above Layer on vertical axis |
| B | Layer on horizontal axis is immediately below Layer on vertical axis |
| b | Layer on horizontal axis is immediately below Layer on vertical axis |
| X | Layer on horizontal axis is not in the same branch as Layer on vertical axis |
| * | Element contains flags for the Layer indicated on both the horizontal and vertical axes (which are the same). |

As can be seen, Layer L1 is indicated as being immediately below Layer L2 and transitively below Layers L3 and L4. Layer L2 is indicated as being immediately above Layer L1 and immediately below both Layers L3 and L4. Layer L3 is indicated as being transitively above Layer L1 and immediately above Layer L2, and as being in a different branch from Layer L4. Layer L4 is indicated as being transitively above Layer L1, immediately above Layer L2, and as being in a different branch from Layer L3.

Normally the Layer Matrix cannot be cached safely. However, the Header 1502 of Pool Segment 1216 maintains a Layer Matrix Generation Number for the Layer Matrix 1504. When a Process reads the Matrix, it can cache the Matrix and the associated Generation Number. The next time the process needs to find out about the Layer Topology, all it needs to do is to check the Generation Number without reading in the Matrix again. If the cached Generation Number and the one on-disk match, the cached Matrix is still valid. Otherwise, the Matrix must be loaded again. This can save a read operation and hence reduces time needed to lock out the Pool SL.

The following is a C language description of the structure of the Layer Matrix 1504:

```
© 1992 Apple Computer
// Layer Topology Matrix
typedef struct {
    SMSize size;              // Size of the Layer Topology Matrix
    MatrixGeneration generation;  // Generation number
    SEGMAllocRef allocRef;    // Reference to where the
                              // Layer Topology Matrix is stored
                              // in Persistent Storage
    smLayerId numLayers;      // number of Layers in Matrix
} LYRCMatrixHeader;
typedef struct {
    LYRCMatrixHeader h;       // Header (see above)
    LYRCMatrixFlags m [ ];    // Topology Matrix. Each LYRCMatrixFlags
    // represents the relationship between two Layers. They can
    // be immediately above, immediately below, transitively
    // below, transitively above, or unrelated.
} LYRCMatrix, *LYRCMatrixPtr, **LYRCMatrixHdl;
```

FIG. 16A shows the contents of a Layer Matrix 1504 for the Layer topology illustrated in FIG. 16B. Specifically, as shown in FIG. 16B, the Pool contains four Layers L1, L2, L3 and L4. Layer L1 is the Bottom Layer and Layer L2 is immediately above Layer L1. Layers L3 and L4 are both immediately above Layer L2. Each element of Layer Matrix 1504 (except diagonal elements) indicates the topological relationship of the Layer indicated on the horizontal axis to the Layer indicated on the vertical axis. The following code is used:

| A | Layer on horizontal axis is immediately above Layer on vertical axis |
|---|---|

Note that storage of the Layer Matrix can be optimized by storing it as a triangular matrix rather than a rectangular matrix because the upper half contains the same information as the lower half.

A Layer may or may not have Name(s) associated with it. If it does, the Layer Name(s) is stored in a structure called Layer Names Index (LNI). Its structure and usage are similar to those of PNI. As shown in FIG. 17, the LNI 1506 contains a Header section 1702, which stores the offsets from the beginning of the block and lengths of the two other sections. It also contains a Layer Name/LayerID list 1704, which is an unsorted list of Layer Names and the LayerIDs of the corresponding Layers. LNI 1506 also contains a Sorted Index 1706, which is a list of entries containing offsets from the beginning of the Layer Name/LayerID list, sorted by alphanumeric order of Layer Names. FIG. 17 illustrates the contents of LNI 1506 for the Layer Topology of FIG. 16B, and for the situation where Layer L1 is named "original", Layer L2 is named "Current", Layer L3 is named "Dave's", and Layer L4 is named "Tantek's".

There are times when a Layer Name needs to be found given a LayerID. The design of the LNI in the present embodiment forces a sequential search through Layer Name/LayerID list A way to improve this is to sort the Layer Name/LayerID list using the LayerIDs. Binary search can then be performed to find the Layer Name very quickly.

As previously mentioned, each Layer has an SL to store its information and data. The Layer Collection section 1510 of Pool SL 1216 is a linear array of references to the Layer SLs. The index of the Layer into the Layer Collection becomes the LayerID.

LayerIDs need to be persistent because they are used to refer to Layers both within a Process and across Processes. However, there are problems with persistent LayerIDs since its persistence limits its reusability and thus can unnecessarily occupy space in the storage medium. For example, if a Process does a sequence of New, Save and Close, a bunch of empty Layers are created and destroyed. However, LayerIDs and storage in Layer Collection are assigned to these destroyed Layers. In order to reuse these Layer Collection Entries, a Generation Number is associated with each LayerID. Every time a Layer is destroyed, a tombstone is stored in place of the Layer SL and the Generation Number is incremented by 1. When a Process wants to access a Layer by LayerID, it has to check the Generation Number. If the Generation Number held by the Process is the same as the one on disk, the operation can proceed. A different Generation Number means a new Layer has been created using the same LayerID and storage in Layer Collection.

FIG. 18 shows the structure of Layer Collection 1510. Each entry contains a Layer Data SL No., which is the Segment ID of the first segment of the Layer represented by the entry, and a generation number. If a Layer has been destroyed, its Layer Data SL No. is 0 and its Generation Number is greater than 0. If a Layer has been destroyed and is presently in re-use, its Layer Data SL No. is non-zero and its generation number is greater than 0. In the present embodiment, since an Item Block can hold 2^32 bytes of information and each Entry needs 8 bytes (2^3 bytes), Layer Collection 1510 can contain up to 2^29 Layers. That also means that a Pool is limited to 2^29 Layers.

The following is a C language definition of the Layer Collection 1510:

```
© 1992 Apple Computer
// Layer Collection
typedef struct {
    SEGMItemId ownerID;       // Reference to Layer in Persistent
                              // Storage
    LayerGeneration generation;  // Generation number
} LayerCEntry, *LayerCEntryPtr;
typedef struct {
    SMSize size;              // Size of the Layer Collection
    SMBoolean modified;       // Boolean value showing whether
                              // the Collection has been changed
    SEGMAllocRef allocRef;    // Reference to where the Layer
                              // Collection
                              // is stored in Persistent Storage
    smLayerId freeEntry;      // Pointer to the next free entry
} LYRCCollectHeader;
typedef struct {
    LYRCCollectHeader h;      // Header (see above)
    LayerCEntry layerEntry[ ]; // Layer Entries (see above)
} LYRCCollect, *LYRCCollectPtr, **LYRCCollectHdl;
```

Every Blop has a persistent ID called BlopID.

BlopIDs are unique within a Pool. Therefore, it is the Pool's responsibility to keep track of used BlopIDs and to hand out unused ones for new Blops. Each Pool SL has an Item allocated to manage BlopID Allocation (BID).

A BlopID Allocator 1508 is shown in FIG. 19. It consists of a Header 1902 and an array of records 1904. The Header 1902 maintains a Master High Water Mark 1906, the number 1908 of ranges currently in the Allocator and a bitmap 1910 showing which ranges are currently being used. Each record 1904 maintains a range of BlopIDs by storing the end of the range 1912 and the High Water Mark 1914 (i.e. the highest BlopID that has been used by the Process to which the range is currently assigned) in the range. When a Process obtains write access to a Layer, one of these records is assigned to the Process. Hence, multiple concurrent Processes can create Blops using different ranges of the BlopID space.

If a Process uses up all the BlopIDs in the range assigned, it can request another range from the BlopID Allocator. The record maintaining this full range is then removed from the BlopID Allocator. Therefore, BlopID Allocator contains only Ranges with unused BlopIDs. If all the ranges are used up, the BlopID Allocator will create new ranges for more unused BlopIDs. Note that the Ranges stored in the BlopID Allocator need not be of the same size.

The User Pool Info section 1512 of Pool Segment 1216 is available for users to store Pool related information. The User Pool Info is stored in an Item in Pool SL and is treated as a stream of bits. The size limit of the Segment Manager Item (2^32 bytes) is the maximum size of User Pool Info for a Pool.

With respect to concurrency, many Processes can read a Pool List at the same time but there can only be one writer at a time. Therefore, whenever a Process has read access to a Pool SL, all Processes seeking write access to the same Pool SL are blocked out. On the other hand, a Process with write access blocks out any Processes which is trying to access the same Pool SL. Since most of the operations on a Pool SL are dynamically infrequent, a Process can obtain exclusive read and write access to Pool SL with very little chance of blocking out other processes. The same is true for moderately frequent operations which take a short time to execute. Write-lock and Read-Count for the Pool SL are kept in the corresponding ST Entry. The detailed operations of setting and releasing the lock are outlined hereinafter. The following pseudocode is an example of a preferred scenario for updating a Pool SL:

```
Get Semaphore on ST
    Get Write Lock on Pool SL
Release Semaphore on ST
Modify Pool SL
Get Semaphore on ST
    Release Write Lock on Pool SL
Release Semaphore on ST
```

There are some moderately frequent operations which take a long time to complete (e.g. MoveAllChangesDown). These calls are mainly used for multi-Layer operations. In order to allow other processes which do not involve these Layers to proceed, the Layer Matrix provides another set of locks for the multi-Layer operations. The idea is that the Process doing a multi-Layer operation would only block out the Pool SL just long enough to set these Layer Matrix Locks. After the Pool SL is released, any other process which would like to perform an operation on any of these Layers will find it locked. The Layers will become available to other processes when the original Process releases the Layer Matrix Locks. The following pseudocode shows how MoveAllChangesDown can be implemented:

```
Get Semaphore on ST
-    Get Write Lock on Pool SL
Release Semaphore on ST
Get Layer Matrix from Pool SL
If Layer Topology allows MoveAllChangesDown, get Layer Matrix
    Locks on Layers.
Get Semaphore on ST
    Release Write Lock on Pool SL
Release Semaphore on ST
Move Changes down (See routine details below)
Get Semaphore on ST
    Get Write Lock on Pool SL
Release Semaphore on ST
Release Layer Matrix Locks
Get Semaphore on ST
    Release Write Lock on Pool SL
Release Semaphore on ST
```

Figure 20:
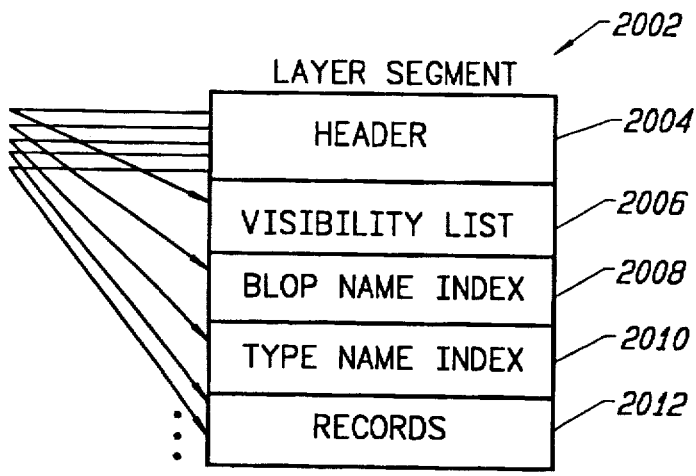
FIG. 20 illustrates the structure of a Layer Segment of FIG. 12.
Figure 21:
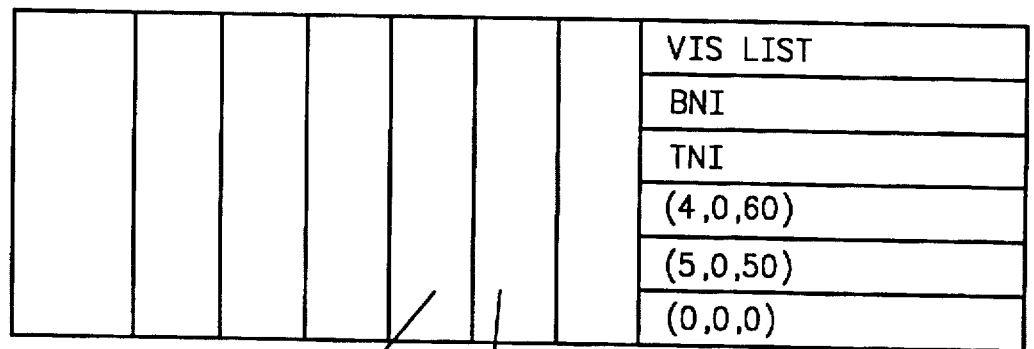
FIG. 21 illustrates the structure of a Blop of a Compound Type.
Figure 21:
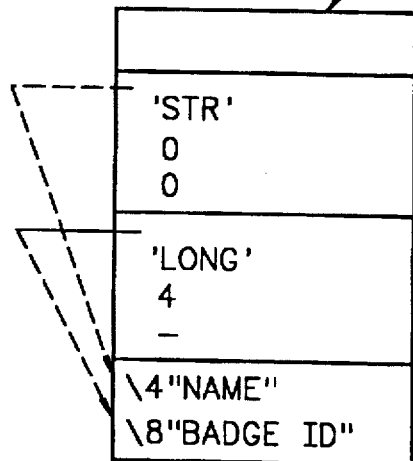
Figure 21:
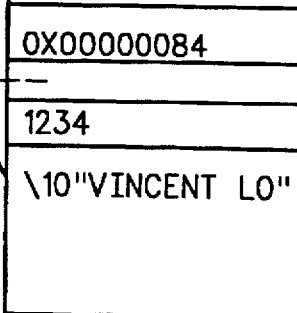

FIG. 20 shows the structure of a Layer Segment 2002 such as one of the Segments of Layer Segment List 1218 (FIG. 12). A Layer SL is used to store and organize Types and Blops created or instantiated in the Layer. Blops have both Properties and Data, and Types (except for Basic Types) have Properties. Properties and Data are stored in Items of a Layer SL. The corresponding ItemIDs become the Property IDs (PID) and Data IDs (DID). Structurally, there is no difference in the way Properties and Data are stored and manipulated because both are Items of a Segment. They are named differently just to show that they contain different kind of information. Compound Types and Blops of a Compound Type may have a hierarchy of PIDs and DIDs associated with it. PIDs and DIDs are described in more detail below. FIG. 21 is an example of a Blop of a Compound Type.

Each Segment can contain up to (BlockSize—HeaderSize —NumberofBlockEntries)/9 Items. Therefore, each of these can have up to the same number of Property and Data Blocks. However, this does not map directly to how many Blops one can store because one Blop may use more than one PDB (Property Data Block) and DDB (Data Data Block).

Referring again to FIG. 20, a Layer Segment 2002 contains a Header section 2004, a Visibility List 2006, a Blop Name Index (BNI) 2008, and a Type Name Index (TNI) 2010, all in addition to the records 2012. The header section 2004 includes a pointer to the next Layer Segment in the Layer SL 1218, a count of the number of Free Items, the largest gap, a Free block entry, and Permissions, among other things. It also includes pointers to the other sections of the Layer Segment 2002, including pointers to the individual Items in the records section 2012.

The Visibility List 2006 refers to Blops created and instantiated in the Layer. By going through Visibility Lists of a Layer and all the Layers below it, one can both determine the "view" of the Layer and reach all of the Blops in the view.

There are two kinds of Visibility Lists. The first kind is Complete Visibility List (CVL). CVL is an array identifying all the Blops visible from that Layer. Thus, it includes Blops created and instantiated in that Layer as well as unchanged Blops from Layers below. BlopID is implicit in the ordering of the CVL.

FIG. 22A is an example of a CVL for a Layer such as that depicted symbolically in FIG. 22B. In FIG. 22A, the first Blop 2202 implicitly has the BlopID of 0, the second Blop 2204 implicitly has a Blop ID of 1 and so on. Each array record contains the Root DID of the Blop to which it refers. From the Root DID, one can access the rest of the DID hierarchy. The Blop's PID is also stored in the DID, so the Properties can be retrieved also. In a different embodiment, a CVL entry might contain both the DID and the PID of the Blop. Blop 0 cannot be accessed directly by a Process. It is reserved for Layer Properties. If there is no Property for a Layer, the record contains a predefined DID (0) to show that there is no Property associated with the Layer. Layer Properties are a place where the Storage Manager can store bookkeeping information about a Layer. Different embodiments might store different information there, or omit it entirely, or include it and allow direct access to it by a Process in the normal manner.

The second kind of Visibility List is Delta Visibility List (DVL). Unlike CVL, DVL only stores Blops that have been created, destroyed, or changed since the last CVL. Therefore, each DVL array record contains both the BlopID and its Root DID. Since a Layer does not inherit Properties from its parent(s), the first record of DVL is always initialized to reflect that a new Layer has no Properties. For example, if Layer L2 is created above Layer L1 in the example of FIGS. 22A and 22B, as shown symbolically in FIG. 23B, and Blop A has been changed, then the Visibility Lists for Layers L1 and L2 are those shown in FIG. 23A. As can be seen, record 2302 in the DVL for L2 corresponds to BlopID=0 and record 2304 in the DVL for L2 corresponds to BlopID=1. The presence of an array record 2304 for BlopID=1 in the DVL for L2 indicates that the corresponding Blop was in some manner changed from the previous Layer L1, and the DID of 0×284 in record 2304 is the Root DID of the new version of the Blop. If the DID in record 2304 were 0, then that would indicate that the Blop was deleted entirely relative to Layer L1. The absence of any record in the DVL for Layer L2 for BlopIDs 2 and 3 indicates that the Blops identified by records 2206 and 2208 in Layer L1 are unchanged in Layer L2.

DVLs have the advantage over CVLs of occupying less space. However, the use of a DVL increases the average time needed to find a Blop's DID. In order to reduce processing time, DVLs are created for most derived Layers but CVLs are created to checkpoint all the changes of the Layers below it. FIGS. 24A and 24B illustrate an example of this. Several rules are possible for determining when to create a CVL. For example, one rule is to create DVLs for a certain number of Layers and then create a CVL after that number of Layers (hence DVLs) have been created. A preferred rule is to set up a threshold for the DVL (percentage of Blops that have been changed). If the threshold is reached, a CVL instead of a DVL is created the next time a Layer is created.

Visibility Lists provide not only a means to locate the Root DID for a Blop, but also the structure for versioning. Routines such as MoveAllChangesDown, MoveChangesDown, CopyAllBlopsUp and CopyBlopsUp depend heavily on the Visibility Lists. The Visibility Lists form part of the physical structures in the present embodiment which maintain the view that a Layer has of the Blops in a Pool.

The following is a C language definition of a Visibility List:

---

© 1992 Apple Computer
// Visibility List
typedef struct {
    smULong flags;  // indicate what kind of Visibility List
                            // this is (Complete Visibility or Delta
                            // Visibility List)
} VISLHeader;

```
-continued typedef struct {
    VISLHeader h;      // See above.
    smHandle vList;    // Handle containing VLEntry (see below)
} VISL, *VISLPtr;
typedef struct {
    smDBID id;         // ID of the Blop (can be omitted for
                       // Complete Visibility Lists)
    smULong generation; // Generation number of the Blop
                       // within this Layer
} VLEntry;
```

Referring again to FIG. 20, the Blop Name Index (BNI) 2008 and the Type Name Index (TNI) 2010 are similar in structure to the Layer Name Index (LNI) of FIG. 17. Types are named and their Names are stored in the TNI. Blops can be named and Blop Names are stored in the BNI.

Note that the structure shown in FIG. 17 for name indices cannot handle a large number of Names efficiently. An extension to the scheme can solve the problem—when the size of the Names reaches a certain threshold, a dynamic hash table is created and the Names are then distributed in the hash table buckets. Also, in another embodiment, it may be useful to limit Type Names to a fixed length and thereby alter the structure of the TNI to save much disk space.

Unlike Visibility Lists, TNIs and BNIs do not have delta versions. They always contain a complete set of Names for the Layer. This simplifies Name search using ID and vice versa.

With respect to concurrency, more than one Process can read a Layer SL at the same time. The Read Count of the corresponding ST Entry is incremented when a Process positions a CPL Accessor to the Layer with "read" permission. However, only one Process can write to a Layer SL at one time. A write-lock is obtained when a Process positions an CPL Accessor to the Layer with "write" permission. The exclusive read-and-write access is obtained by setting the write-lock of the corresponding ST Entry. When the accessing is done, the Process can then release the lock so that other Process can access it.

For read-access to a Layer SL, a Process can cache every structure of the SL and the SLs of the Layers below it. This is because no one can change any of these SLs when the Process has read-access to the Layer. However, if the Process releases the read-lock (e.g. by repositioning a CPL Accessor), all the cached data of the Layer SL may need to be flushed. For write-access to a Layer SL, a Process can also cache every structure of the SL as the Process owns the sole access right to the SL. This also means that all the Visibility List, Name Index and Data manipulation can be done in memory. When the Process releases the write-lock, all the changes need to be flushed to disk. The minimal interaction with disk allows good performance for the Storage Manager.

Besides Read-lock and Write-lock, Layers also provide two additional kinds of permission for access. The first kind is called Null-lock. That means the Process has positioned a CPL Accessor to the Layer with no intention of reading or writing the Layer. Most of the time the Process is traversing through the Layers when this happens.

The other kind of permission is called Transient Reader. This permission is granted when a Layer in another Pool is derived from the Layer. There is no guarantee that the above Pool will detach correctly. In the case when the above Pool does not detach correctly (e.g. the process handling the above Pool crashes), the bottom Pool is put into a bad state as no other Process can gain write-access to it. However, if the Storage Manager finds out that the bottom Pool has granted "Transient Reader" permission, the Storage Manager can then go through all the Processes which have derived Layers from the Layer to see whether they are still running. If none of the Processes is running, Storage Manager will revert the state of the Pool back to normal and continue to grant permission to other Processes for read or write access.

Garbage Collection. The Storage Manager implements many levels of garbage collection (GC). The lowest level is on the Segment Manager level which emphasizes on crash recovery and disk compaction. However, that is not enough for the Storage Manager. There are several other structures that require more than shuffling of Blocks.

For example, ST Entries are assigned to Pool SLs and Layer SLs. When a Pool or a Layer is deleted, the corresponding ST Entry can be reused. One way to reuse them is to create the new Pools and new Layers using these "freed" Entries. Another way is to juggle existing Entries to fill up these "freed" ones and shrinking the ST afterwards during GC time. The second method may require a walk-through of many on-disk structures (e.g. PNI, Pool SLs and their Layer Collections) to update the appropriate references.

Another example is in Layer Collection. As mentioned, Layer Collection Entries in the Pool List can be reused if a Generation Number is associated with each Entry. However, associating a Generation Number to a LayerID means more bits are needed to uniquely identify a Layer. If only 32 bits are to be used, the Generation Number can only go from 0 to 63 (as 26 out of 32 bits are used for LayerID). If more than 32 bits are used, passing the LayerIDs may be troublesome.

Also, while the Segment Manager provides utilities to garbage collect unused Items in a Layer SL, that may not be sufficient. During GC time, every Item should be checked to make sure that its PID or DID references are still valid. If not, they need to be updated. This is a very time-consuming operation. However, it can be sped up a little by keeping a "has reference" bit in the Layer Segment for each Item. During GC time, only the ones with "has reference" bit set need to be examined.

B. Blops, Values and Types

It will now be described how Properties, Types and Values of a Blop are actually represented in memory and in the storage apparatus. As previously mentioned, a Blop consists of a list of Properties, each of which can have a number of elements associated with it. An element can be a Value and Type combination, in which case the Type is a Basic Type (such as 'string', 'long', etc.) and the Value is the data for the element. An element can instead be a Compound Type, in which case it merely refers nestably to another list of Properties.

The Property information in a Blop is represented in memory and in the storage apparatus as a hierarchy of one or more Property Data Blocks (PDBs). The Property Data Blocks point to one or more Data Data Blocks (DDBs) where the Values are actually stored. If a Blop has no Compound Types, then the Blop has only one PDB. If the Blop does have Compound Types, then for each such Compound Type, the PDB points to another PDB which contains the Property information for the Properties included in the Compound Type. As with the first PDB of a Blop hierarchy, if one of the Properties in a PDB of a Compound Type is itself of a Compound Type, then the PDB entry for that Property points to yet another PDB which contains the Property information for the Properties included in that Compound Type, and so on. Because of the equivalence of the first PDB of a Blop and PDBs of Compound Types included in the Blop, even the first PDB of a Blop is sometimes referred to herein as representing a Compound Type.

The Storage Manager uses a PID (short for Property Data Block ID) to identify a PDB within a Pool. Each Compound Type has at least one PDB associated with it. If a Property is in turn of a Compound Type, the PDB stores the PID of the PDB which contains the Property Information of the Compound Type.

FIG. 25 shows the structure of a PDB 2502. As shown, it consists of a PDB Header 2504, a Property Name List 2506, a Property Section 2508, a Sorted Name List 2510 and a Preferred Path Offset section 2512. The PDB Header 2504 contains offsets to other sections of the PDB. The Property Name List 2506 contains an unsorted list of names of all the Properties in the Compound Type. The Properties section 2508 contains an array of Property information. Besides an offset 2514 into the Property Name List, each element of the Properties section also contains a Value Type 2515, a Property Offset 2516 and a Variable Property Index 2518.

The Value Type 2515 specifies how the Value Data of the Property is to be interpreted. It can be either a Basic Type or a Compound Type, and if a Compound Type, then it contains the PID of the PDB which further breaks down how the Value Data is to be interpreted. If the Value Data for a given Property contains multiple Values of a single Type, then Value Type 2515 in the Property Information element corresponding to that Property specifies the interpretation of each such Value. If the Value Data for a given Property contains multiple Values of different Types, then the Value Type 2515 in the Property Information element corresponding to that Property is usually superceded and ignored. It will be seen that certain kinds of DDBs can contain their own specification for Value Types, and those specifications supercede the Value Type entry 2515 in the PDB.

Property Offset 2516 is the offset (in bytes) into the Data structure where the Value(s) of the Property begins. For example, if a Type consists of two Properties and each Property has one Value of Basic Type 'long' (32-bit Value), the offset for the first Property is 0 and that for the second is 4. In order to handle variable-size structures, 4 bytes are used for each variable-size Property. For example, if a Type consists of two Properties with the first one having one Value of a variable-size Type 'str' and the second having one Value of Type 'long', the Property Offset for the 'str' is 0 and that for the 'long' is 4. Note that if a Property is of a Compound Type, then the Property Offset still points to the location in the Data structure where the Values of the several Properties of the Compound Type begin. The Property Offset for the next Property of the Type can then be significantly more than 4 bytes above the Property Offset for the Property which is of a Compound Type.

The Variable Property Index 2518 is the running number of variable-size Properties in the Type, including those referenced indirectly via a Compound Type chain. The Index does not include the number of variable-size Properties in the current Property itself, and is −1 if the Type has a fixed size.

The Sorted Name List in the Property Data Block 2502 is a list of indexes into the Property Name List and offsets into the Properties Section where the Property information resides. The order of the indexes is the sorted order of the Property Names. The Preferred Path Offset 2512 is a list of offsets into the Type's PDBs. These offsets refer to Properties of the Preferred Path. The Preferred Path of a Blop (or a Compound Type) is a default position for a BPV Accessor being positioned into the Blops. For example, if a Blop represents a paragraph of text, only one of the Values of which is the text itself, the application program may set the Preferred Path of the Blop to point to this Value since that is what the user desires most of the time.

Figure 26:
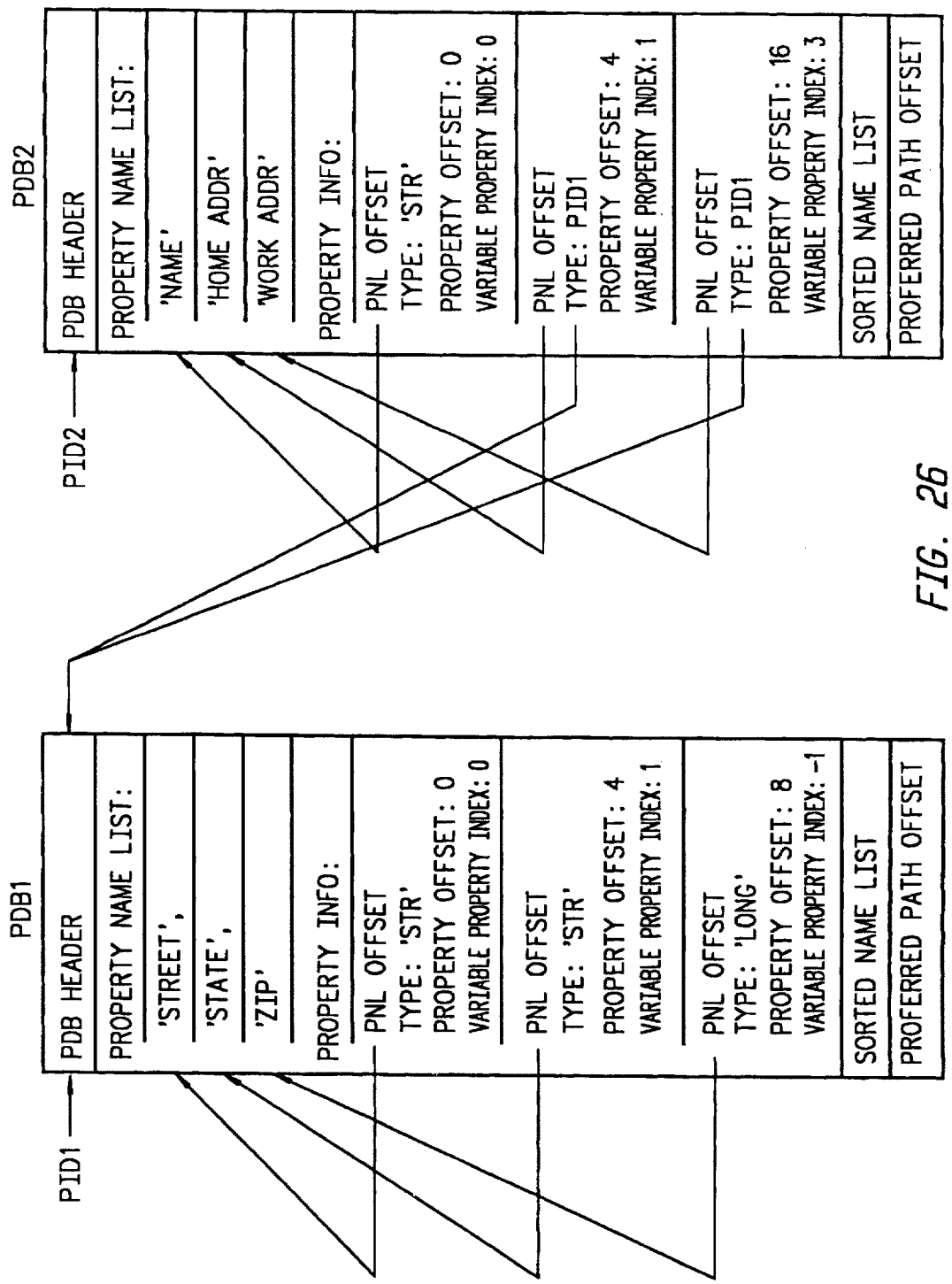

Note that a Compound Type PDB can be invoked more than once in a PDB hierarchy. FIG. 26 is an example of the structure of a Compound Type which occupies two PDBs, identified as PDB1 and PDB2. PDB1 contains the Property information for a Compound Type useful for storing a person's address, and PDB2 contains the Property information for a Compound Type useful for storing a person's personal information. Specifically, PDB1 has three Properties, named 'Street', 'State' and 'Zip'. All contain single Values of Basic Types 'str', 'long' and 'long', respectively. Accordingly, if PDB1 were the first PDB in a Blop, the Property information for the entire Blop would be stored in this one PDB.

The Property Offset for the first Property in PDB1 is 0, and since the Type of the Value for the first Property is a variable length Type ('str'), the Property Offset for the second Property in PDB1 is 4. Similarly, since the Type of the Value for the second Property is also of a variable length, the Property Offset for the third Property in PDB1 is 8. The Variable Property Index (VPI) for the first Property in PDB1 is 0, indicating that no variable length Values precede the Value for the first Property. Since the first Property in PDB1 does have a variable length Type, the VPI for the second Property is 1. The VPI for the third Property is −1, indicating that the Type of the third Property ('long') does not have a variable length.

PDB2 has three Properties named 'Name', 'Home Addr' and 'Work Addr', respectively. The Type of the Value for the first Property is the Basic Type 'str'. The Type of the second Property in PDB2 is a Compound Type, so the Properties section of PDB2 contains the Value PID1 as the Type for the second Property. PID1 identifies the Compound Type which begins (and in this case ends) with PDB1. The Type of the third Property in PDB2 also contains PID1, since it is useful to use the same format to define Value data for a Work Address as a Home Address. The Property Offset in PDB2 is 0, and since the Type of the Value associated with the first Property is a variable length Type ('str'), the Property Offset for the second Property in PDB2 is 4. Since the Compound Type of the second Property contains 12 bytes of offset, the Property Offset for the third Property in PDB2 is 4+12=16. The Variable Property Index (VPI) for the first Property in PDB2 is 0, indicating that no variable length Values precede the Value for the first Property. Since the first Property in PDB2 does have a Value with a variable length Type, the VPI for the second Property is 1. The VPI for the third Property is 3, because the Type of the second Property (PDB1) contains two variable length Values.

Figures 27, 28:
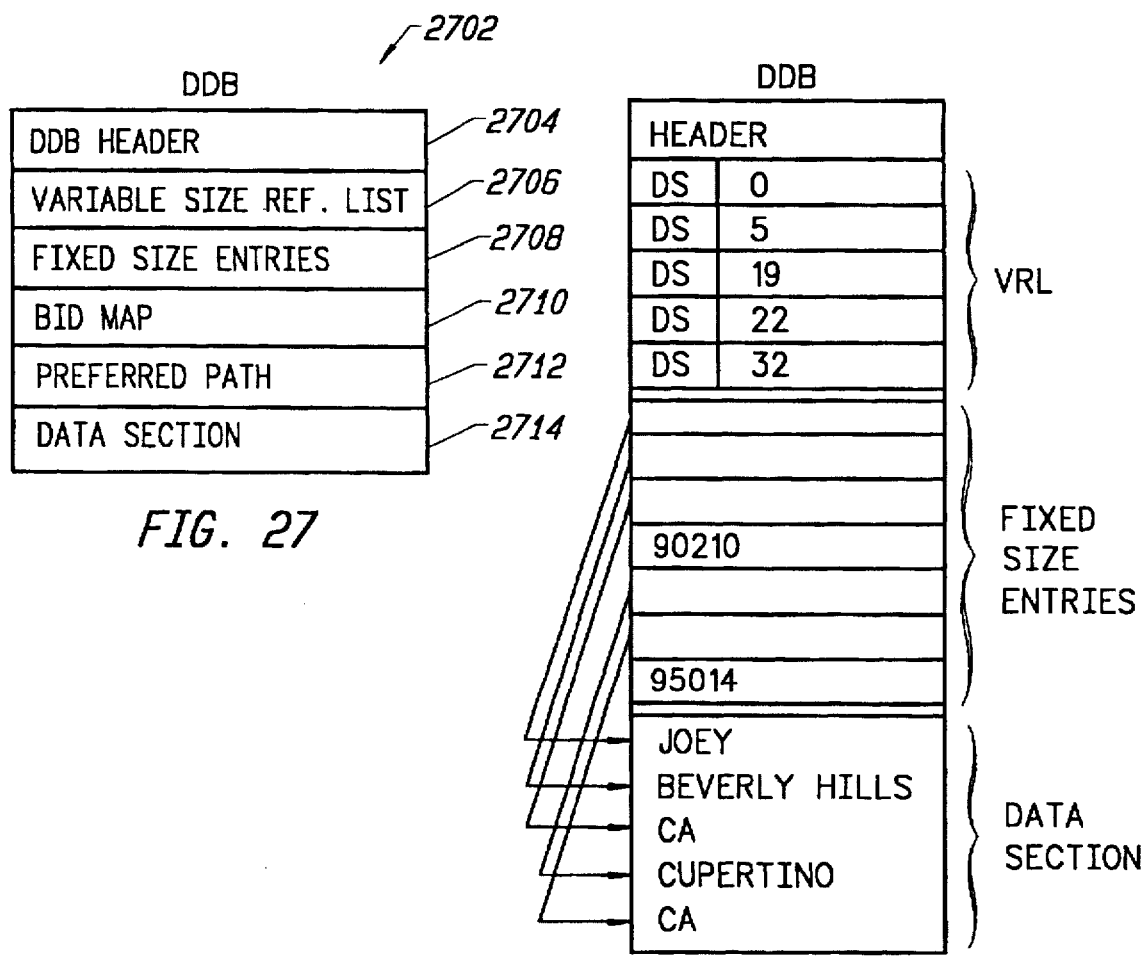

While the Type and its Properties are stored in PDBs, Values are stored in Data Data Blocks (DDBs). DDBs are identified by their DDE IDs (DIDs) and, depending on how much non-Value information needs to accompany the Value Data itself, different kinds of DDBs might be used. FIG. 27 shows the structure of one kind of DDB 2702. It will be useful to describe this kind first since it is the kind which the present embodiment uses for the first DDB in a DDB hierarchy (of one or more DDBs). The DDB 2702 comprises a DDB Header 2704 which contains offsets into other sections; and a Variable-size Reference List (VRL) 2706. The VRL 2706 is a list of entries, each of which corresponds to a variable-size Value. Only variable size Values have corresponding entries in the VRL 2706. Since a variable-size Value may reside in either of two places in the same DDB or in a separate block in a local or remote Pool, each entry has a flag to show the location of the Value. Each entry in VRL 2706 also contains a 4-byte field which serves different purposes depending on where the Value Data is located. The following table sets forth the meaning of each Flags setting and the corresponding purpose of the 4-byte field.

| Flags Setting | Location of Value Data | 4-byte Field |
| --- | --- | --- |
| VRL | In the 4-byte Field | Contains the Value Data |
| DS | In the Data Seciton of the same DDB | Offset into Data Section where Value Data Begins |
| Separate | In a separate DDB | Reference to the location of the seprate DDB in persistent storage (i.e. the DID of such DDB) |

DDB 2702 also includes a Fixed-size Entries (FSE) section 2708, which has an entry corresponding to every Value in the Type (whether the Value is fixed or variable length), including Values which are located in another DDB. For Values which are fixed size, the corresponding entry in the Fixed-size Entries section 2708 stores the Value itself. For Values which are variable size, the corresponding entry in the Fixed-size Entries section 2708 contains the actual address in memory where the Value data itself begins. This means that if the variable size Value Data is located in the 4-byte field after the flags in VRL 2706, then the entry in FSE section 270 contains the address of that 4-byte field. If the variable size Value Data is located in the Data Section of the DDB 2702, then the entry in PSE section 270 contains the address of the Value Data in that Data Section. If the variable size Value Data is located in a separate DDB, then the entry in FSE section 270 contains the address in that DDB where the Value Data begins.

DDB 2702 also contains a BIDMap 2710, which is used to locate external references in the Value, and a Preferred Path section 2712, which contains information to locate the Value for the Preferred Path. A Preferred Path entry may contain a direct offset to a Value or a path name which needs to be solved using the Types. The former method is useful when the Type information is not available. If the Type also has a Preferred Path, it will be preempted by the one in the DDB 2702.

FIG. 28 shows an example of a DDB which might be produced for the Compound Type described above with respect to FIG. 26. The BID Map and the Preferred Path section is omitted for the sake of clarity. Also, all the Values in this example are stored in the Data Section of the same DDB, none being stored in a separate DDB and none being stored in the VRL 2706. For the purpose of calculating the offsets in the 4-byte fields following the flags in the VRL 2706, note that each of the variable size values in Data Section 2714 terminates with a null byte.

As mentioned above, the presently described embodiment of the Storage Manager supports several different kinds of DDBs. If a VRL entry in a DDB of the type indicated in FIG. 28 indicates that Value Data is stored in a separate DDB, then the separate DDB can be any of the kinds illustrated in FIGS. 29A, 29B and 29C. These kinds of DDBs are referred to herein as secondary kinds, the kind illustrated in FIG. 28 being a primary kind. The Storage Manager automatically determines the best kind of DDB to use depending on the size of the Value Data, whether the Value Data for the particular Property contains multiple Values, and whether the multiple Values are all of the same Type or are of multiple Types. All of the DDB kinds of FIGS. 29A, 29B and 29C can be thought of as either degenerate or enhanced versions of the DDB of FIG. 28 and, another embodiment of the Storage Manager might use a more general kind of DDB in an instance where the present Storage Manager uses a less general kind. For example, another embodiment of the Storage Manager might use the most general kind of DDB, illustrated in FIG. 29C, for all the DDBs in the data structure.

In FIG. 29A, it can be seen at the first alternative kind of DDB 2902 consists of the Data Section 2714 only of the general DDB format 2702 (FIG. 27). The kind of DDB illustrated in FIG. 29A is useful for storing Value Data for a Property which has exactly one variable size Value associated with it. No Type information need be stored with the Value Data in this situation because the Type is specified in the Value Type field 2515 of the Properties element 2508 in the Properties section of the corresponding PDB (see FIG. 25). A different embodiment might support a slightly more general kind of DDB which includes a Value Count header in addition to the Data Section 2714. Such a DDB might be used to store the Value Data for a Property which has associated with it either several Values of a single, relatively large fixed-length Type, or a large number of Values of a single, relatively small fixed-length Type.

The DDB 2904 illustrated in FIG. 29B is useful where a Property has associated with it multiple Values of a single variable-size Type. As can be seen in FIG. 29B, the DDB 2904 contains the Header section 2704, the VRL section 2706, and the FSE section 2708 of FIG. 27, but does not include the BID Map section 2710, Preferred Path section 2712, or Data Section 2714 of FIG. 27. The Header section 2704 in the DDB 2904 contains a count of the number of Values associated with the corresponding Property, and each Value is stored in a separate DDB such as 2906 or 2908. The DDBs 2906 and 2908 are of the same kind as that of FIG. 29A, containing only the Data Section 2714. The VRL 2706 of DDB 2904 includes only the references to the locations of DDBs 2906 and 2908 in persistent storage (i.e., the DIDs for Data Sections 2906 and 2908), and the FSE section 2708 includes only the pointers to the locations where the DDBs 2906 and 2908 begin in memory.

FIG. 29C illustrates the most general kind of secondary DDB supported by the Storage Manager of the present embodiment. It comprises the Header section 2704, the Variable-Size Reference List 2706, the Fixed Size Entries section 2708 and the Data Section 2714 of FIG. 27. The DDB 2910 might also include a BID Map 2710 and a Preferred Path section 2712 (not shown in FIG. 29C). The Header section 2704 of DDB 2910 contains a count of the number of Values associated with the corresponding Property. The VRL section 2706 contains an element for each of the Values associated with the Property, each including a Flags field 2912 and a 4-byte multipurpose field 2914, similar to the structure of a VRL entry in the DDB of FIG. 28. In the DDB 2910, however, each VRL element also includes a Type field 2916 which specifies the Type of the Value to which the VRL element corresponds. The Type specified in this field can be either a Compound Type, in which case the field 2916 contains the PID of the PDB which further described the Type, or a Basic Type. These Types can also be either fixed or variable size.

FSE section 2708 of DDB 2910 contains the memory address at which each Value associated with the Property begins, which may be in the Data Section 2714 or in a separate DDB such as one of the kind shown in FIG. 29A. DDBs of the kind illustrated in FIG. 29C are useful where a Property has associated with it multiple Values of multiple Types.

Where one of the primary DDBs such as that shown in FIG. 28 invokes different DDBs for different Properties, it might invoke DDBs of several of the kinds illustrated in FIGS. 29A, 29B and 29C for different ones of the Properties. The Storage Manager of the present embodiment attempts to make an intelligent choice as to where the Value Data of each Property is stored, and if in a separate DDB, which kind of DDB to use. If the data storage medium is made up of fixed sized blocks, such as the 512-byte block size of a disk, all bytes of which need to be written or read in a single access, then the Storage Manager attempts to maximize the usage of each block to thereby minimize the number of accesses which are required to the data storage medium. Thus, if Value Data is likely to overrun the end of a block if stored in the Data Section 2714 of a given DDB, then the Storage Manager is likely to locate such Value Data in a separate DDB instead. On the other hand, if the Values associated with a particular PDB are of a size and quantity which are likely to fit within the same block as the primary DDB, then the Storage Manager is likely to place the Value Data in the Data Section of the DDB. The Storage Manager uses the following criteria to determine where each Value of a given Property should be stored: The number of Values associated with a given Property; the number of Types of Values associated with a Property; whether the Values are of fixed or variable size; and the size of each of the Values.

The following table shows the different combinations of the criteria and the resulting choice for the location of the Value. An asterisk indicates that while Value Data might be stored more efficiently in the given situation that the manner described, the given situation is so rare that the Storage Manager saves on overall execution time, code complexity and storage space by storing such Value Data in the otherwise less efficient manner indicated.

|  | Single Type Single Values | Single Type Multiple Values | Multiple Type Multiple Values |
|---|---|---|---|
| Small Fixed | FSE Section | Data Section or, if many Values, Separate DDB (FIG. 29A) | Separate DDB (FIG. 29C)* |
| Big Fixed | FSE Section or, if huge, Separate DDB (FIG. 29A) | Separate DDB (FIG. 29B) | Separate DDB (FIG. 29C)* |
| Tiny Variable (≤4 Bytes) | VSL multi-purpose field | Separate DDB (FIG. 29B) | Separate DDB (FIG. 29C) |
| Small Variable | Data Section | Separate DDB (FIG. 29B) | Separate DDB (FIG. 29C) |
| Big Variable | Separate DDB (FIG. 29A) | Separate DDB (FIG. 29B) | Separate DDB (FIG. 29C) |

Each Variable-size Value must also have a byte-count or a. delimiter associated with it. This should be described in the Type description.

Note that PDBs and DDBs are in the scope of a Pool. Therefore, one cannot reference a Data Block in another Pool using solely PIDs and DIDs. In order to provide context for a remote PID or DID, each Pool keeps a list of Remote Pool information referenced by its PDBs and DDBS. Each entry in the list contains the Container Name, the Pool Name and even a Layer Name. Remote Pool Indexes (RPIs), maintained as part of the Pool, are used to refer to the entries. Using a PID or a DID together with its corresponding RPI, one can locate the exact Data Block even when the Block is in a remote Pool.

During runtime, this Remote Pool information is maintained by a Workspace structure called Workspace Remote Pool Table. Every time a remote Data Block is being referenced, its remote Pool information is entered into the WRPTable. Any Workspace structure will then have a Workspace Remote Pool Index (WRPI) associated with the remote PID or DID. In order to speed up the insertion into the WRPTable and lookup of a WRPI, a lookup table using Pool and RPIndex is also maintained.

Both BPV Accessors and CPL Accessors have a PDB cache and a DDB cache. These caches greatly reduce disk I/O and also provide predictable behavior for the user. Any Data Blocks loaded are cached in the BPV Accessor. When the BPV Accessor is released, these Data Blocks are moved to the CPL Accessor caches. These Data Blocks only need to be flushed when memory is low or when the CPL Accessor is repositioned to another Layer.

Each BPV Accessor also has a Path Stack associated with it. The Path Stack shows the current path of the Property/Value to which the BPV Accessor is referring. A Path Stack contains many Path Stack Elements chained together. Each Element represents either a refinement of the path or an indirect Type/Value. Therefore, by following the chain, one can easily find out the current path and navigate efficiently.

Figure 30:
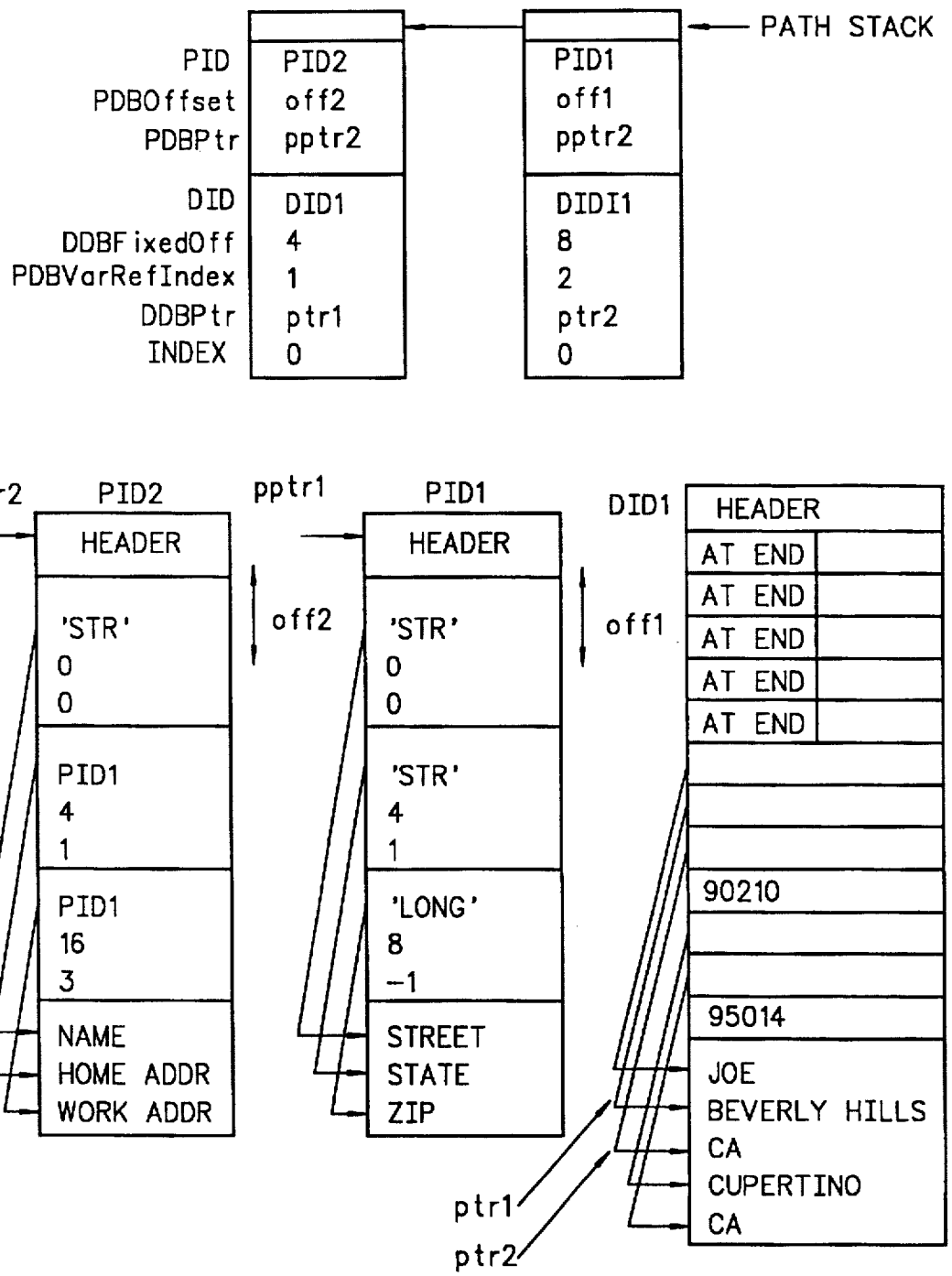
FIG. 30 illustrates the structure of a Path Stack.

Every Path Stack Element contains information about the Type and the Value associated with the partial path. (Alternatively, in another embodiment, a Path Stack Element can contain only the Type information since the Value information can be obtained elsewhere once the Type information is known.) The information is stored in terms of PID, DID and appropriate offsets into them. Once again using the example of FIGS. 26 and 28, a BPV Accessor pointing to Blop:HomeAddr:State will have the Path Stack illustrated in FIG. 30.

IV. Storage Manager ROUTINES

Given the above-described data structures, certain of the routines which an application program can call can now be set forth, primarily in pseudocode.

```
// SMCreateContainer
Based on the kind, create a Container on the persistent or
    transient medium.
Associate the given Handlers with the Container.
Create a CPLAccessor and assign the Container Persistent Reference
    to it.
Return the CPLAccessor.
// SMRemovePool
Get Exclusive Read/Write Permission to the Container (which
    contains the Pools).
Remove Pool Name from Pool Name Index.
Deallocate storage for Pool on persistent storage using the stored
    Persistent Reference.
Release Exclusive Read/Write Permission to the Container.
// SMGetCommonLayer
Get all the Layers below layer1 in top-to-bottom fashion
    (by finding all the immediately below Layers recursively).
Get all the Layers below layer2 (in top-to-bottom fashion)
    (by finding all the immediately below Layers recursively)
Find the first match of Layer in the 2 sets.
Create a new CPLAccessor referring to this common Layer.
// SMGetBottomLayer
Get the Persistent Reference from the first entry of the Layer
    Collection
Create a new CPLAccessor, if necessary, to return the bottom layer.
// SMCreateLayer - Creates a New Layer in an existing Pool
Get exclusive Read/Write permission to the Pool.
Add Layer to the Pool's Layer Collection and Layer Topology Matrix.
Allocate space in the Persistent Storage where Layer data is to be
    stored.
Create visibility List.
Release exclusive Read/Write permission to the Pool.
// SMSetLayerName - Associates a Name with a Layer. This routine
    assumes a model whereby a Name can be associated with no more
    than one Layer in a given Pool. It includes a "test and set"
``` feature in order to ensure that the caller knows the Layer
that the Name is currently associated with, before the
routine will move the Name to a different Layer. The routine
is atomic in order to prevent anyone else from moving the
Name before completion of this routine.
Get Exclusive Read/Write Permission to the Pool (which contains the
  Layers)
Load the Layer Name Index from the Persistent Storage.
If the name is not currently associated with oldLayer,
  Release Exclusive Read/Write Permission to the Pool.
  Abort and return kSMBFalse.
Remove the name associated with the oldLayer.
Associate the name with newLayer.
Put the Layer Name Index to the Persistent Storage.
Release Exclusive Read/Write Permission to the Pool.

A valuable use of Layer Names is to associate the name "Current" with a Layer in a Pool. For example, if the Pool contains a document that is being updated and modified by a team of workers, an editor can maintain control of which versions of which Blops of the document have been approved as, for example, the latest revision. After creating a reconciliation Layer whose view contains the desired version of each Blop in the document, the editor can then associate the name "Current" with that Layer. If any other worker on the document knows always to begin all modifications with the Layer named "Current", then the editor can prevent a situation where different workers are revising different versions of a document. Additionally, if a worker (such as an illustrator for the document) creates a Separable Pool from the "Current" Layer, the illustrator will know when reintegration is attempted whether a new revision of the document has since been approved. This will be evident because the name "Current" will then be associated with a different Layer than that which initiated the Separable Pool. Still further, all workers on a document who want to integrate modifications into the document can be given the instruction to always reconcile the modification Layer with whichever Layer is then named "Current". In that manner the team can permit multiple editors to merge in modifications without risk that different editors will be merging modifications into different versions of the overall document. The atomic "test and set" function of the SMSetLayerName routine ensures that a given Name (such as "Current") can be associated with only one Layer in a Pool.

// SMNewCPLAccessor - Create a new CPL Accessor
Allocate memory for CPLAccessor.
Store the permission for the CPLAccessor.
Initialize all the fields in CPLAccessor.
// SMRetargetCPLAccessor -
// Change the Container/Pool/Layer referenced by an existing CPL
  Accessor
If another Layer is being referenced, close the opened Layer.
If another Pool is being , close the opened Pool.
If another Container is being referenced; close the opened
  Container.
Set the Container Specification using the input parameter.
Open the Pool and store its Persistent Reference.
Open the Layer and store its Persistent Reference.
// SMPositionCPLAccessor
If poolName is specified and is different from the current open
  Pool,
  Get the Persistent Reference to the Pool (i.e., opening a
    Pool) and store it.
else
  If poolPosition is kSMPUndefined,
    Close the Pool and remove the stored Persistent
      Reference.
  else If poolPosition is kSMPSame,
    do nothing.
  else if poolPosition is kSMPFirstSib,
    Open the first Pool in the Pool Name Index and store
      its Persistent Reference.
  else if poolPosition is kSMPLastSib,
    Open the last Pool in the Pool Name Index and store its
      Persistent Reference.
  else if poolPosition is kSMPLastSib,
    Open the next Pool in the Pool Name Index after the
      current Pool and store its Persistent Reference.
  else if poolPosition is kSMPPrevSib,
    Open the next Pool in the Pool Name Index before the
      current Pool and store its Persistent Reference.
  else if poolPosition is kSMPFirstBelow or kSMPLastBelow,
    Get the Container Specification and Pool information on
      the Base Pool.
    Open the Base Container using the Container
      Specification and store its Persistent Reference.
    Open the Pool below and store its Persistent Reference.
If LayerName is specified and is different from the current opened
  Layer,
  Open the Layer and store its Persistent Reference.
else
  If layerPosition is kSMPUndefined,
    Close the Layer and remove the stored Persistent
      Reference.
  else if layerPosition is kSMPSame,
    do nothing.
  else if layerPosition is kSMPFirstSib,
    Open the first Layer in the Layer Collection and store
      its Persistent Reference.
  else if layerPosition is kSMPLastSib,
    Open the last Layer in the Layer Collection and store
      its Persistent Reference.
  else if layerPosition is kSMPNextSib,
    Open the Layer in the Layer Collection after the
      current Layer and store its Persistent Reference.
  else if layerPosition is kSMPPrevSib,
    Open the Layer in the Layer Collection before the
      current Layer and store its Persistent Reference.
  else if layerPosition is kSMPFirstBelow or kSMPLastBelow,
    Get the Container Specification, Pool Name and Layer
      information on the Base Layer.
    Open the Base Container using the Container
      Specification and store the Persistent Reference.
    Open the Pool below and store its Persistent Reference.
    Open the Layer below and store its Persistent
      Reference.
// SMNewBPVAccessor - Create a new BPV Accessor
Allocate memory for BPVAccessor.
Check to see whether the requested permission is compatible with
  the current Layer Permission.
Store the Container/Pool/Layer Context (which is the CPLAccessor).
Get the Blop data from the Persistent Storage using name or ID.
Get the Property context (a Persistent Reference to the Property
  Data Block stored on disk and some kind of index into this
  PDB) and load the actual Property data.
Get the Value context (a Persistent Reference to the Data Data
  Block stored on disk and some kind of index into this DDB);
If the Value context refers to an indirect value,
  Create a CPLAccessor to the remote Container/Pool/Layer
    context and
  Create a BPVAccessor referring to the remote
    Blop/Property/Value and store them.
// SMRetarget BPVAccessor
if commit is true,
  flush out Property Context and Value Context (i.e., saving
    PDB and DDB)
if blopPosition is kSMPUndefined,
  remove the stored BlopID.
else if blopPosition is kSMPSame,
  do nothing.
else if blopPosition is kSMPFirstSib,
  Get the first Blop from the Visibility List and store the
    BlopID.
else if blopPosition is kSMPLastSib,
  Get the last Blop from the Visibility List and store the
    BlopID.
else if blopPosition is kSMPNextSib,
  Get the Blop after the current Blop from the Visibility List -continued

```
            and store BlopID,
    else if blopPosition is kSMPPrevSib,
        Get the Blop after the previous Blop from the Visibility List
            and store BlopID.
    else if blopPosition is kSMPFirstBelow,
        Get the first Embedded Blop from the side-structure of ranges
            and store BlopID.
    else if blopPosition is kSMPLastBelow,
        Get the last Embedded Blop from the side-structure of ranges
            and store BlopID.
    else if blopPosition is kSMPFirstAbove or kSMPLastAbove,
        Get the parent of the Blop (from the Path Stack)
            and store BlopID.
If samePropertyName is true,
    Get the Property context using the Property Name.
else
    Clear the Property Context.
If sameValueIndex is true,
    Get the Value Context using the value index.
else
    Clear the Value Context.
// SMPositionBPVAccessor
If propertyName is supplied,
    Get the Property Context using property Name.
Else
        if propPosition is kSMPundefined,
            remove the Property Context.
        else if propPosition is kSMPSame,
            do nothing.
        else of propPosition is kSMPFirstSib,
            Get the first Property from the Property Context.
        else if propPosition is kSMPLastSib,
            Get the last Property from the Property Context.
        else if propPosition is kSMPNextSib,
            Get the next Property from the Property Context.
        else if propPosition is kSMPPrevSib,
            Get the previous Property from the Property Context.
If targetIndex is supplied,
    Get the Value Context using the targetIndex
Else
        if indexPosition is not kSMPUndefined,
        if indexPosition is kSMPSame,
            do nothing.
        else if indexPosition is kSMPFirstSib,
            if SameType is true
                Get the first Value from the
                Value Context with the same
                Type.
            else
                Get the first Value from the
                Value Context.
        else if indexPosition is kSMPLastSib,
            if sameType is true
                Get the last Value from the
                Value Context with the same
                Type.
            else
                Get the last Value from the
                Value Context.
        else if indexPosition is kSMPNextSib,
            if sameType is true
                Get the next Value from the
                Value Context with the same
                Type.
            else
                Get the next Value from the
                Value Context.
        else if indexPosition is kSMPPrevSib,
            if sameType is true
                Get the previous Property from
                the Value Context with the
                same Type.
            else
                Get the previous Property from
                the Value Context.
```

Releasing a BPV Accessor. As described above, DDBs and PDBs need to be moved to the CPL Accessor cache when the BPV Accessor is released. However, not all DIDs may be real. When 'a new DDB is needed (e.g.' when a new 'big' Value is inserted), the Storage Manager does not actually allocate the Data Block on the disk then. Instead, it will just use a buffer in memory to hold the Value and use a 'temporary' DID. Therefore, in the API call to SMReleaseBPVAccessor, the Storage Manager walks all the DDBs to allocate real DDBs for the newly-created Values and replaces all the 'temporary' DIDs with real DIDs.

The following pseudocode implements a ReleaseBPVAccessor routine:

```
// SMReleaseBPVAccessor
Punt Path Stack except for Root Path Stack Element
Walk DDBs looking for missing DIDs
For each missing DID,
    Allocate DDB
    Add DID to DDB Cache
Move PDB and DDB cache in BPV Accessor to those in CPL Accessor
Punt data structure
```

Blop Redirection. An Indirect Blop has a special predefined PID and the DDB contains the information of the Target Block. Therefore, when the Storage Manager attempts to get the Blop (through a GetRootID vector call), the special PID is returned.

A Remote CPL Accessor is created to refer to the Layer where the Target Blop resides. This Remote CPL Accessor should have a flag to show its special status because it needs to dispose of itself on the release of its last BPV Accessor.

After the CPL Accessor is created, a bogus BPV Accessor should be created to refer to the Target Blop. Essentially, this creates a write-lock on the Blop. This BPV Accessor is actually just a placeholder and therefore can be more lightweight than a normal BPV Accessor.

```
// SMCreatePool
Get Exclusive Read/Write Permission to the Container (which
    contains the Pools).
Add Pool Name to Pool Name Index.
Allocate space in Persistent Storage for Pool data.
Create Layer Topology Matrix.
Create Layer Collection.
Create Base Layer (see SMNewLayer).
Set the correct permission for the Pool.
Release Exclusive Read/Write Permission to the Container.
// SMCreateSeparablePool
Create a Pool with a Base Layer in the separable medium.
Construct Complete Visibility List for the Base Layer.
Store Container/Pool/Layer Context of the Base Layer in the
    Separable Pool.
Create a list which is used to contain the IDs and versions of
    Blops in the Base Layer and the IDs and versions of the
    corresponding Blops in the Separable Layer.
For each Blop in the Visibility List of the Base Layer,
    copy the Blop into the Separable Pool; and
    update a list to include the ID and version of the Blop in
        the Base Layer and those of the corresponding Blop in
        the Separable Layer.
// SMCreateDeltaPool
Create a Pool with a Base Layer in the Delta medium.
Store Container/Pool/Layer Context of the Base Layer in the
    Separable Pool.
// SMIntegrateLayers
If the two CPLAccessors refer to the same Layer, return immediately.
Check the Layer Topology Matrix to ensure that the two Layers are
    derived from a common Base Layer.
Create a Reconciliation Layer based on the two Layers to be
    integrated (see SMNewLayer).
Construct a Complete Visibility List for each of the two Layers.
For each Blop in the Visibility List in one Layer,
    If the same Blop with the same version exists in the other
        Layer,
        do nothing
    else
```

-continued

```
        If the same Blop with a different version exists in the
            other Layer,
            call back with kSMRConflictingChange operator.
        If the Blop does not exist in the other Layer,
            call back with kSMRNewBlop.
        Create a new version of the Blop in the Reconciliation
            Layer.
        Put in the selection (from the result of the callback
            routine) into that Blop version.
        Mark the Blop as "examined".
    For each Blop in the Visibility List in the other Layer,
        If the Blop has not been examined,
            If the Blop does not exist in the other Layer,
                call back with kSMRNewBlop operator.
            Create a new version of the Blop in the Reconciliation
                Layer.
            Put in the selection (from the result of the callback
                routine) into that Blop version.
            Mark the Blop as "examined".
// SMIntegratePool
Check to ensure the Separable Pool is derived from the Base pool.
If the Base Layer from which the Separable Pool is derived has its
    name removed,
    call back with kSMRBaseLayerNameMoved operator.
Create a Reconciliation Layer based on the Layer in the Base pool
    and the one in the Separable Pool (see SMNewLayer).
Construct a Complete Visibility List for each of the two Layers.
For each Blop in the Visibility List in Base Layer,
        If the Blop is not created during SMCreateSeparablePool time,
            skip this Blop.
        If the same Blop with the same version exists in the
            Separable Pool,
            Mark this Blop as "examined".
        else
            If the same Blop with a different version exists in the
                Separable Layer,
                If the Blop has a new Name in the Base Layer
                    call back with kSMRNewNameInBase.
                else if the Blop has a new Name in the Separable
                    Layer,
                    call back with kSMRNewNameInseparable.
                else if the Blop is disposed of in the Separable
                    Layer,
                    call back with kSMRDisposedInSeparable,
                else if the Blop is disposed of in the Base
                    Layer,
                    call back with kSMRDisposedInBase
                else
                    call back with kSMRConflictingChange
                        operator.
            If the Blop does not exist in the other Layer,
                call back with kSMRNewBlopInBase.
            Create a new version of the Blop in the Reconciliation
                Layer.
            Put in the selection (from the result of the callback
                routine) into that Blop version.
            Mark this Blop as being "examined".
    For each Blop in the Visibility List in the Layer in Separable
        Pool,
        If the Blop has been "examined",
            skip this Blop.
        else
            Call back with kSMRNewBlopInSeparable.
            Create a new version of the Blop in the Reconciliation
                Layer.
            Put in the selection (from the result of the callback
                routine) into that Blop version.
// SMReconnectDeltaPool
Make sure the the CPLAccessor supplied refer to a Delta Pool by
    checking the existence of the Container/Pool/Layer context.
Check to ensure the Delta Pool is derived from the Base Layer.
If the generation number of the Base Layer has changed,
    signal error
Else
    Set the Container Specification using the input parameter.
    Open the Pool and store its Persistent Reference.
    Open the Layer and store its Persistent Reference.
// SMMoveAllChangesDown
Get Exclusive Read/Write Permission to the Pool (which contains the
    Layers). (See Semaphore steps above.)
```

-continued

```
    Make sure that fromLayer is derived from toLayer.
    If the Visibility List of the fromLayer is a Complete Visibility
        List,
        Copy the fromLayer's Visibility List to the toLayer.
    else
        Combine the Delta Visibility Lists between the fromLayer
            (inclusive) and the toLayer (inclusive).
        Copy the combination to the toLayer.
    Dispose of all the Visibility Lists of Layers between the fromLayer
        (inclusive) and toLayer (exclusive).
    Release Exclusive Read/Write Permission to the Pool. (See
        Semaphore steps above.)
// SMMoveChangesDown
Duplicate Visibility Lists of all Layers between toLayer and
    fromLayer.
For each Blop in iterator,
    For each duplicated Visibility List (except the one for
        toLayer),
        If the Blop exists in the Visibility List,
            Remove that Blop entry.
        Add that Persistent Reference to the Visibility List of
            toLayer.
For each Layer,
    Switch each Visibility List with the new one.
    Mark each Layer according to the consistent flag parameter.
// SMCopyBlopsUp
Duplicate Visibility List of toLayer.
For each Blop in the iterator,
    Get its Persistent Reference from the Visibility List of
        fromLayer.
    Duplicate the Persistent Storage using the Persistent
        Reference.
    Write the duplicated Persistent Reference and Blop (if
        necessary) to the duplicated Visibility List of
        toLayer.
Switch the duplicated Visibility List with the actual one for
    toLayer.
// SMCopyAllBlopsUp
If fromLayer does not have a Complete Visibility List,
    create one.
Duplicate Visibility List of fromLayer.
For each entry in the duplicate Visibility List,
    Get its Persistent Reference from the Visibility List of
        fromLayer.
    Duplicate the Persistent Storage using the Persistent
        Reference.
    Replace the old Persistent Reference with the new one.
Set the toLayer to use the duplicated Visibility List of fromLayer.
// SMCleanup with kSMCollapseLayers
Get Exclusive Read/Write Permission to the Pool (which contains the
    Layers).
Make sure that fromLayer is derived from toLayer.
Remove the Layers from the Pool's Layer Topology Matrix and Layer
    Collection.
Release Exclusive Read/Write Permission to the Pool.
// SMIndirectValue
Write the supplied Container/Pool/Layer Context and the supplied
    Blop/Property/Value Context to the value referred to by the
    local BPVAccessor.
Mark the Value as indirect.
// SMReadValueData
If the BPVAccessor refers to an indirect value,
    Get the Blop/Property/Value context on the remote Blop or
        Value.
else
    Get the Blop/Property/Value context from the input parameter
        BPVAccessor.
Execute the handlers associated with the Value Types using the
    Value Context (a Persistent Reference to the Data Data Block
    stored on disk and some kind of index into this DDB).
Cache and return the result of the last executed handler (which is
    the requested data).
```

In the SMReadValueData routine above, Basic Types can have Handlers associated with them. These Handlers can be viewed as a black-box with an input stream and an output stream. The Handlers are chained together by the order of the Basic Types in what is referred to herein as a Complex Type. A pipeline is thus established which has one input stream and one output stream. The data passed in from the input stream is manipulated by each Handler, and the output becomes an aggregate result of all the Handlers. Therefore, one can construct Complex Types which manipulate the data in the appropriate manner when it is being retrieved from or written to a Container.

The ability to associate Handlers with a Basic Type is useful, for example, when compression or encryption is needed on the data. An application program can attach a "compression" Type to a Basic Type. For reading data from the storage apparatus, the Basic Type Handler knows how to retrieve the special type of data. It then passes the raw data to the "compression" Handler which will perform the necessary compressing (or decompressing).

A complimentary SMWriteValueData routine is detailed below:

```
// SMwriteValueData
If the BPVAccessor is an indirect value,
    Get the Blop/Property/Value context on the remote Blop and
        Value from the input parameter BPVAccessor.
else
    Get the Blop/Property/Value context from the input parameter
        BPVAccessor.
Execute the handlers associated with the Value Types using the
    Value Context (a Persistent Reference to the Data Data Block
    stored on disk and some kind of index into this DDB)
    (*** Note that the order of handler execution is the reverse
        of that of ReadValueData.)
    (*** The last handler executed should output the data to the
        Persistent Storage using the Value context)
// SMCreateBlop
Allocate new BlopID from Pool (using BlopID Allocator)
Add BlopId to the Layer's Visibility List
return the new BlopID
// SMIndirectBlop (SMBPVAccessor localBlop,
//                  SMBPVAccessor remoteBlop
//                  SMCPLAccessor remoteLayer,
//                  const SMStructureName remoteBlopName);
If remoteBlop is not NIL
    Store the Blop ID, Property Context and Value Context in the
        local Blop. (Property Context consists of a Persistent
        Reference to the Property Data Block stored on disk and
        some kind of index into this PDB. Similarly, Value
        Context consists of a Persistent Reference to the Data
        Data Block stored on disk and some kind of index into
        this DDB.)
    Store the Container Specification, Pool Name, Layer Name (or
        Layer ID) of the remote Layer.
else
    Store the Container Specification, Pool Name, Layer Name (or
        Layer ID) of the remote Layer.
    Store the remoteBlopName
Mark this Blop as Indirect (by assigning a special PID value to it)
//   SMGetIndirectBlopInfo (SMBPVAccessor localBPVAccessor,
SMBPVAccessor remoteAccessor)
Get the stored Container Specification, Pool Name, Layer Name (or
    ID) of the remote Layer from the Blop referred to by
    localBPVAccessor and Create a CPLAccessor using this info.
Get the stored BlopID or Blop Name, Property, Value contexts.
If remoteAccessor is NIL
    Create a new BPVAccessor using the CPLAccessor and Blop info
        (See SMNewBPVAccessor)
else
    Change the given remoteAccessor to store the
        Container/Pool/Layer context (i.e., the CPLAccessor).
    Position the remoteAccessor to the remote Blop/Property/Value.
// SMCloneBlop
// The slow way:
Create a new Blop in the destination Layer (as specified by
    CPLAccessor).
Create a SMNewBPVAccessor using the new Blop.
Iterate through all Properties and Values of the source Blop using
    SMPositionBPVAccessor and create and copy these Properties
    and Values (using SMCreateProperty, SMCreateValue and
    SMWriteValueData).
Associate the name to the destination Blop.
```

-continued

```
// The fast way:
Create a new Blop in the destination Layer (as specified by
    CPLAccessor).
Create a SMNewBPVAccessor using the new Blop
for each Data Data Block associated with the Blop,
    Duplicate the Data Data Block.
    Associate the duplicated Data Data Block to the destination
        Blop.
// SMRemoveBlop
Tombstone the entry in the Visibility List corresponding to the
    Blop.
// SMCreateValue
Position the BPVAccessor to the appropriate context using
    propertyName and valueIndex.
If there is no Property Context,
    Allocate the Property Context.
Add the Property (specified by propertyName) to the Property
    Context.
If there is no Value Context,
    Allocate the Value Context.
Add a Value Type to the Property Context (i.e., adding an entry in
    the PDB).
Add a Value to the Value Context (i.e., adding an entry in the DDB).
// SMGetReadOnlyValuePtr
Lock down the Data Data Block (DDB) which is referred to by the
    Value Context.
Return a pointer to the value stored in the DDB at the appropriate
    offset.
// SMReadValueData
Locate the location of data in DDB. (The location of data is
    governed by the Type of the data. The type can have variable
    length or fixed length value. Also, the type may imply the
    expected length of a variable length value. Depending on the
    information, the data may be placed at different location
    within the DDB or in a separate DDB).
Copy the requested length of data from this location into the
    buffer given.
// SMWriteValueData
Locate the location of data in DDB. (The location of data is
    governed by the Type of the data. The type can have varied
    length or fixed length value. Also, the type many imply the
    usual length of its value. Depending on the information, the
    data may be placed at different location within the DDB or in
    a separate DDB).
Copy the requested length of data into the DDB at the location.
// SMInsertValueData
Locate the location of data in DDB. (The location of data is
    governed by the Type of the data. The type can have varied
    length or fixed length value. Also, the type may imply the
    usual length of its value. Depending on the information, the
    data may be placed at different loction within the DDB or in
    a separate DDB).
Allocate space for the data on the DDB.
Copy the requested length of data into the DDB at the location.
// SMRemoveValueData
Locate the location of data in DDB. (The location of data is
    governed by the Type of the data. The type can have varied
    length or fixed length value. Also, the type may imply the
    usual length of its value. Depending on the information, the
    data may be placed at different location within the DDB or in
    a separate DDB).
Remove data by moving the trailing data into the space of the
    replaced data.
// SMRemoveValue
Remove the appropriate entries in the Value Context (DDB) and
    Property Context (PDB).
// SMRemoveProperty
Remove the appropriate entries in the Value Context (DDB) and
    Property Context (PDB).
// SMClone Property
Add a Property to the Property Context of the destination Blop.
If the destination Layer is the same as the source Layer, Duplicate
    DDB associated with the source Property and associate
    duplicated DDBs with the destination Property.
else
    Iterate through the values within the Property and copy all
        the values to the destination Blop using SMCreate
        Value, and SMWriteValueData.
// SMMarkEmbeddedBlopIDs
Add to a side-structure associated with a Blop the range which
``` contains the Embedded BlopIDs. (The side-structure can simply be a sorted list of ranges)

V. USAGE EXAMPLES

Following are several examples of how to use the Storage Manager API. These examples are not necessarily the optimal usage of the Storage Manager API, rather they are chosen to best illustrate how the API works. In all of these examples, functions written in boldface are Storage Manager calls, and functions written in italics are user functions which (usually used to hide code which is not directly related to the example being presented). In most of these examples, exception handling has been ignored for clarity.

A. Single User Model

The first set of examples deal with the usage of Containers, Pools and Layers in a simple single user model. Many Applications use a simple model of document manipulation: The New command creates an empty, "Untitled" document which has no file associated with it; the first time the user saves, it creates the file and copies the information into it; and so on. There are two methods that can be used with regards to New document creation. One way is to create a Memory Container and on the Save command copy the Pools in the Container to a File Container. Another solution would be to create a File Container on New with a temporary name, and then rename and move it on the Save. The following code Segments demonstrate how this functionality can be implemented with the Storage Manager.

New Document. When creating a new document, a temporary Container with a single Pool is needed.

```
SMCPLAccessor NewDocument( )
    /* returns an empty, on-disk Pool with one layer */
{
    SMFileSpec tempSpec;
    SMContSpec theContSpec;
    SMCPLAccessor updateAccessor;
        /* generate the temporary file container */
    generate_tempspec(&tempSpec);
    theContSpec = SMMakeFileContSpec(&tempSpec);
    updateAccessor = SMCreateContainer(theContSpec,
        SMUIPFileContHandler, ksMAReadWrite);
        /* create the pool with a single bottom layer */
    SMCreatePool (updateAccessor, gPoolName, kSMUndefined);
        /* name the update layer to ease finding on open */
    SMSetLayerName (gUpdateLayerName, ksMUndefined,
        updateAccessor);
    return(updateAccessor);
}
```

First Save. The first time you save the document, you need to rename the Container file.

```
void FirstSave(SMCPLAccessor updateLayer, FSSpec *newFileSpec) / *
rename the file designated by the given accessor to new file */ {
    SMFileSpec tempSpec;
    FSSpec tempFSSpec;
    SMContSpec newContSpec;
    SMCPLAccessor bottomLayer;
    SMCPLReadOnlyInfo roInfo;
        /* get the current temporary fsspec being used */
    roInfo.aKind = kSMUndefined;
    roInfo.theFile = &tempSpec;
    roInfo.basePoolAKind = kSMUndefined;
    roInfo.basePool = kSMUndefined;
    roInfo.layerNames = kSMUndefined;
    SMGetCPLAccessorInfo (updateLayer, &roInfo, kSMUndefined);
```

```
        /* newFile was created prior to this routine */
    FSpExchangeFiles (&tempSpec.fsSpec, newFileSpec);
    tempFsSpec = tempSpec.fsSpec;
    tempSpec.fsSpec = *newFileSpec;
    tempSpec.creator = kSMUndefined;
    tempSpec.fileType = kSMUndefined;
    tempSpec.permission = fsRdWrPerm;
    tempSpec.datafork = kSMBTrue;
    newContSpec = SMMakeFileContSpec(&tempSpec) ;
        /* implicitly closes temp file by moving away from it */
    SMRetargetCPLAccessor (updateLayer, newContSpec,
        kSMBTrue, kSMBTrue);
        /* remove the old temp file */
    FSpDelete (&tempFSSpec);
    bottomLayer = SMCloneAccessor(updateLayer) ;
        /* create a new update layer on top of bottom layer and
           reposition the given accessor to it */
    SMCreateLayer (kSMUndefined, updateLayer, kSMUndefined,
        kSMUndefined, ksMUndefined);
        */ name the update layer to ease finding on open */
    SMSetLayerName (gUpdateLayerName, bottomLayer,
        updateLayer);
    SMDisposeCPLAccessor(bottomLayer);
}
```

Save. This set of examples assumes the simplest use of Layers in the Storage Manager. There are two Layers in the Pool, one is the saved state (the bottom Layer) and the other is the update Layer (the preceding code sets up exactly this situation). All changes wrought by the application should be done in the update Layer. In this case, a save is simply a move changes down of the update Layer into the bottom Layer.

```
void Save (SMCPLAccessor updateLayer)
    /* save the updates into the bottom layer */
{
    SMCPLAccessor bottomLayer;
        /* get an accessor to the bottom layer */
    bottomLayer = SMGetBottomLayer(updateLayer, kSMAReadOnly);
        /* now copy the changes down */
    SMMoveAllChangesDown (updateLayer, bottomLayer) ;
    SMDisposeCPLAccessor (bottomLayer) ;
}
```

Close. To close the document, all you need to dispose of is the CPL Accessor that is referring to the document. This will implicitly close the document file.

```
void Close(SMCPLAccessor updateLayer)
    /* Close the document associated with the given container */
{
    SMDisposeCPLAccessor (updateLayer) ;
}
```

Close w/o Saving. To close the document without saving changes, all you need to do is empty the update Layer and dispose of is the CPL Accessor that is referring to the document. This will implicitly close the document file.

```
void CloseNoSave (SMCPLAccessor updateLayer)
    /* Close the document associated with the given container */
{
    SMEmptyLayer (updateLayer);
    SMDisposeCPLAccessor (updateLayer);
}
```

Open. To open an existing document, you simply position a CPL Accessor to the update Layer of the document.

```
SMCPLAccessor Open (FSSpec *theFile)
    /* open the specified document */
{
    SMFileSpec fileSpec;
    SMContSpec constSpec;
    SMCPLAccessor updateLayer;
    fileSpec.fsSpec = *theFile;
    fileSpec.creator = kSMUndefined;
    fileSpec.fileType = kSMUndefined;
    fileSpec.permission = fsRdWrPerm;
    fileSpec.dataFork = kSMBTrue;
    contSpec = SMMakeFileContSpec (&fileSpec);
    updateLayer = SMNewCPLAccessor (kSMAReadWrite,
            contSpec, gPoolName, gUpdateLayerName);
        /* empty the layer to guarantee clean start post failure */
    SMEmptyLayer (updateLayer);
}
```

B. Single User Versioning

The next set of examples is built on the same document scheme as the previous set and uses almost all of the functions; but it adds the ability to save multiple versions of a document. This set of examples does not demonstrate branching of versions or concurrent access. The basic model here is that the Pool contains a simple stack of Layers representing the different versions of the document. The topmost Layer is a update Layer, as in the previous example, which allows the application to write changes out to disk without committing to them as versions. This Layer is given the name identifier of gUpdateLayerName, and the version Layers are given names identifiers corresponding to their version numbers.

New Document. Uses the previous New Document routine without changes.

First Save. The first time you save the a document with versions it is exactly the same as the previous example except for the addition of naming the bottom Layer as the first version.

```
void FirstSave (SMCPLAccessor updateLayer, FSSpec *newFileSpec,
        SMLayerName versionNamePtr)
    /* rename the file designated by the given accessor
        to new file */
{
    SMFileSpec tempSpec;
    FSSpec tempFSSpec;
    SMContSpec newContSpec;
    SMCPLAccessor bottomLayer;
    SMCPLReadOnlyInfo roInfo;
        /* get the current temporary fsspec being used */
    roInfo.aKind = kSMUndefined;
    roInfo.theFile = &tempSpec;
    roInfo.basePoolAKind = kSMUndefined;
    roInfo.basePool = kSMUndefined;.
    roInfo.layerNames = kSMUndefined;
    SMGetCPLAccessorInfo (updateLayer, &roInfo, kSMUndefined);
        /* newFile was created prior to this routine */
    FSpExchangeFiles (&tempSpec.fsSpec, newFileSpec);
    tempFSSpec = tempSpec.fsSpec;
    tempspec.fsSpec = *newFileSpec;
    tempSpec.creator = kSMUndefined;
    tempspec.fileType = kSMUndefined;
    tempSpec.permission = fsRdWrPerm;
    tempSpec.datafork = kSMBTrue;
    newContSpec = SMMakeFileContSpec (&tempSpec);
        /* implicitly closes temp file by moving away from it */
    SMRetargetCPLAccessor (updateLayer, newContSpec, kSMBTrue,
            kSMBTrue);
        /* remove the old temp file */
    FSpDelete (&tempFSSpec);
    bottomLayer = SMCloneAccessor (updateLayer);
        /* create a new update layer on top of bottom layer
            and reposition the given accessor to it */
```

```
    SMCreateLayer (kSMUndefined, updateLayer, kSMUndefined,
            kSMUndefined, kSMUndefined);
        /* name the update layer to ease finding on open */
    SMSetLayerName (gUpdateLayerName, bottomLayer,
            updateLayer);
        /* name the bottom layer as a version "Version 1" */
    SMSetLayerName (versionNamePtr, kSMUndefined, bottomLayer);
    SMDisposeCPLAccessor (bottomLayer);
}
```

Save. In this example, the current update Layer is named to the given version name and a new update Layer is created on top of it for future updates.

```
void Save (SMCPLAccessor updateLayer, SMLayerName
        versionNamePtr)
    /* commit the updates and create a new update layer */
{
    SMCPLAccessor newVersionLayer;
        /* create a local CPL accessor to the new version layer */
    newVersionLayer = SMCloneCPLAccessor (updateLayer);
        /* create a new update layer on top of the current update
            layer and repositions the given accessor to it */
    SMCreateLayer (kSMUndefined, updateLayer, kSMUndefined,
            kSMUndefined, kSMUndefined);
        /* name the old update layer as a new version */
    SMSetLayerName (versionNamePtr, kSMUndefined,
            newVersionLayer);
        /* name the update layer to ease finding on open */
    SMSetLayerName (gUpdateLayerName, newVersionLayer,
            updateLayer);
    SMDisposeCPLAccessor (newVersionLayer);
}
```

Close. Uses the previous Close routine without changes.
Close w/o Saving Versions. Uses the previous Close w/o Saving routine without changes.
Open. Uses the previous Open routine without changes.
Open Past Version. The purpose of keeping around the old versions of a document is so that the application can go back and read them. The following call can be used to "open" one of the old versions. This is really the same as a normal open except the Layer that is accessed is a versioned Layer and the accessor is read-only. This is because all of the version Layers already have other Layers derived from them (either a higher order version or the update Layer), the additional derived Layers will not be able to be changed, i.e. the version Layer will be opened read-only and any Saves the application might try will fail. Prior to the call, the application will have presented to the User a list of all of the named versions from the opened document so they could choose which version is to be opened. The name is then passed to the OpenPastVersion function along with a ReadOnly Accessor designating the correct Container and Pool.

```
void OpenPastVersion (SMLayerName versionNamePtr,
        SMCPLAccessor versionLayer)
    /* open the specified layer */
{
    SMContSpec constSpec;
    SMCPLAccessor updateLayer;
    SMPositionCPLAccessor (versionLayer, kSMUndefined,
            kSMPSame, versionNamePtr, kSMPUndefined);
}
```

C. Diverging Concurrent Access

The next set of examples are a bit more complex. They show how the Storage Manager could be used to create a system where, in general, there can be one writer or many readers of the current version; but that anyone can cause a fork/branch in the version structure so as to create more than one "current version". Since such systems generally do not force the branches to eventually be merged back into the main line, the structure can be thought of as divergent. Most source code control systems, including MPW's Projector use schemes similar to this. This example, for the sake of simplicity, assumes that the user must save as a version to save changes. One way to implement this with the Storage Manager is to follow along in the same vein as the last set of examples. The version Layers are arranged in a graph, and each writer has an update Layer allocated. The readers, as previously noted, do not need update Layers, but can be directly accessing the version Layers. The difficult part comes in determining which Layers are which, particularly when starting a session. The solution is to come up with a Layer naming scheme which identifies both the graph structure of the versions, and the owners of the updates.

New Document.

```
SMCPLAccessor NewDocument(SMLayerName versionNamePtr,
    SMLayerName userNamePtr)
    /* returns an empty, on-disk Pool with one layer */
{
    SMFileSpec tempSpec;
    SMContSpec theContSpec;
    SMCPLAccessor updateAccessor;
    SMStructuredName updateLayerNamePtr;
    SMCount numLayersAbove = 0;
        /* generate the temporary file container */
    generate_tempspec(&tempSpec);
    theContSpec = SMMakeFileContSpec(&tempSpec);
    updateAccessor = SMCreateContainer(theContSpec,
        SMUIPFileContHandler, kSMAReadWrite);
        /* create the pool with a single bottom layer */
    SMCreatePool(updateAccessor, gPoolName, kSMUndefined);
        /* next, generate an appropriate update layer name */
    generate_update_layer_name(updateLayerNamePtr,
            versionNamePtr, userNamePtr, numLayersAbove);
        /* name the update layer to ease finding on open */
    SMSetLayerName(updateLayerNamePtr, kSMUndefined,
        updateAccessor);
    destroy_name_storage(updateLayerNamePtr);
    return(updateAccessor);
}
```

First Save.

```
void FirstSave(SMCPLAccessor updateLayer, FSSpec *newFileSpec,
    SMLayerName versionNamePtr)
    /* rename the file designated by the given accessor to
       new file */
{
    SMFileSpec tempSpec;
    FSSpec tempFSSpec;
    SMContSpec newContSpec;
    SMCPLReadOnlyInfo roInfo;
        /* get the current temporary fsspec being used */
    roInfo.aKind = kSMUndefined;
    roInfo.theFile = &tempSpec;
    roInfo.basePoolAKind = kSMUndefined;
    roInfo.basePool = kSMUndefined;
    roInfo.layerNames = kSMUndefined;
    SMGetCPLAccessorInfo(updateLayer, &roInfo, kSMUndefined);
        /* newFile was created prior to this routine */
    FSpExchangeFiles(&tempSpec.fsSpec, newFileSpec);
    tempFSSpec = tempSpec.fsSpec;
    tempSpec.fsSpec = *newFileSpec;
    tempSpec.creator = kSMUndefined;
    tempSpec.fileType = kSMUndefined;
    tempSpec.permission = fsRdWrShPerm;
    tempSpec.datafork = kSMBTrue;
    newContSpec = SMMakeFileContSpec(&tempSpec);
        /* implicitly closes temp file by moving away from it */
    SMRetargetCPLAccessor(updateLayer, newContSpec, kSMBTrue,
        kSMBTrue);
        /* remove the old temp file */
    FSpDelete(&tempFSSpec);
        /* see following routine */
    Save(updateLayer);
        /* to further edit the version it must be opened anew */
    Close(updateLayer);
}
```

Save. Once changes have been made to the update Layer, the next task is to change it into a new version by changing the name. The name of this new version can be derived from the name of the update Layer which was created.

```
void Save(SMCPLAccessor updateLayer)
    /* make the given update layer a version*/
{
    SMIterator layerNames;
    SMCPLReadOnlyInfo roInfo;
    SMCPLReadWriteInfo rwInfo;
    SMStructuredName updateLayerNamePtr;
    SMStructuredName versionLayerNamePtr;
    layerNames = SMNewIterator(SMStructuredNameIteratorHandler);
    roInfo.aKind = kSMUndefined;
    roInfo.theFile = kSMUndefined;
    roInfo.basePoolAKind = kSMUndefined;
    roInfo.basePool = kSMUndefined;
    roInfo.layerNames = layerNames;
        /* get the names associated with the update layer */
    SMGetCPLAccessorInfo(updateLayer, &roInfo, kSMUndefined);
        /* determine which one is the update name */
    update_name_from_iterator(layerNames, updateLayerNamePtr);
        /* and calculate what the version name should be */
    version_name_from_update_name(updateLayerNamePtr,
            versionLayerNamePtr);
        /* finally, add the version name to the layer */
    SMSetLayerName(versionLayerNamePtr, kSMUndefined,
        updateLayer);
        /* and get rid of the update name */
    SMSetLayerName(updateLayerNamePtr, updateLayer,
        kSMUndefined);
        /* last, but not least, mark the new version consistent */
    rwInfo.contInfoSize = kSMUndefined;
    rwInfo.contInfo = kSMUndefined;
    rwInfo.maxPoolNameSize = kSMUndefined;
    rwInfo.poolName = kSMUndefined;
    rwInfo.poolInfoSize = kSMUndefined;
    rwInfo.poolInfo = kSMUndefined;
    rwInfo.consistent = kSMBFalse;
    SMSetCPLAccessorInfo(updateLayer, &rwInfo);
}
```

Close. Uses the previous Close routine without changes.

Close w/o Saving Versions. Uses the previous Close routine without changes. The future Open routine will remove the inconsistent Layer.

Open. Opening a version for writing is somewhat more complex. -The application must create the update Layer, and must name it based on the version being opened, the name of the user, and how many other people have that version open for writing (i.e. which branch is being created). A ReadOnly Accessor, designating the correct Pool, is passed to the Open function as well as the name of the version to update and the name of the user doing the updating.

```
SMCPLAccessor Open(SMCPLAccessor pool,
    SMLayerName versionNamePtr, SMLayerName userNamePtr)
    /* open the specified version of the specified document
       for writing on behalf of the specified user */
{
    SMCPLAccessor updateLayer;
```

-continued

```
     SMCPLAccessor countAccessor;
     SMCount numLayersAbove;
     SMStructuredName updateLayerNamePtr;
     SMCPLReadWriteInfo rwInfo;
        /* remove any inconsistent layers leftover from
           previous failures or lack of saving */
     SMCleanUp(pool, kSMCDisposeInconsistent);
        /* position to the versionName Layer */
     SMPositionCPLAccessor(pool, kSMUndefined, kSMPSame,
           versionNamePtr, kSMUndefined);
        /* now create the update layer above it */
     updateLayer = SMCreateLayer(kSMUndefined, pool,
           kSMUndefined, kSMUndefined, kSMAReadWrite);
        /* mark the new layer as inconsistent. It will be
           changed to consistent when made into a version */
     rwInfo.contInfoSize = kSMUndefined;
     rwInfo.contInfo = kSMUndefined;
     rwInfo.maxPoolNameSize = kSMUndefined;
     rwInfo.poolName = kSMUndefined;
     rwInfo.poolInfoSize = kSMUndefined;
     rwInfo.poolInfo = kSMUndefined;
     rwInfo.consistent = kSMBFalse;
     SMSetCPLAccessorInfo(updateLayer, &rwInfo);
        /* the following code is used to determine and set the name
           of the update Layer. This code loops since it is a critical
           section which is not interlocked. Fortunately, the
           SetLayerName call is an atomic test-and-set which will detect
           at the bottom of the loop if the critical section has been
           violated */
     for(;;) {
           /* first determine the number of branches which already
              exist for this version by counting all the children of
              the version Layer, which includes the new Layer just
              created. */
           countAccessor = SMCloneCPLAccessor(pool);
           SMPositionCPLAccessor(countAccessor, kSMUndefined,
                 kSMPSame, kSMUndefined, kSMPFirstChild);
           numLayersAbove = SMCountCPLAccessor(countAccessor,
                 kSMPSame, kSMPNextSib);
           SMDisposeCPLAccessor(countAccessor);
           /* next, generate an appropriate update layer name
              using version name, user name and number of layers */
           generate_update_layer_name(updateLayerNamePtr,
                 versionNamePtr, userNamePtr, numLayersAbove);
           /* and try to apply that name to the Layer */
           nameOK = SMSetLayerName(updateLayerNamePtr,
                 kSMUndefined, updateLayer);
           destroy_name_storage(updateLayerNamePtr);
           /* if we failed, then someone else got there
              between the calls to SMCountCPLAccessor an
              SMSetLayerName, so we just iterate again. */
           if(!nameOK)
                 continue;
           /* else */
                 break;
     }
     return(updateLayer);
}
```

Open Past Version. Uses the previous Open Past Version routine without changes.

D. Converging Concurrent Access

The final set of CPL examples deals with the type of system which always tries to maintain a single "current" version of the document. It may allow multiple applications to open a document for writing, but each is responsible for reconciling its changes with any changes published by other applications, thus the document always converges on a single version. In fact, when the last application closes the document, there should be just one Layer left in the on-disk Pool.

New Document. This is the same as the first NewDocument routine except the bottom Layer is named "Current".

```
SMCPLAccessor NewDocument()
     /* returns an empty, on-disk Pool with one layer */
{
     SMFileSpec tempSpec;
     SMContSpec theContSpec;
     SMCPLAccessor updateAccessor;
        /* generate the temporary file container */
     generate_tempspec(&tempSpec);
     theContSpec = SMMakeFileContSpec(&tempSpec);
     updateAccessor = SMCreateContainer(theContSpec,
           SMUIPFileContHandler, kSMAReadWrite);
        /* create the pool with a single bottom layer */
     SMCreatePool(updateAccessor, gPoolName, kSMUndefined);
        /* name the current layer to ease finding on open */
     SMSetLayerName(gCurrentLayerName, kSMUndefined,
           updateAccessor);
     return(updateAccessor);
}
```

First Save.

```
SMCPLAccessor FirstSave(SMCPLAccessor updateLayer, FSSpec
     *newFileSpec, SMLayerName versionNamePtr)
     /* rename the file designated by the given accessor
        to new file and return what is "Current" */
{
     SMFileSpec tempSpec;
     FSSpec tempFSSpec;
     SMContSpec newContSpec;
     SMCPLAccessor currentLayer;
     SMCPLReadOnlyInfo roInfo;
     SMCPLReadWriteInfo rwInfo;
        /* get the current temporary fsspec being used */
     roInfo.aKind = kSMUndefined;
     roInfo.theFile = &tempSpec;
     roInfo.basePoolAKind = kSMUndefined;
     roInfo.basePool = kSMUndefined;
     roInfo.layerNames = kSMUndefined;
     SMGetCPLAccessorInfo(updateLayer, &roInfo, kSMUndefined);
        /* newFile was created prior to this routine */
     FSpExchangeFiles(&tempSpec.fsSpec, newFileSpec);
     tempFSSpec = tempSpec.fsSpec;
     tempSpec.fsSpec = *newFileSpec;
     tempSpec.creator = kSMUndefined;
     tempSpec.fileType = kSMUndefined;
     tempSpec.permission = fsRdWrShPerm;
     tempSpec.datafork = kSMBTrue;
     newContSpec = SMMakeFileContSpec(&tempSpec);
        /* implicitly closes temp file by moving away from it */
     SMRetargetCPLAccessor(updateLayer, newContSpec, kSMBTrue,
           kSMBTrue);
        /* remove the old temp file */
     FSpDelete(&tempFSSpec);
        /* what application thinks is current saved state
           of document is kept for later use */
     currentLayer = SMCloneAccessor(updateLayer);
        /* create a new update layer on top of bottom layer and
           reposition the given accessor to it */
     SMCreateLayer(kSMUndefined, updateLayer, kSMUndefined,
           kSMUndefined, kSMUndefined);
        /* mark the new layer as inconsistent. It will
           be changed to consistent when saved. */
     rwInfo.contInfoSize = kSMUndefined;
     rwInfo.contInfo = kSMUndefined;
     rwInfo.maxPoolNameSize = kSMUndefined;
     rwInfo.poolName = kSMUndefined;
     rwInfo.poolInfoSize = kSMUndefined;
     rwInfo.poolInfo = kSMUndefined;
     rwInfo.consistent = kSMBFalse;
     SMSetCPLAccessorInfo(updateLayer, &rwInfo);
     return(currentLayer);
}
```

Save. All of the hard work for this kind of system comes in the Save call. Many systems divide this task into several operations, but in this example we have made it all part of one call. The basic sequence of events is:

1) Try to name the update Layer "Current", based on what the application used to think the "Current" Layer was.
2) If the naming succeeds, go to step 5.
3) find the new "Current" Layer, and build a reconciliation Layer between the new "Current" Layer and the update Layer and make the reconciliation Layer the update Layer.
4) Once the Layers are reconciled, loop back to step 1.
5) If the renaming in step 2 succeeds, try to collapse the structure by first copying changes down to the bottom Layer if possible, and then collapsing Layers.

```
SMCPLAccessor Save(SMCPLAccessor updateLayer,
        SMCPLAccessor oldCurrentLayer)
/* save the changes in the update layer */
{
    SMBoolean nameOK;
    SMCPLAccessor integrationLayer;
    SMCPLAccessor bottomLayer;
    /* find the bottom layer for future move changes down */
    bottomLayer = SMGetBottomLayer(oldCurrentLayer,
        kSMAReadOnly);
            /* mark the update layer consistent so it can be saved */
    rwInfo.contInfoSize = kSMUndefined;
    rwInfo.contInfo = kSMUndefined;
    rwInfo.maxPoolNameSize = kSMUndefined;
    rwInfo.poolName = kSMUndefined;
    rwInfo.poolInfoSize = kSMUndefined;
    rwInfo.poolInfo = kSMUndefined;
    rwInfo.consistent = kSMBFalse;
    SMSetCPLAccessorInfo(updateLayer, &rwInfo);
    /* loop until we get a clean publish as determined
        by our succeeding at setting the current name */
    for(;;) {
        /* STEP 1) */
        /* try to fix up the name */
        nameOk = SMSetLayerName(gCurrentLayerName,
            oldCurrentLayer, updateLayer);
        /* STEP 2) */
        if(nameOK)
            break;
        /* STEP 3) */
        /* the goal of this step is to set up the integration */
        /* layer between what we thought the current state was, and
            what the actual current state is */
            /* but first, since the layer we thought was current may
                now be no more than a historical backwater, try
                flushing its changes down to the bottom so the Layer
                may later be freed. */
            SMMoveAllChangesDown(oldCurrentLayer, bottomLayer);
            SMPositionCPLAccessor(oldCurrentLayer, kSMUndefined,
                kSMPSame, gCurrentLayerName, kSMUndefined);
            integrationLayer = SMIntegrateLayers(updateLayer,
                oldCurrentLayer, kSMRMAll,
                SMDefaultReconcileHandler, kSMAReadOnly);
            SMDisposeCPLAccessor(updateLayer);
            updateLayer = integrationLayer;
        /* STEP 4) loop */
    }
        /* STEP 5) */
    /* the last step is to see if we can simplify
        the layer structure in the container at all */
    /* first we try to do the big copy down to empty
        out any layers which no one is depending on */
    SMMoveAllChangesDown(oldCurrentLayer, bottomLayer);
    SMDisposeCPLAccessor(oldCurrentLayer);
    SMMoveAllChangesDown(updateLayer, bottomLayer);
    SMDisposeCPLAccessor(bottomLayer);
    /* then we try to purge out any empty Layers */
    SMCleanup(updateLayer, kSMCDisposeInconsistent |
        kSMCCollapseLayers);
    return(updateLayer);
}
```

Close. Uses the previous Close routine without changes.

Close w/o Saving Versions. Uses the previous Close routine without changes. The future Open routine will remove the inconsistent Layer.

Open. The current parameter passed only designates the Pool. It is repositioned by the routine to the "Current" Layer and an update Layer is returned.

```
SMCPLAccessor Open(SMCPLAccessor current)
    /* opens "Current" of the specified document
        for writing on behalf of the specified user */
{
    SMCPLAccessor updateLayer;
    SMCPLReadWriteInfo rwInfo;
        /* remove any inconsistent layers leftover from previous
            failures or lack of saving */
    SMCleanUp(current, kSMCDisposeInconsistent);
        /* position to the "Current" Layer */
    SMPositionCPLAccessor(current, kSMUndefined, kSMPSame,
        gCurrentLayerName, kSMUndefined);
        /* now create the update layer above it */
    updateLayer = SMCreateLayer(kSMUndefined, current,
        kSMUndefined, kSMUndefined, kSMAReadWrite);
        /* mark the new layer as inconsistent. It will
            be changed to consistent when made into a version */
    rwInfo.contInfoSize = kSMUndefined;
    rwInfo.contInfo = kSMUndefined;
    rwInfo.maxPoolNameSize = kSMUndefined;
    rwInfo.poolName = kSMUndefined;
    rwInfo.poolInfoSize = kSMUndefined;
    rwInfo.poolInfo = kSMUndefined;
    rwInfo.consistent = kSMBFalse;
    SMSetCPLAccessorInfo(updateLayer, &rwInfo);
    return(updateLayer);
}
```

VI. CONCLUSION

Accordingly, it can be seen that the Storage Manager of the present invention provides the following advantages, among others:

Generic Data Model. Whereas existing systems restrict users to a particular medium (or only a few media), the data model of the Storage Manager of the present invention abstracts the actual physical storage. Therefore, users can use the Storage Manager APIs to access any kind of storage (including file, memory, ROM, clipboard, database etc.)

Flexible Structured Storage. Existing database systems require a schema to access data while object-based systems employ class hierarchy to define the data format. The Storage Manager of the present invention instead adopts a data model similar to "universal relation". Each Blop can contain any number of Properties and Values. This lifts the requirement of a rigid schema or class hierarchy. Additionally, the Storage Manager supports Compound Types, in which the format of data in a Blop can be described according to a nested hierarchy of application-defined Types which, only at the end of the hierarchy, invoke standard Basic Types defined by the Storage Manager.

A Different Concurrency Model. Many database systems provide locking for concurrent access. When one user is accessing the data, no other user can access the same data. This is termed pessimistic concurrency. In existing implementations of optimistic concurrency, when one access path commits its changes to the data, all other access paths must abort their changes. The Storage Manager of the present invention provides a concurrency scheme quite different from those described above. It can handle concurrency by changing the Current Layer which is designated by the Layer Name. One can also reconcile with the Current Layer and make the Reconciliation Layer the Current Layer. This process allows multiple users making conflicting changes to a Base Layer and delay the reconciliation until a later time.

Integration of versioning and concurrency. Some existing systems can maintain versions and also control concurrency. However, none of the systems integrate the two into one mechanism. In the Storage Manager of the present invention, Layers are used not only for versioning, but also for concurrency control. Users can have diverging versions by creating branches of Layers, edit the versions simultaneously and reconcile any conflicting changes using a Reconciliation Layer.

Layer Management Mechanism. Existing systems have versioning capability. However, few have a well-defined mechanism for managing the versions. A user can only add, delete or view a version. The Storage Manager of the present invention defines a set of operations on Layers. MoveAllChangesDown provides an archiving scheme that is predictable and efficient. CollapseLayers allows users to remove unwanted Layers. These operations simplify the version structure and reduce the Container size. The garbage collection scheme disposes of any Blops that are no longer used in the Container and helps to retrieve valuable storage space.

Concurrency Model fits nomadic use. Few or none of the existing systems are designed to handle a mobile computing environment well. In the Storage Manager of the present invention, Separable Pools allow users to derive a Layer from a Base Pool and edit it while it is disconnected from the Base Pool. The changes can be reconciled using a Reconciliation Layer at a later time. The reconciliation process is the same as reconciling changes from two Layers in the same Pool.

Accessors. The Storage Manager of the present invention provides Accessors to access data in a Blop. Two kinds of accessors are supported: CPL Accessors and BPV Accessors. CPL Accessors allow an application program to locate a Container, a Pool or a Layer. BPV Accessors allow the application program to locate a Property or a Value within a Blop.

Hiding Container Boundaries. Traditional storage models seldom support references to an object in another file. However, the Storage Manager of the present invention supports Indirect Blops to allow Blops in one Container to refer to other Blops in a different Container. Accessors make accessing remote Blops completely transparent to the application program.

Intelligent Typing. In many programming environments, Types are used only to define the format of data. However, the Storage Manager of the present invention supports Complex Types built with one or more Basic Types, each of which can have a Handlers associated with it. The Handlers are chained together by the order of the Basic Types in a Complex Type. Therefore, an application program can construct Complex Types which manipulate the data in the appropriate manner when it is being retrieved from or written to a Container.

The foregoing description of embodiments and variations of the present invention has been provided for the purposes of illustration and description. It is not intended to be exhaustive or to limit the invention to the precise forms disclosed. Many further modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular uses contemplated. It is intended that the scope of the invention be defined by the following claims and their equivalents.

We claim:

1. Data storage apparatus having stored therein data in a data structure, said data structure including:

a plurality of blops, each blop containing a portion of said data and having associated therewith a blop identifier; and a plurality of layers, each of said layers having associated therewith a view of at least one of said blops, the blop identifiers of all of the blops in the view of each given one of said layers being mutually unique, and the views associated with at least two of said layers including blops with identical blop identifiers but having different portions of said data, wherein said plurality of layers includes a bottom layer and at least one top layer different from said bottom layer, each of said layers except said bottom layer being immediately above at least one other of said layers in said plurality and each of said layers in said plurality except said top layer being immediately below at least one other of said layers in said plurality, all of the blops in the view associated with each of said given layers except said bottom layer being in the group consisting of (a) a blop having a blop identifier which is different from the blop identifiers in all the blops in the views of all the layers below said given layer, and (b) a blop having a blop identifier which is the same as that of one of the blops in the view of one of the layers immediately below said given layer but having a different portion of said data from the portion included in said one of the blops in the view of one of the layers immediately below said given layer.

2. Apparatus according to claim 1, wherein a branching one of said layers is immediately below two others of said layers.

3. Apparatus according to claim 2, wherein the view of a first one of said two other layers includes a first blop which is also within the view of said branching layer and a second blop which has a blop identifier which is the same as that of a third one of the blops in the view of said branching layer but has a different portion of said data than that of said third blop, and wherein the view of a second one of said two other layers includes said first blop and a fourth blop, said fourth blop having a blop identifier which is the same as that of said second and third blops but having a different portion of said data than that of said third blop.

4. Apparatus according to claim 1, wherein a reconciliation one of said layers is immediately above two others of said layers.

5. Apparatus according to claim 4, wherein all of the blops in the view of said reconciliation layer are also in the view of at least one of the layers immediately below said reconciliation layer.

6. Apparatus according to claim 5, wherein a first one of the blops which is in the view of said reconciliation layer is also in the view of a first one of said layers immediately below said reconciliation layer, wherein the blop identifier of said first blop is the same as that of a second blop which is in the view of a second one of said layers immediately below said reconciliation layer, but wherein the portion of said data which is included in said first blop is different from that of said second blop.

7. Apparatus according to claim 1, wherein said portion of data contained by each blop in said plurality of blops is divided into at least one value, each of said values in each blop in said plurality of blops having a value type associated therewith in the blop, said value type indicating the format of the value.

8. Apparatus according to claim 7, wherein a single one of said value types in a given one of said blops is associated with a plurality of the values in said given blop.

9. Apparatus according to claim 7, wherein each of said values in a given one of said blops also has a blop property associated therewith in the blop, all of said properties in said given blop being named uniquely within said given blop, and all of said values in said given blop being named uniquely within a given property in said given blop.

10. Apparatus according to claim 7, wherein a given one of said values in a given one of said blops is further divided into a plurality of sub-values, each of said sub-values having a sub-type associated therewith in the blop, the sub-type indicating the format of the sub-value, the division of said given value into sub-values and the identification of the value sub-type associated with each of said sub-values both being defined by the value type associated with said given value.

11. Apparatus according to claim 7, wherein the value type associated with a given one of said values includes a reference to a decryption procedure for reading the portion of said data stored in said given value.

12. Apparatus according to claim 7, wherein the value type associated with a given one of said values includes reference to a plurality of handlers and a sequence of said handlers for reading the portion of said data stored in said given value.

13. Data storage apparatus having stored therein data in a data structure, said data structure including:

a plurality of blops, each blop containing a portion of said data and having associated therewith a blop identifier;

a plurality of layers, each of said layers having associated therewith a view of at least one of said blops, the blop identifiers of all of the blops in the view of each given one of said layers being mutually unique, and the views associated with at least two of said layers including blops with identical blop identifiers but having different portions of said data; and a plurality of pools including a first pool and a second pool, wherein said plurality of layers includes a first bottom layer in said first pool and a second bottom layer in said second pool, any further layers in said first pool being above said first bottom layer and any further layers in said second pool being above said second bottom layer, all of the blops in the view associated with each given layer in said first and second pools, which layer is immediately above another layer, being in the group consisting of (a) a blop which is not in the view of any layer below said given layer, and (b) a blop which is in the view of at least one layer immediately below said given layer.

14. Apparatus according to claim 13, wherein no two of the blops which are within the views of any of the layers in any given one of said pools has both the same blop identifier and the same portion of said data.

15. Apparatus according to claim 13, wherein said second bottom layer is above a layer in said first pool.

16. Apparatus according to claim 15, wherein one of the blops which are in the view of one of the layers in said first pool is stored in a first data storage medium, and wherein one of the blops which are in the view of one of the layers in said second pool is (a) not in the view of any layer in said first pool and is (b) stored in a second data storage medium different from said first data storage medium.

17. Apparatus according to claim 16, wherein said second data storage medium is removable relative to said first data storage medium.

18. Apparatus according to claim 13, wherein all of the blops in the view of said second bottom layer are copies of respective blops in the view of a base one of said layers in said first pool.

19. Apparatus according to claim 18, wherein one of the blops in the view of said base layer in said first pool is stored in a first data storage medium, and wherein all of the blops in the view of said second bottom layer are stored in a second data storage medium different from said first data storage medium.

20. Apparatus according to claim 18, wherein one of the blops in the view of said base layer in said first pool is stored in a first data storage medium, and wherein all of the blops in the view of said second bottom layer are stored in data storage media which are removable relative to said first data storage medium.

21. Apparatus according to claim 18, wherein a reconciliation one of said layers in said first pool is immediately above both another layer in said first pool and a layer in said second pool.

22. Data storage apparatus having stored therein data in a data structure, said data structure including:

a plurality of blops each blop containing a portion of said data and having associated therewith a blop identifier a plurality of layers, each of said layers having associated therewith a view of at least one of said blops, the blop identifiers of all of the blops in the view of each given one of said layers being mutually unique, and the views associated with at least two of said layers including blops with identical blop identifiers but having different portions of said data: and first and second containers, each containing at least one of said blops and at least one of said layers, all of the blops in said first container being stored in a first data storage medium and all of the blops in said second container being stored in a second data storage medium different from said first data storage medium.

23. Apparatus according to claim 22, wherein said first container has associated therewith a first handler to handle data accesses to said first medium, and wherein said second container has associated therewith a second handler to handle data accesses to said second medium, said second handler being different from said first handler.

* * * * *